(12) United States Patent
Kuranuki et al.

(10) Patent No.: US 6,452,816 B2
(45) Date of Patent: Sep. 17, 2002

(54) SWITCHING POWER SUPPLY WITH DELAY CIRCUIT FOR LIGHT-LOAD PERIOD

(75) Inventors: Masaaki Kuranuki, Kyoto; Koji Yoshida, Ikoma, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/867,038

(22) Filed: May 29, 2001

(30) Foreign Application Priority Data

Jun. 1, 2000 (JP) ........................................ 2000-165133

(51) Int. Cl.$^7$ ............................................. H02M 3/335
(52) U.S. Cl. .............................. 363/17; 363/25; 363/97; 363/98
(58) Field of Search ............................. 363/17, 25, 26, 363/97, 98

(56) References Cited

U.S. PATENT DOCUMENTS

| | | | |
|---|---|---|---|
| 4,866,589 A | * | 9/1989 | Satoo et al. .................. 363/97 |
| 5,297,014 A | * | 3/1994 | Saito et al. .................... 363/97 |
| 5,991,172 A | * | 11/1999 | Jovanovic et al. ............. 363/97 |
| 6,151,232 A | * | 11/2000 | Furuhashi et al. ............. 363/97 |

FOREIGN PATENT DOCUMENTS

| | | |
|---|---|---|
| JP | 09149635 A | 6/1997 |
| JP | 09163740 A | 6/1997 |
| JP | 11089232 A | 3/1999 |

\* cited by examiner

*Primary Examiner*—Jeffrey Sterrett
(74) *Attorney, Agent, or Firm*—Akin, Gump, Strauss, Hauer & Feld, L.L.P.

(57) ABSTRACT

In an isolation type DC-DC converter for performing full-wave rectification in the secondary of a transformer, two switching sections 11 and 13 alternately switch ON and OFF, thereby reversing the current I3 flowing through a primary winding 3a of the transformer 3. A switching control circuit 7 outputs switching signals G1 and G3 to the switching sections 11 and 13, respectively, thereby controlling the switching of the switching sections. A load current sensing section 9 senses the amount of load current, then compares it with a predetermined threshold value. When the amount of load current sensed is smaller than the threshold value, a delay circuit 8 delays the switching signals G1 and G3 to the switching sections 11 and 13 for a predetermined delay time. The delay time is set to be substantially equal to ¼ of the resonance period determined by the self-inductance of the primary winding 3a of the transformer 3.

24 Claims, 30 Drawing Sheets

F I G. 4B
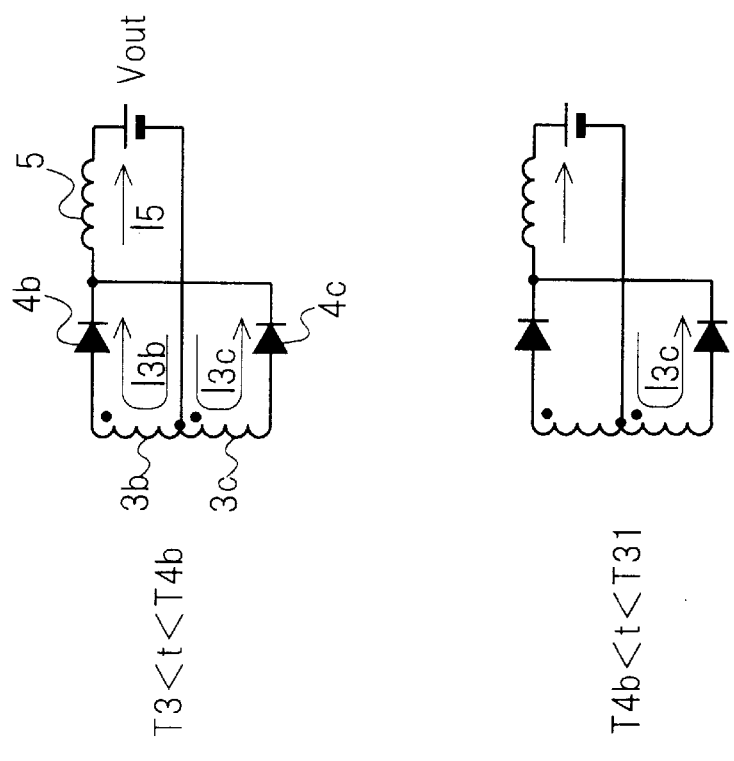
T3<t<T4b
T4b<t<T31
F I G. 4A
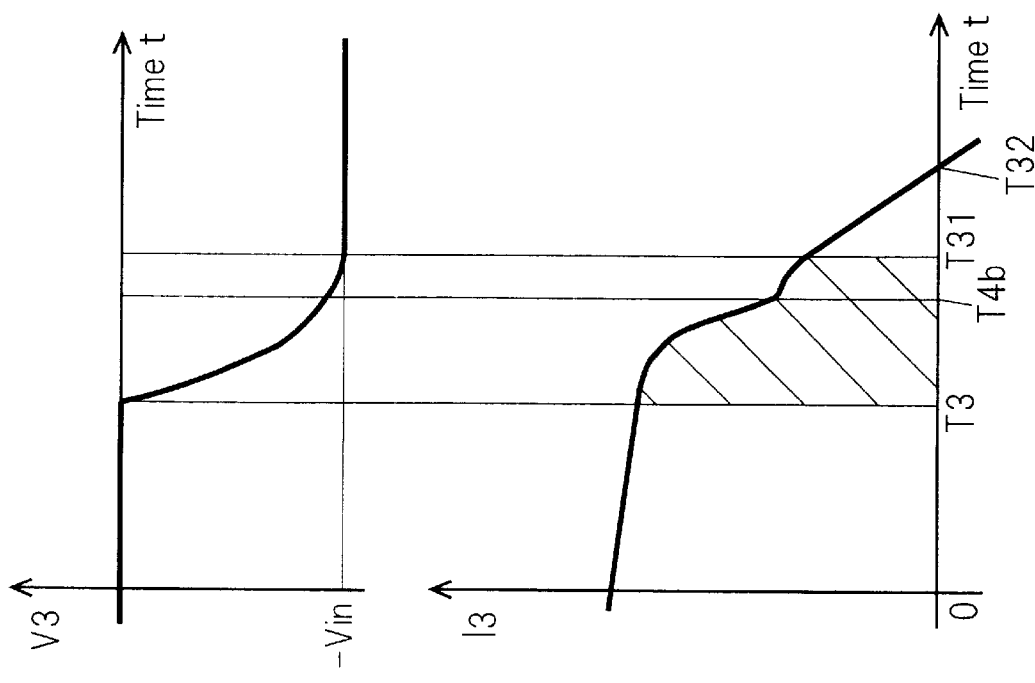

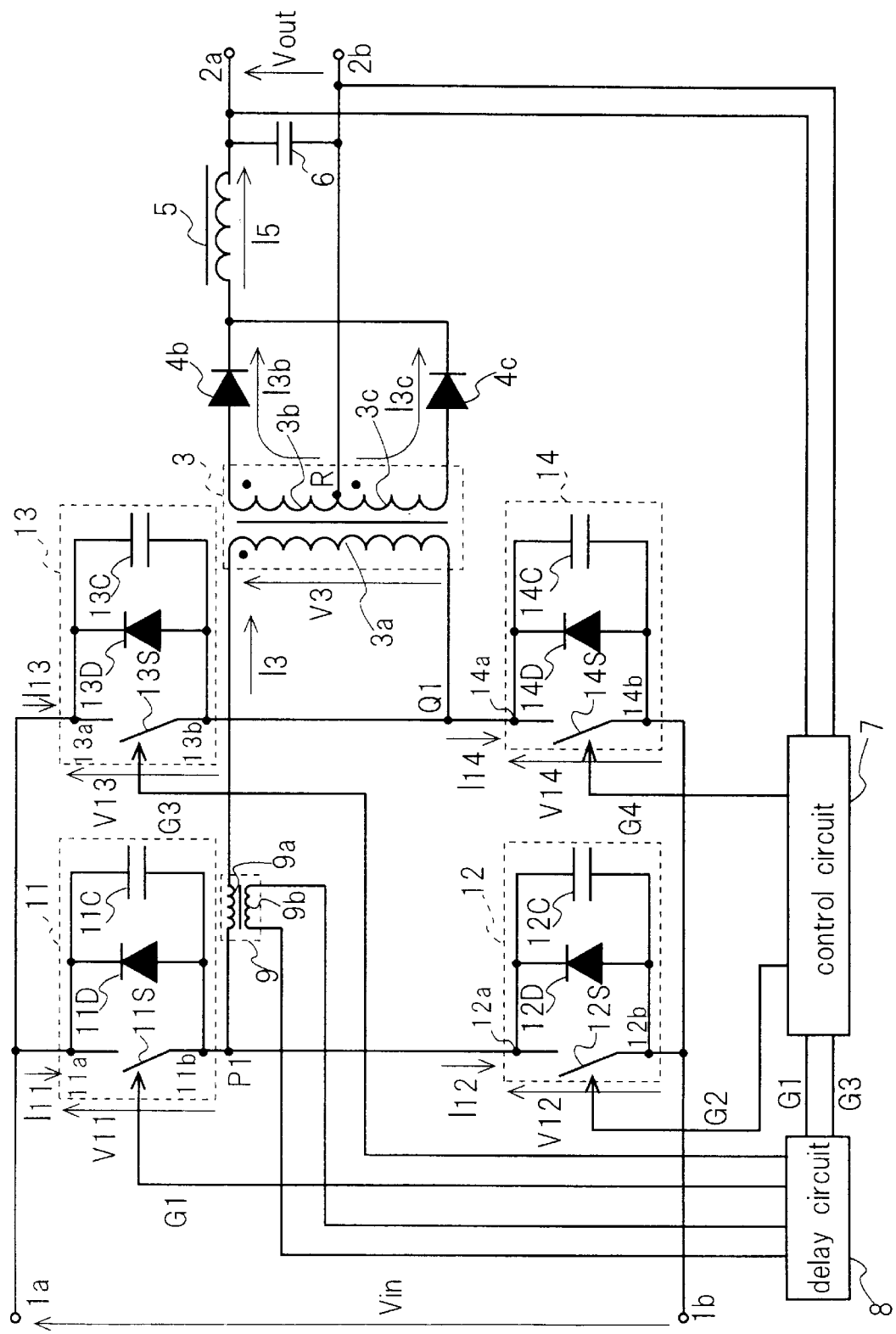
F I G. 1 8

SWITCHING POWER SUPPLY WITH DELAY CIRCUIT FOR LIGHT-LOAD PERIOD

BACKGROUND OF THE INVENTION

The present invention relates to a switching power supply comprising a DC-DC converter for supplying a stabilized DC voltage in an electronic equipment for industrial and consumer use, and relates, in particular, to a soft-switching power supply for soft switching such as zero-volt switching (ZVS).

A switching power supply converts an input DC voltage into an output of constant DC voltage, and is used in an electronic equipment such as a television set, a VTR and a personal computer. In a switching power supply, semiconductor devices, such as MOS-FET, IGBT and thyristor, are used as switches, whereby the ratio between the input and output voltages can be set through the duty ratio of turning ON and OFF. Accordingly, a switching power supply can stably output a predetermined DC voltage by controlling the turning ON and OFF. Since the electric power loss (switching loss) due to turning ON and OFF is generally small, a switching power supply is often used for the purpose of energy saving.

Reactance elements, such as transformer, inductor and capacitor, included in a switching power supply can be downsized and weight-reduced by turning ON and OFF at a higher frequency (switching frequency). On the other hand, the ratio between the input and output voltages of a switching power supply depends substantially only on the duty ratio of turning ON and OFF. Accordingly, a switching power supply can be rather easily downsized and weight-reduced with keeping its output voltage.

In recent years, there are rapidly increasing demands for energy saving, downsizing and weight reduction of various electronic equipments. Also regarding to switching power supplies, there are strong requirements for higher efficiency, smaller size, lighter weight and more stable output.

In order to meet such requirements, a higher switching frequency is necessary. However, a higher switching frequency causes a larger switching loss. Further, a part of the electric power dissipated as a switching loss causes surge current and voltage, which result in an adverse influence of noise on electronic equipments in the periphery.

Accordingly, the increase of switching frequency requires a switching technology for suppressing the switching loss. Known as such a technology is the soft switching. In soft switching, a switch in a transitional state turning from ON to OFF or vice versa is provided with a resonance voltage or current, whereby the switch turns from ON to OFF or vice versa when the voltage or current is at zero. In particular, zero-volt switching (ZVS) is the switching carried out when the voltage applied across the switch is at zero, whereas zero-current switching (ZCS) is the switching carried out when the current applied across the switch is at zero.

In accordance with soft switching, no electric power is applied across the switch at the instance of turning between ON and OFF. Accordingly, no switching loss in the electric power occurs in principle. In particular, in accordance with ZVS, no charge remains in the parasitic capacitance of the switch at the instance of turning ON. Therefore, no surge current occurs.

In a so-called isolation type switching power supply using a transformer for stopping a direct current between the power supply side and the output side, a prior art, such as disclosed in Japanese Laid-Open Patent Publication No. Hei 11-89232, is known, as a circuit for performing zero-volt switching using the energy stored in the transformer.

FIG. 15 shows a circuit constituting of a known switching power supply. The known example is of a full-bridge type converter, in which full-wave rectification is carried out in the secondary of a transformer 3.

FIG. 16 shows the pulse waveform of the current or voltage at each part indicated by an arrow in FIG. 15 of the known circuit.

As shown in FIG. 15, a switching control circuit 7 outputs switching signals G1, G2, G3 and G4 to four switching devices 11S, 12S, 13S and 14S, respectively. As shown in FIG. 16, the switching signals G1, G2, G3 and G4 are rectangular waves having predetermined widths. The switching devices 11S, 12S, 13S and 14S are ON when the switching signals G1, G2, G3 and G4 are at a high potential (H), respectively, whereas the switching devices 11S, 12S, 13S and 14S are OFF when the switching signals G1, G2, G3 and G4 are at a low potential (L), respectively.

As shown in FIG. 16, the switching signal G1 changes from H to L at time T1, whereby the first switching device 11S turns OFF. Then, a resonance occurs among the leakage inductance of a primary winding 3a, a first capacitor 11C in a first switching section 11, and a second capacitor 12C in a second switching section 12. That is, a current I3 flowing through the primary winding 3a causes the first capacitor 11C to charge and the second capacitor 12C to discharge. Thus, the voltage V11 across the first switching device 11S increases from zero, while the voltage V12 across the second switching device 12S decreases from a maximum value Vin.

The voltage V11 across the first switching device 11S reaches the maximum value Vin, and, at the same time, the voltage V12 across the second switching device 12S reaches zero. Then, a second diode 12D connected to the second switching device 12S in parallel turns ON. At time T2 immediately after that, the switching control circuit 7 changes the switching signal G2 from L to H, thereby turning ON the second switching device 12S. In such a manner, ZVS is carried out for the turning ON of the second switching device 12S.

Similarly, a resonance occurs among the leakage inductance of the primary winding 3a, the first capacitor 11C and the second capacitor 12C during the interval from the time T7 when the second switching device 12S turns OFF to the time T8 when the first switching device 11S turns ON. After the voltage V11 across the first switching device 11S reaches zero, the first switching device 11S turns ON. In such a manner, ZVS is carried out for the turning ON of the first switching device 11S. Further, regarding to the turning ON of the third switching device 13S at time T4 and the turning ON of the fourth switching device 14S at time T6, ZVS is carried out similarly with a resonance among the leakage inductance of the primary winding 3a, a third capacitor 13C and a fourth capacitor 14C.

In addition to the above-mentioned full-bridge type converter of the prior art, switching power supplies with ZVS include a half-bridge type, a push-pull type and modifications thereof combined with an auxiliary winding, as disclosed in Japanese Laid-Open Patent Publication No. Hei 9-163740. In each of these, ZVS is carried out with, a resonance among the leakage inductance of the primary winding and the parasitic capacitors of the switches.

In a switching power supply disclosed in the Japanese Laid-Open Patent Publication No. Hei 9-163740, a bi-directional switching device is provided in parallel with a primary winding or an auxiliary winding. The bi-directional switching device comprises two switching devices interconnected in series. Each switching device is connected with a diode in parallel. The ends of the switching devices on the anode or the cathode side of the respective diodes are interconnected. The bi-directional switching device serves as a switching snubber (also called an active clamp). That is, the bi-directional switching device absorbs surge currents and voltages occurring when a switch for conducting electricity between the transformer and the input power supply is turned ON and OFF. Thus, the surge current and voltage are prevented from exerting the adverse influence of noise on other circuits in the periphery.

Recently, there is a growing number of the apparatus to be energized even in periods out of driving and the apparatus held on standby for a long time with being energized. The former apparatus include a personal computer and a facsimile machine, while the latter include a television set and a video tape recorder. In such an electronic equipment, the majority of the power is consumed during the standby. Accordingly, reduction of the standby power consumption is important in order to improve the energy saving in switching power supplies.

The current (load current) output from a switching power supply to a load is extremely low during the standby, in comparison with the driving. The load current during the standby is, in general, 1/5 to 1/10 or less of that during the driving. Hereinafter, "a heavy-load period" indicates a period when the load current is relatively large such as a period of the ordinary driving, whereas "a light-load period" indicates a period when the load current is relatively small such as a period of the standby.

The known switching power supplies have the following problem in the light-load period. The switching loss of the above-mentioned prior art is certainly small in the heavy-load period, since the ZVS has been devised so as to be optimum in the heavy-load period. However, in the light-load period, the switching loss increases, since the ZVS cannot be carried out for the turning ON of the first switching device 11S and the third switching device 13S as follows.

In FIG. 16, the current I3 flowing through the primary winding 3a causes the third capacitor 13C to discharge when the fourth switching device 14S turns OFF at time T3. In heavy-load period, the load current is sufficiently large. Accordingly, the equivalent primary current thereof and the current I3 are sufficiently large. As a result, all of the charge stored in the third capacitor 13C can be moved against the input voltage Vin, thereby permitting the voltage V13 across the third switching device 13S to be at zero.

On the contrary, in the light-load period, the load current is small. Accordingly, the current I3 is small. As a result, all of the charge stored in the third capacitor 13C cannot be moved away during the resonance among the leakage inductance of the primary winding 3a, the third capacitor 13C and the fourth capacitor 14C. In this case, the switching loss increases since the voltage V13 across the third switching device 13S is not zero when the third switching device 13S turns ON at the same timing T4 as in the heavy-load period. In particular, the charge remaining on the third capacitor 13C moves vigorously at the timing of the turning ON of the third switching device 13S, thereby causing a surge current. Also when the first switching device 11S turns ON between times T7 and T8, the ZVS cannot be carried out in the light-load period, similarly to the case that the third switching device 13S turns ON. Therefore, in the light-load period, the switching loss increases and the surge current occurs.

BRIEF SUMMARY OF THE INVENTION

An object of the present invention is to provide a switching power supply in which the ZVS reduces the switching loss in the light-load period and suppresses the occurrence of surge current and voltage, thereby realizing efficiency improvement and noise suppression.

In order to resolve the above-mentioned problem in a so-called full-bridge type switching power supply, a switching power supply according to the present invention comprises:

A) a DC-DC converter comprising:
   a) four switching sections consisting of a first switching section, a seconds witching section, a third switching section, and a fourth switching section, each comprising 1) a switching device turned ON and OFF by switching signals from the outside, and 2) a diode and a capacitor each connected to said switching device in parallel;
   b) a transformer comprising a primary winding and at least one secondary winding;
   c) a rectifying circuit for performing full-wave rectification on the output of said transformer; and
   d) a smoothing circuit for smoothing the output of said rectifying circuit; wherein
     a) the end (cathode) of said first switching section on the cathode side of said diode and the cathode of said third switching section are connected to a high potential terminal of a substantially constant DC voltage source;
     b) the cathode of said second switching section is connected to the end (anode) of said first switching section on the anode side of said diode, while the anode of said second switching section is connected to a low potential terminal of said substantially constant DC voltage source;
     c) the cathode of said fourth witching section is connected to the a node of said third switching section, while the anode of said fourth switching section is connected to said low potential terminal of said substantially constant DC voltage source; and
     d) one end of said primary winding of said transformer is connected to the junction point between said first switching section and said second switching section, while the other end of said primary winding is connected to the junction point between said third switching section and said fourth switching section;

B) a switching control section for outputting said switching signals to said switching devices at a predetermined switching frequency;

C) a load current sensing section for sensing the amount of load current output from said DC-DC converter; and D) a delay section for delaying said switching signals of said switching control section for a predetermined delay time depending on said amount of load current sensed by said load current sensing section.

In a known full-bridge type DC-DC converter, the ZVS in the light-load period causes a problem, when the first switching section is turned ON after the turning OFF of the second switching section, and when the third switching section is turned ON after the turning OFF of the fourth switching section. However, in the above-mentioned full-bridge type switching power supply according to the present invention, the ZVS is carried out for the turning ON of the first switching section and the third switching section in the light-load period as follows.

The primary winding and the capacitors of the switching sections resonate in the primary of the transformer in the dead time between the turning OFF of the second switching section and the following turning ON of the first switching section, and the dead time between the turning OFF of the fourth switching section and the following turning ON of the third switching section. By virtue of the resonance, the current flowing through the primary winding decreases smoothly in the above-mentioned dead times.

On the other hand, the decreasing of the current flowing through the primary winding finally causes a substantial commutation in the secondary of the transformer, since full-wave rectification is carried out in the secondary of the transformer. In a center-tap type rectifier circuit, the transformer comprises two secondary windings interconnected in series, and the opposite ends of the secondary windings to the junction point thereof are connected to the respective rectifier diodes or the like. In the center-tap type rectifier circuit, the substantial commutation in the secondary indicates a transition from the state that a current flows through both of the secondary windings to the state that a current flows through only one of the secondary windings. In a bridge type rectifier circuit, the transformer comprises only one secondary winding, and both ends of the secondary winding are connected to a bridge consisting of four rectifier diodes or the like. In the bridge type rectifier circuit, the substantial commutation in the secondary indicates that two of the four rectifier diodes in the ON state are turned OFF. In the above-mentioned center-tap type and bridge type rectifier circuits, the rectifier diodes may be replaced by switching devices. In these rectifier circuits, full-wave rectification is carried out actively by controlling the switching devices.

In the light-load period, the ZVS cannot be carried out during the dead time of the same length as in the heavy-load period, since the current flowing through the primary winding is smaller than in the heavy-load period. However, if the dead time in the light-load period is longer than in the heavy-load period, the substantial commutation in the secondary can occur before the reversal of the current flowing through the primary winding. Then the primary winding's inductance contributing to the resonance changes from the leakage inductance to the substantial whole of the self-inductance. This slows down notably the reduction in the current flowing through the primary winding. Accordingly, during a sufficiently long dead time in the light-load period, the capacitors can continue discharging for a time longer than in the heavy-load period.

According to the present invention, the delay section delays the timing of turning ON of the switching sections controlled by the switching control section for a predetermined delay time in comparison with the heavy-load period, when a state in the light-load period is recognized from the amount of load current sensed by the load current sensing section. Alternatively, the delay section delays the timing of turning OFF of the switching sections controlled by the switching control section for a predetermined delay time in comparison with the light-load period, when a state in the heavy-load period is recognized from the amount of load current sensed by the load current sensing section. Other timings of turning ON and OFF of the switching sections remain determined by a predetermined switching frequency. Accordingly, in both of the above-mentioned delays, the dead time in the light-load period can be longer than that in the heavy-load period. Thus, even in the light-load period, the voltage across the first switching section or the third switching section in the OFF state becomes zero during the dead time, whereby the ZVS is carried out similarly to the heavy-load period.

In order to resolve the above-mentioned problem in a so-called half-bridge type switching power supply, a switching power supply according to the present invention comprises:

A) a DC-DC converter comprising:
  a) four switching sections consisting of a first switching section, a second switching section, a third switching section, and a fourth switching section, each comprising 1) a switching device turned ON and OFF by switching signals from the outside, and 2) a diode and a capacitor each connected to said switching device in parallel;
  b) a first voltage dividing capacitor and a second voltage dividing capacitor interconnected in series;
  c) a transformer comprising a primary winding and at least one secondary winding;
  d) a rectifying circuit for performing full-wave rectification on the output of said transformer; and
  e) a smoothing circuit for smoothing the output of said rectifying circuit; wherein
    a) the opposite end of said first voltage dividing capacitor to the end thereof connected to said second voltage dividing capacitor is connected to a high potential terminal of a substantially constant DC voltage source;
    b) the opposite end of said second voltage dividing capacitor to the end thereof connected to said first voltage dividing capacitor is connected to a low potential terminal of said substantially constant DC voltage source;
    c) the cathode of said first switching section is connected to said high potential terminal of said substantially constant DC voltage source;
    d) the cathode of said second switching section is connected to the anode of said first switching section, while the anode of said second switching section is connected to said low potential terminal of said substantially constant DC voltage source;
    e) either the anodes or the cathodes of said third switching section and said fourth switching section are interconnected, while the opposite ends of said third switching section and said fourth switching section to the junction point thereof are connected to the respective ends of said primary winding of said transformer; and
    f) one end of said primary winding is connected to the junction point between said first switching section and said second switching section, while the other end of said primary winding is connected to the junction point between said first voltage dividing capacitor and said second voltage dividing capacitor;
B) a switching control section for outputting said switching signals to said switching devices at a predetermined switching frequency;
C) a load current sensing section for sensing the amount of load current output from said DC-DC converter; and
D) a delay section for delaying said switching signals of said switching control section for a predetermined delay time depending on said amount of load current sensed by said load current sensing section.

In a known half-bridge type DC-DC converter, the ZVS in the light-load period causes a problem, when each of the first switching section and the second switching section directly connected to the constant DC voltage source is turned ON. However, in the above-mentioned half-bridge type switching power supply according to the present invention, the dead time in the light-load period can be longer than in the heavy-load period in a manner similar to the full-bridge type. Here, the dead time corresponds, in particular, to the interval when both of the first switching section and the fourth switching section are OFF in the time between the turning OFF of the fourth switching section and the following turning ON of the first switching section, and the interval when both of the second switching section and the third switching section are OFF in the time between the turning OFF of the third switching section and the following turning ON of the second switching section. The dead time in the light-load period is longer than in the heavy-load period according to the present invention. Accordingly, the capacitors can continue discharging in the light-load period for a time longer than in the heavy-load period. Therefore, the voltage across the switching section to be turned ON can become zero in the dead time, in spite of only a small current flowing through the primary winding in the light-load period. Thus, the ZVS is carried out similarly to the heavy-load period.

As another half-bridge type switching power supply, a switching power supply according to the present invention comprises:

A) a DC-DC converter comprising:
  a) four switching sections consisting of a first switching section, a second switching section, a third switching section, and a fourth switching section, each comprising 1) a switching device turned ON and OFF by switching signals from the outside, and 2) a diode and a capacitor each connected to said switching device in parallel;
  b) a first voltage dividing capacitor and a second voltage dividing capacitor interconnected in series;
  c) a transformer comprising a primary winding, at least one secondary winding, and an auxiliary winding;
  d) a rectifying circuit for performing full-wave rectification on the output of said transformer; and
  e) a smoothing circuit for smoothing the output of said rectifying circuit; wherein
    a) the opposite end of said first voltage dividing capacitor to the end thereof connected to said second voltage dividing capacitor is connected to a high potential terminal of a substantially constant DC voltage source;
    b) the opposite end of said second voltage dividing capacitor to the end thereof connected to said first voltage dividing capacitor is connected to a low potential terminal of said substantially constant DC voltage source;
    c) the cathode of said first switching section is connected to said high potential terminal of said substantially constant DC voltage source;
    d) the cathode of said second switching section is connected to the anode of said first switching section, while the anode of said second switching section is connected to said low potential terminal of said substantially constant DC voltage source;
    e) either the anodes or the cathodes of said third switching section and said fourth switching section are interconnected, the junction point thereof is connected to said low potential terminal of said substantially constant DC voltage source, and the opposite ends of said third switching section and said fourth switching section to said junction point thereof are connected to the respective ends of said auxiliary winding; and
    f) one end of said primary winding is connected to the junction point between said first switching section and said second switching section, while the other end of said primary winding is connected to the junction point between said first voltage dividing capacitor and said second voltage dividing capacitor;

B) a switching control section for outputting said switching signals to said switching devices at a predetermined switching frequency;

C) a load current sensing section for sensing the amount of load current output from said DC-DC converter; and D) a delay section for delaying said switching signals of said switching control section for a predetermined delay time depending on said amount of load current sensed by said load current sensing section.

Even in the switching power supply according to the present invention, that is, the half-bridge type converter further comprising the auxiliary winding, the dead time in the light-load period can be longer than in the heavy-load period in a manner similar to the above-mentioned half-bridge type. Therefore, according to the present invention, the voltage across the switching section to be turned ON can become zero in the dead time, in spite of only a small current flowing through the primary winding in the light-load period. Thus, the ZVS is carried out similarly to the heavy-load period.

In the above-mentioned full-bridge type and half-bridge type switching power supply, it is preferred that said delay time is substantially ¼ of the resonance period determined by the self-inductance of said primary winding of said transformer.

In the heavy-load period, the leakage inductance of the primary winding contributes to the resonance among the primary winding and the capacitors of the switching sections in the dead time. In contrast, in the light-load period, the substantial whole of the self-inductance of the primary winding contributes to the resonance. Accordingly, by setting the above-mentioned delay time, the dead time in the light-load period can be easily set to be optimum for the discharging of capacitors. That is, the dead time in the light-load period is set to be an interval between the time when the resonance current starts to flow in the direction for discharging the capacitor and the time immediately before the resonance current reverses in the opposite direction for charging the capacitor.

In order to resolve the above-mentioned problem in a so-called push-pull type switching power supply, a switching power supply according to the present invention comprises:

A) a DC-DC converter comprising:
  a) four switching sections consisting of a first switching section, a second switching section, a third switching section, and a fourth switching section, each comprising 1) a switching device turned ON and OFF by switching signals from the outside, and 2) a diode and a capacitor each connected to said switching device in parallel;
  b) a transformer comprising a first primary winding and a second primary winding interconnected in series, and at least one secondary winding;
  c) a rectifying circuit for performing full-wave rectification on the output of said transformer; and
  d) a smoothing circuit for smoothing the out put of said rectifying circuit; wherein
    a) the junction point between said first primary winding and said second primary winding is connected to a first potential terminal of a substantially constant DC voltage source;

b) one end of said first switching section is connected to a second potential terminal of said substantially constant DC voltage source, while the other end of said first switching section is connected to the opposite end of said first primary winding to the end thereof connected to said second primary winding;

c) the end of said second switching section on the same side as the connected end of said first switching section to said second potential terminal of said substantially constant DC voltage source is connected to said second potential terminal of said substantially constant DC voltage source, while the other end of said second switching section is connected to the opposite end of said second primary winding to the end thereof connected to said first primary winding; and d) either the anodes or the cathodes of said third switching section and said fourth switching section are interconnected, and the opposite ends of said third switching section and said fourth switching section to the junction point thereof are connected to the respective ends of said first primary winding and said second primary winding opposite to the junction point thereof;

B) a switching control section for outputting said switching signals to said switching devices at a predetermined switching frequency;

C) a load current sensing section for sensing the amount of load current output from said DC-DC converter; and D) a delay section for delaying said switching signals of said switching control section for a predetermined delay time depending on said amount of load current sensed by said load current sensing section.

Here, in case that the second potential terminal of the constant DC voltage source is the low potential terminal, both the anodes of the first switching section and the second switching section are connected to the second potential terminal. On the contrary, in case that the second potential terminal of the constant DC voltage source is the high potential terminal, both the cathodes of the first switching section and the second switching section are connected to the second potential terminal.

In a known push-pull type DC-DC converter, the ZVS in the light-load period causes a problem when each of the first switching section and the second switching section directly connected to the constant DC voltage source is turned ON. However, in the above-mentioned push-pull type switching power supply according to the present invention, the dead time in the light-load period can be longer than in the heavy-load period in a manner similar to the above-mentioned full-bridge type and half-bridge type. Here, the dead time corresponds, in particular, to the interval when both of the first switching section and the fourth switching section are OFF in the time between the turning OFF of the fourth switching section and the following turning ON of the first switching section, and the interval when both of the second switching section and the third switching section are OFF in the time between the turning OFF of the third switching section and the following turning ON of the second switching section. The dead time in the light-load period can be longer than in the heavy-load period according to the present invention. Accordingly, the capacitors can continue discharging in the light-load period for a time longer than in the heavy-load period. Therefore, the voltage across the switching section to be turned ON can become zero in the dead time, in spite of only a small current flowing through the primary winding in the light-load period. Thus, the ZVS is carried out similarly to the heavy-load period.

As another push-pull type switching power supply, a switching power supply according to the present invention comprises:

A) a DC-DC converter comprising:

a) four switching sections consisting of a first switching section, a second switching section, a third switching section, and a fourth switching section, each comprising 1) a switching device turned ON and OFF by switching signals from the outside, and 2) a diode and a capacitor each connected to said switching device in parallel;

b) a transformer comprising a first primary winding and a second primary winding interconnected in series, at least one secondary winding, and an auxiliary winding;

c) a rectifying circuit for performing full-wave rectification on the output of said transformer; and d) a smoothing circuit for smoothing the output of said rectifying circuit; wherein a) the junction point between said first primary winding and said second primary winding is connected to a first potential terminal of a substantially constant DC voltage source;

b) one end of said first switching section is connected to a second potential terminal of said substantially constant DC voltage source, while the other end of said first switching section is connected to the opposite end of said first primary winding to the end thereof connected to said second primary winding;

c) the end of said second switching section on the same side as the connected end of said first switching section to said second potential terminal of said substantially constant DC voltage source is connected to said second potential terminal of said substantially constant DC voltage source, while the other end of said second switching section is connected to the opposite end of said second primary winding to the end thereof connected to said first primary winding; and d) either the anodes or the cathodes of said third switching section and said fourth switching section are interconnected, the junction point thereof is connected to said second potential terminal of said substantially constant DC voltage source, and the opposite ends of said third switching section and said fourth switching section to said junction point thereof are connected to the respective ends of said auxiliary winding;

B) a switching control section for outputting said switching signals to said switching devices at a predetermined switching frequency;

C) a load current sensing section for sensing the amount of load current output from said DC-DC converter; and D) a delay section for delaying said switching signals of said switching control section for a predetermined delay time depending on said amount of load current sensed by said load current sensing section.

Even in the switching power supply according to the present invention, that is, the push-pull type converter further comprising the auxiliary winding, the dead time in the light-load period can be longer than in the heavy-load period in a manner similar to the above-mentioned push-pull type. Therefore, according to the present invention, the voltage across the switching section to be turned ON can become zero in the dead time, in spite of only a small current flowing through the primary winding in the light-load period. Thus, the ZVS is carried out similarly to the heavy-load period.

In the push-pull type converter with the auxiliary winding, similarly to the above-mentioned push-pull type converter, both the anodes of the first switching section and the second switching section are connected to the second potential terminal in case that the second potential terminal of the constant DC voltage source is the low potential terminal. On the contrary, both the cathodes of the first switching section and the second switching section are connected to the second potential terminal in case that the second potential terminal of the constant DC voltage source is the high potential terminal.

In the above-mentioned push-pull type switching power supply, it is preferred that said delay time is substantially ¼ of the resonance period determined by the self-inductance of said primary winding and the self-inductance of said primary winding of said transformer.

In the heavy-load period, the leakage inductance of the primary winding contributes to the resonance among the primary winding and the capacitors of the switching sections in the dead time. In contrast, in the light-load period, the substantial whole of the self-inductance of the primary winding contributes to the resonance. Therefore, by setting the above-mentioned delay time, the dead time in the light-load period can be easily set to be optimum for the discharging of capacitors. That is, the dead time in the light-load period is set to be an interval between the time when the resonance current starts to flow in the direction for discharging the capacitor and the time immediately before the resonance current reverses in the opposite direction for charging the capacitor.

In each of the above-mentioned switching power supplies according to the present invention, said delay section delays said switching signals for turning ON said switching devices when said amount of load current sensed by said load current sensing section becomes substantially below a predetermined threshold value. Accordingly, in the heavy-load period, the switching signals from the switching control section are transferred to the switching. devices without passing through the delay section. Therefore, the switching signals are substantially free from the influence of noise and distortion in the heavy-load period. As a result, the precision of the switching control in the heavy-load period can be improved.

Further, in each of the above-mentioned switching power supplies according to the present invention, said load current sensing section may sense said amount of load current from any one of the currents of said switching devices, the current of said primary winding, the input and output currents of said DC-DC converter. The time average of the load current is reflected into the time average of the current flowing through each part of the DC-DC converter. Accordingly, the load current sensing section can sense the amount of load current from any one of the above-mentioned currents.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is an enlarged diagram of the pulse waveforms of the voltage V3 and the current I3 generated around the time T3 in the heavy-load period in the primary winding 3a of the transformer 3 of the switching power supply of Example 1, wherein

FIG. 4 is an enlarged diagram of the pulse waveforms of the voltage V3 and the current I3 generated around the time T3 in the light-load period in the primary winding 3a of the transformer 3 of the switching power supply of Example 1, wherein FIG. 4A is a diagram of the pulse waveforms, and FIG. 4B is a diagram in which arrows schematically indicate the secondary currents I3b and I3c of the transformer 3 in major periods;

FIG. 5 is an enlarged diagram of the pulse waveforms of the voltage V3 and the current I3 generated around the time T3 in a period when the load current is smaller than in the light-load period of FIG. 4, in the primary winding 3a of the transformer 3 of the switching power supply of Example 1, wherein

FIG. 18 is a circuit diagram showing the configuration of a switching power supply of Example 7 according to the present invention;

It will be recognized that some or all of the Figures are schematic representations for purposes of illustration and do not necessarily depict the actual relative sizes or locations of the elements shown.

DETAILED DESCRIPTION OF THE INVENTION

Preferred embodiment of the present invention is described below with reference to the preferred examples

EXAMPLE 1

Example 1 according to the present invention is a switching power supply comprising a full-bridge type converter.

Circuit Configuration of Example 1

Figure 1:
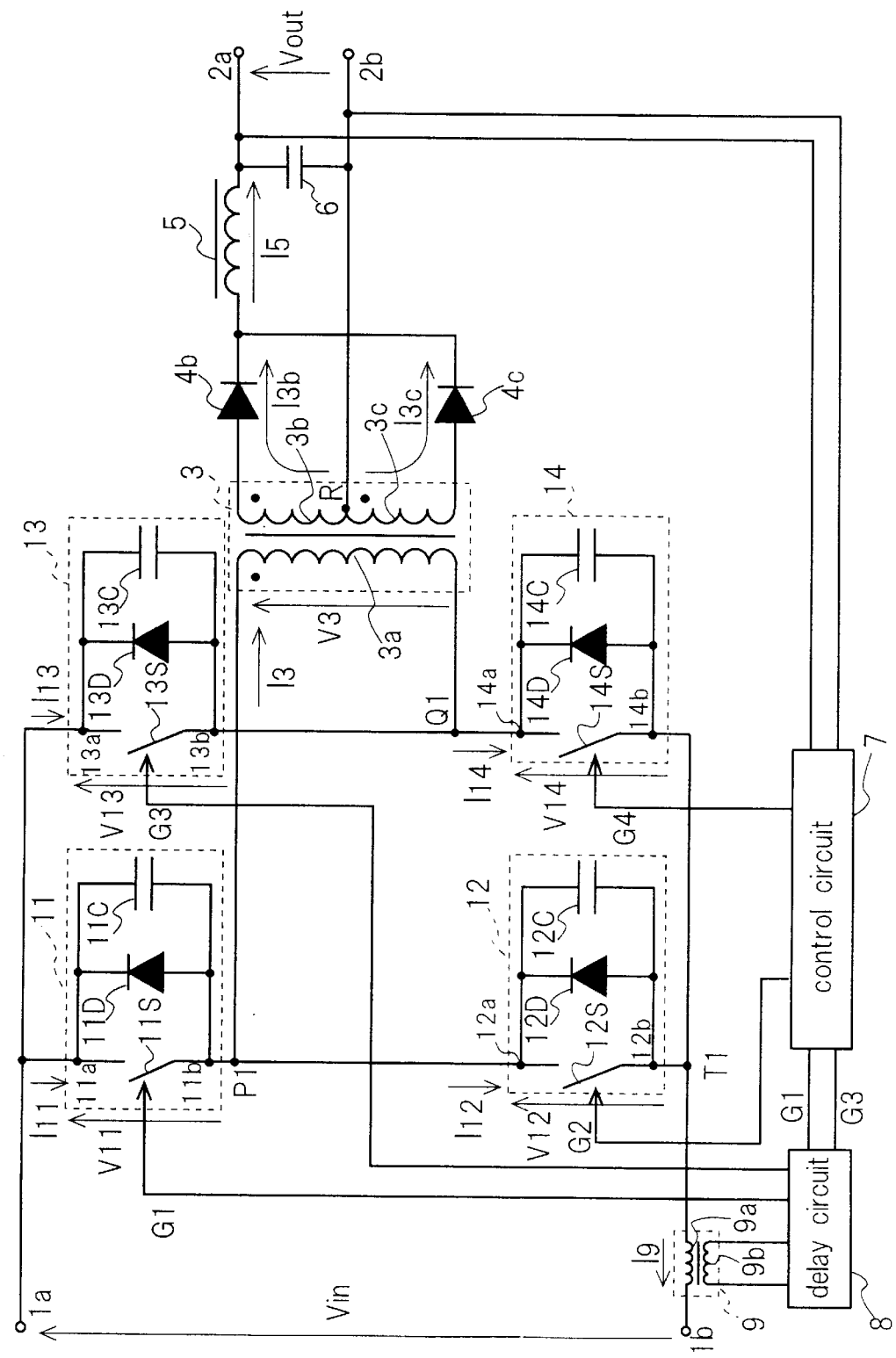
FIG. 1 is a circuit diagram showing the configuration of a switching power supply of Example 1 according to the present invention.
Figure 15:
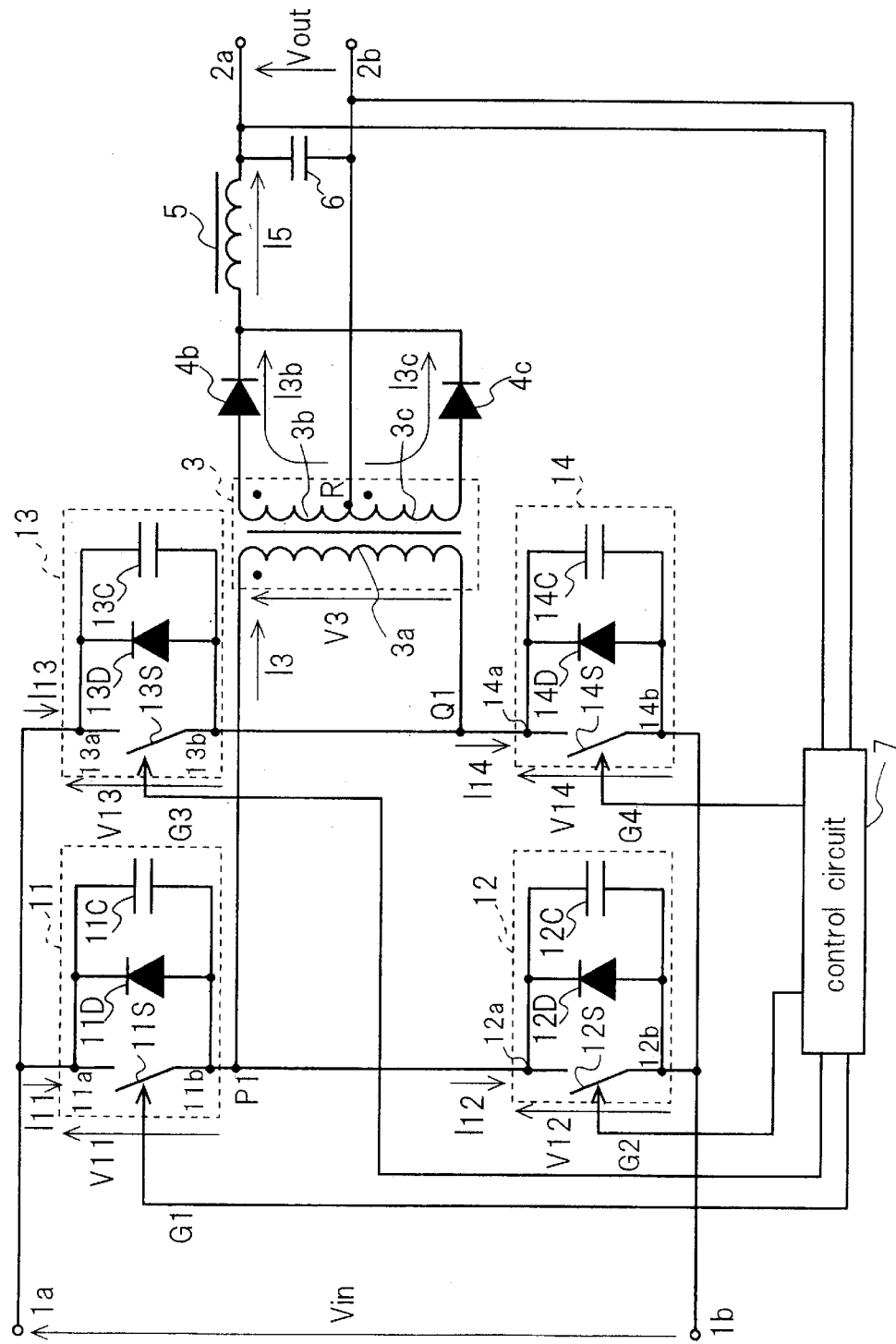
FIG. 15 is a circuit diagram showing the configuration of the switching power supply of the prior art.

FIG. 1 shows the circuit of the switching power supply of Example 1. As obviously understood by comparing the configuration of Example 1 with the prior art shown in FIG. 15, the configuration of the switching power supply of Example 1 differs from the prior art on the point of comprising a delay circuit 8 and a current transformer 9.

A DC power source is connected to input terminals 1a and 1b. The DC power source may be a substantial one obtained through rectifying the AC current from an AC power source. The input voltage from the DC power source is Vin. The high and low potential terminals of the DC power source are connected to the first input terminal 1a and the second input terminal 1b, respectively.

In Example 1, four switching sections 11, 12, 13 and 14 are provided. Each switching section 11, 12, 13 and 14 comprises a switching device, a diode and a capacitor interconnected in parallel between two ends of each switching section. Hereafter the respective ends of each switching section connected to the cathode and the anode of the diode are referred to as cathode and anode of each switching section.

The four switching sections are separated into two pairs each consisting of two switching sections interconnected in series, while the two pairs are interconnected in parallel. In FIG. 1, the first switching section 11 and the second switching section 12 are interconnected in series, while the third switching section 13 and the fourth switching section 14 are interconnected in series. The anode 11b of the first switching section 11 and the cathode 12a of the second switching section 12 are interconnected at a junction point P1, while the anode 13b of the third switching section 13 and the cathode 14a of the fourth switching section 14 are interconnected at a junction point Q1. The cathode 11a of the first switching section 11 and the cathode 13a of the third switching section 13 are connected to the first input terminal 1a. The anode 12b of the second switching section 12 and the anode 14b of the fourth switching section 14 are connected to the second input terminal 1b.

Each of the switching devices 11S, 12S, 13S and 14S preferably comprises a MOS-FET. Alternatively, each of them may comprise a bi-polar transistor or an IGBT.

The diodes 11D, 12D, 13D and 14D are preferably body diodes of the switching devices 11S, 12S, 13S and 14S, respectively. Alternatively, each of the diodes 11D, 12D, 13D and 14D may be an independent device separate from the switching devices 11S, 12S, 13S and 14S.

Four capacitors 11C, 12C, 13C and 14C are parasitic capacitors equivalently connected in parallel to the switching devices 11S, 12S, 13S and 14S, respectively. The capacitors 11C, 12C, 13C and 14C equivalently include not only the parasitic capacitors of the respective switching devices but also the parasitic capacitors of other wiring and a below-described transformer 3. Further, the capacitors 11C, 12C, 13C and 14C may include independent capacitor devices.

A primary winding 3a of a transformer 3 is connected between the junction points P1 and Q1. The transformer 3 comprises two secondary windings 3b and 3c. The junction point R between the secondary windings 3b and 3c is connected to a second output terminal 2b. The opposite end of the first secondary winding 3b to the junction point R is connected to the anode of a first rectifier diode 4b. The opposite end of the second secondary winding 3c to the junction point R is connected to the anode of a second rectifier diode 4c. Both the cathodes of the first rectifier diode 4b and the second rectifier diode 4c are connected to one end of a smoothing inductor 5. The other end of the smoothing inductor 5 is connected to a first output terminal 2a. One end of a smoothing capacitor 6 is connected between the first output terminal 2a and the smoothing inductor 5, while the other end of the smoothing capacitor 6 is connected to the second output terminal 2b.

A switching control circuit 7 is connected to the output terminals 2a and 2b so as to measure the output voltage Vout. On the other hand, the switching control circuit 7 is connected to the switching devices 11S, 12S, 13S and 14S so as to control the turning ON and OFF of the switching devices by switching signals G1, G2, G3 and G4, respectively. The switching devices are preferably MOS-FET's. The switching control circuit 7 is connected to the gates of the switching devices, thereby turning ON and OFF by changing the respective gate voltages. In this case, the switching signals G1, G2, G3 and G4 are preferably voltage signals for changing the gate potentials.

The switching control circuit 7 having the above-described configuration outputs the switching signals G1–G4 at a fixed switching frequency. The switching control circuit 7 further controls the duty ratios of the switching devices 11S, 12S, 13S and 14S based on the measured value of the output voltage. In this manner, the output voltage Vout is maintained at a constant value.

In Example 1, a current transformer 9 is provided as a load current sensing section. The primary winding 9a of the current transformer 9 is connected in series between the junction point T1 of the anode 12b of the second switching section 12 and the anode 14b of the fourth switching section 14, and the second input terminal 1b. The time average of the input current I9 flowing through the primary winding 9a of the current transformer 9 varies similarly to the time average of the load current.

Accordingly, the load current is known through measuring the input current I9.

A delay circuit 8 is connected to the secondary winding 9b of the current transformer 9, measures the input current I9 flowing through the primary winding 9a of the current transformer 9, and then compares the measured result with a predetermined threshold value. More specifically, the delay circuit 8 compares the input current I9 with the predetermined threshold value as follows. The input current I9 varies as described below, and hence the current flowing through the secondary winding 9b of the transformer 9 varies similarly. The delay circuit 8 smoothes the current flowing through the secondary winding 9b of the transformer 9, for example, with a low-pass filter. A comparator, for example, compares the time average of the substantially constant current obtained in the above-mentioned manner with the predetermined threshold value. The delay circuit 8 holds the switching signals G1 and G3 from the switching control circuit 7 for a delay time described below, when the time average of the current flowing through the secondary winding 9b of the transformer 9 is substantially smaller than the threshold value. After that, the delay circuit 8 outputs the switching signals G1 and G3 to the first switching device 11S and the third switching device 13S, respectively.

Operation in the Heavy-Load Period

In the heavy-load period, the switching power supply of Example 1 operates as follows.

As shown in FIG. 1, an input voltage Vin is provided across the input terminals 1a and 1b, while an output voltage Vout is provided across the output terminals 2a and 2b. The input voltage Vin and the output voltage Vout are maintained at substantially constant values.

In the heavy-load period, the average of the input current I9 is sufficiently large as described below. Accordingly, the delay circuit 8 does not substantially delay the switching signals G1 and G3. Therefore, the switching power supply of Example 1 operates similarly to the prior art shown in FIG. 15. That is, the pulse waveforms of the voltage and the current in each part of the circuit of Example 1 are similar to the prior art shown in FIG. 16.

Figure 16:
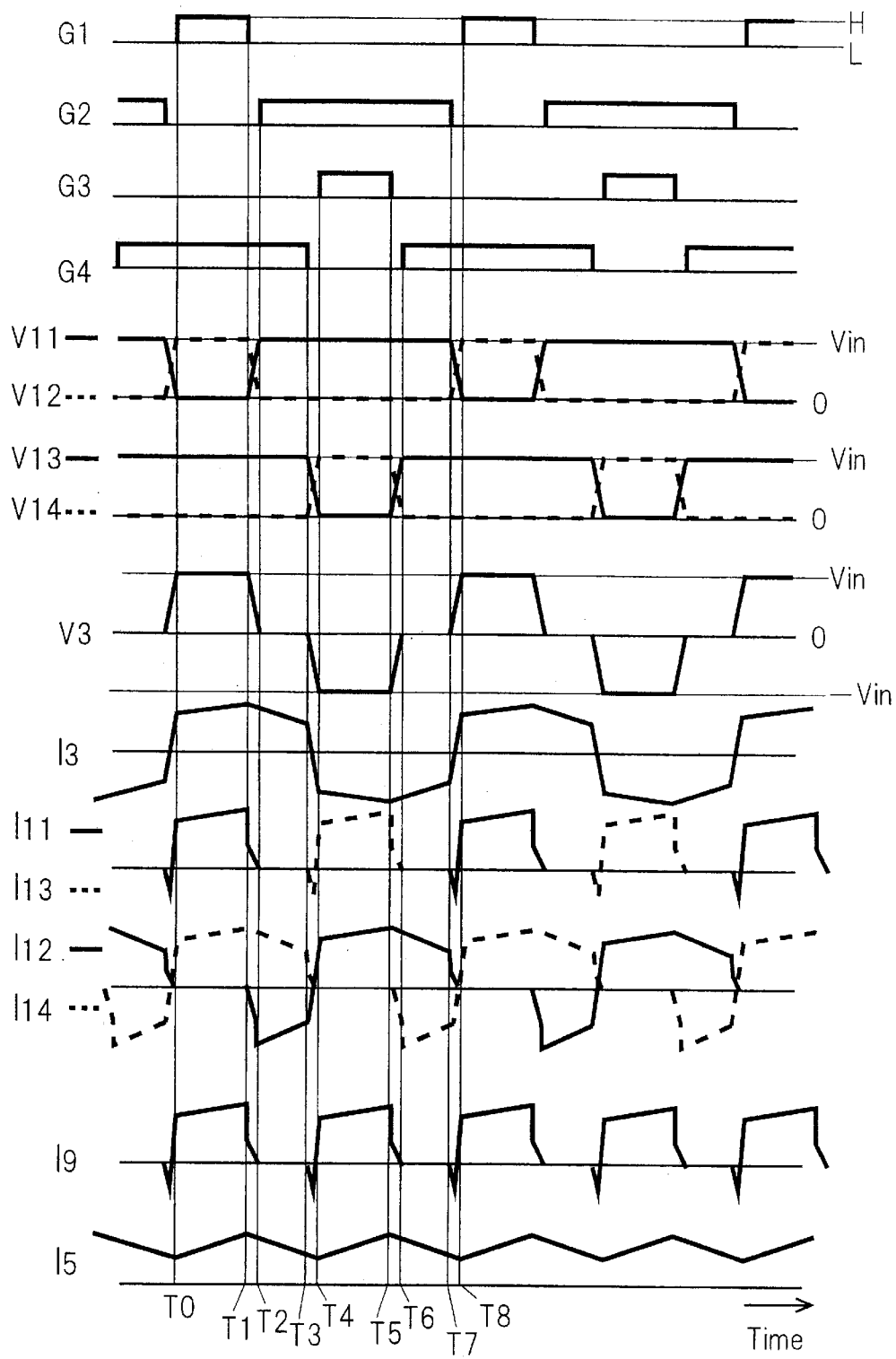
FIG. 16 is a waveform diagram of the voltage and current pulses generated in the heavy-load period in each part of switching power supplies of Example 1 and of the prior art.

As shown in FIG. 16, the switching signals G1, G2, G3 and G4 are rectangular waves each having a predetermined width. The switching devices 11S, 12S, 13S and 14S are ON, when the switching signals G1, G2, G3 and G4 are at high potential (H), respectively. In contrast, the switching devices 11S, 12S, 13S and 14S are OFF, when the switching signals G1, G2, G3 and G4 are at low potential (L), respectively.

Voltages V11, V12, V13 and V14 are provided across the switching sections 11, 12, 13 and 14, respectively. Each polarity of the voltages is defined as positive in the direction shown by each arrow in FIG. 1. That is, the potential at the end of each switching section located on the first input terminal 1a side is defined as positive with respect to the end thereof located on the second input terminal 1b side.

Currents I11, I12, I13 and I14 flow through the switching sections 11, 12, 13 and 14, respectively. Each polarity of the currents is defined as positive in the direction shown by each arrow in FIG. 1. That is, the positive direction is that directing from the end of each switching section located on the first input terminal 1a side to the end thereof located on the second input terminal 1b side.

A voltage V3 is provided across the primary winding 3a of the transformer 3. The polarity of the voltage V3 is defined as positive in the direction shown by the arrow in FIG. 1. That is, the potential at the junction point P1 is defined as positive with respect to the junction point Q1.

A current I3 flows through the primary winding 3a of the transformer 3. The polarity of the current I3 is defined as positive in the direction shown by the arrow in FIG. 1. That is, the positive direction is that directing from the junction point P1 to the junction point Q1.

A current I5 flows through the smoothing inductor 5. The polarity of the current I5 is defined as positive in the direction shown by the arrow in FIG. 1. That is, the positive direction is that directing from the end of the smoothing inductor 5 located on the transformer 3 side to the end thereof located on the first output terminal 2a side.

A current I9 flows through the primary winding 9a of the current transformer 9. That is, the current I9 is the input current to the switching power supply of Example 1. The polarity of the current I9 is defined as positive in the direction shown by the arrow in FIG. 1. That is, the positive direction is that directing from the end of the primary winding 9a located on the transformer 3 side to the end thereof located on the second input terminal 1b side.

At the time T0, the switching control circuit 7 changes the switching signal G1 from L to H, thereby turning ON the first switching device 11S. Then, a current I3 flows through the primary winding 3a of the transformer 3, since the fourth switching device 14S is already ON. At this time, substantial electromotive forces Vin/n and, −Vin/n, are generated in the first secondary winding 3b and the second secondary winding 3c of the transformer 3, respectively. Here, the ratios among the turn numbers of the primary winding 3a and the secondary windings 3b and 3c are n:1:1 (where n is generally a real number). Further, the input voltage Vin is assumed to be sufficiently larger than the output voltage Vout, and then, Vin/n>Vout, holds. Accordingly, the first rectifier diode 4b turns ON, whereby a substantially constant voltage, Vin/n−Vout, is provided across the smoothing inductor 5. As a result, the current I5 flowing through the smoothing inductor 5 increases linearly.

On the other hand, the current I3 flowing through the primary winding 3a equals to the sum of the exciting current for the transformer 3 and the equivalent primary current determined by the current (first secondary current) I3b flowing through the first secondary winding 3b and the current (second secondary current) I3c flowing through the second secondary winding 3c. Here, the equivalent primary current equals to the sum of: a) the first secondary current I3b multiplied by the ratio of the mutual inductance between the primary winding 3a and the first secondary winding 3b to the self-inductance of the primary winding 3a; and b) the second secondary current I3c multiplied by the ratio of the mutual inductance between the primary winding 3a and the second secondary winding 3c to the self-inductance of the primary winding 3a. The equivalent primary current in Example 1 substantially equals to (I3b+I3c)/n=I5/n. Here, each polarity of the secondary currents I3b and I3c is defined as positive in the direction shown by each arrow in FIG. 1.

As shown in FIG. 16, in the interval T0–T1, the voltage V3 applied across the primary winding 3a is maintained substantially at a constant value Vin. Accordingly, the exciting current in the current I3 increases substantially linearly. As a result, the current I3 flowing through the primary winding 3a increases substantially linearly, since the exciting current and the equivalent primary current both increase substantially linearly.

At a time T1, the switching control circuit 7 changes the switching signal G1 from H to L, thereby turning OFF the first switching device 11S. Then, a resonance occurs among the leakage inductance of the primary winding 3a, the first capacitor 11C and the second capacitor 12C, whereby the first capacitor 11C charges, while the second capacitor 12C discharges. Accordingly, the voltage V11 across the first switching section 11 increases from zero, while the voltage V12 across the second switching section 12 decreases from the maximum value Vin.

The voltage V11 across the first switching section 11 reaches the maximum value Vin, and at the same time, the voltage V12 across the second switching section 12 reaches zero. Then, the second diode 12D turns ON. At a time T2 immediately after that, the switching control circuit 7 changes the switching signal G2 from L to H, thereby turning ON the second switching device 12S. Thus, the ZVS is carried out for the turning ON of the second switching device 12S.

For a while after the time T2, the primary winding 3a is shunted through the second diode 12D or the second switching device 12S and the fourth switching device 14S that is already ON. At this time, only a substantially constant voltage, −Vout, is provided across the smoothing inductor 5, since the voltage V3 applied across the primary winding 3a is substantially zero. Accordingly, the current I5 flowing through the smoothing inductor 5 decreases linearly. As a result, the equivalent primary current in the current I3 flowing through the primary winding 3a decreases linearly in a similar manner to the current I5. On the other hand, the exciting current in the current I3 flowing through the primary winding 3a is maintained substantially at a constant value, since the voltage V3 applied across the primary winding 3a is substantially zero. As a result, the current I3 flowing through the primary winding 3a decreases linearly.

At a time T3, the switching control circuit 7 changes the switching signal G4 from H to L, thereby turning OFF the fourth switching device 14S. Then, a resonance occurs among the leakage inductance of the primary winding 3a, the third capacitor 13C and the fourth capacitor 14C, whereby the fourth capacitor 14C charges, while the third capacitor 13C discharges. Accordingly, the voltage V14 across the fourth switching section 14 increases from zero, while the voltage V13 across the third switching section 13 decreases from the maximum value Vin.

The voltage V14 across the fourth switching section 14 reaches the maximum value Vin, and at the same time, the voltage V13 across the third switching section 13 reaches zero. Then, the third diode 13D turns ON. At a time T4 immediately after that, the switching control circuit 7 changes the switching signal G3 from L to H, thereby turning ON the third switching device 13S. Thus, the ZVS is carried out for the turning ON of the third switching device 13S.

When the third switching device 13S turns ON, the voltage, −Vin, is provided across the primary winding 3a through the third switching device 13S and the second switching device 12S that is already ON. Then, the current I3 flowing through the primary winding 3a rapidly reverses the direction.

On the other hand, substantial electromotive forces, −Vin/n, and Vin/n are generated in the first secondary winding 3b and the second secondary winding 3c, respectively. Accordingly, the second rectifier diode 4c turns ON, whereby a substantially constant voltage, Vin/n−Vout, is provided across the smoothing inductor 5. As a result, the current I5 flowing through the smoothing inductor 5 increases linearly. Further, the current I3 flowing through the primary winding 3a increases linearly in the opposite direction to that before the time T3.

At a time T5, the switching control circuit 7 changes the switching signal G3 from H to L, thereby turning OFF the third switching device 13S. Then, a resonance occurs among the leakage inductance of the primary winding 3a, the third capacitor 13C and the fourth capacitor 14C, whereby the third capacitor 13C charges, while the fourth capacitor 14C discharges. Accordingly, the voltage V13 across the third switching section 13 increases from zero, while the voltage V14 across the fourth switching section 14 decreases from the maximum value Vin.

The voltage V13 across the third switching section 13 reaches the maximum value Vin, and at the same time, the voltage V14 across the fourth switching section 14 reaches zero. Then, the fourth diode 14D turns ON. At a time T6 immediately after that, the switching control circuit 7 changes the switching signal G4 from L to H, thereby turning ON the fourth switching. device 14S. Thus, the ZVS is carried out for the turning ON of the fourth switching device 14S.

For a while after the time T6, the primary winding 3a is shunted through the fourth diode 14D or the fourth switching device 14S, and the second switching device 12S which is already ON. At this time, only a substantially constant voltage, −Vout, is provided across the smoothing inductor 5, since the voltage V3 applied across the primary winding 3a is substantially zero. Accordingly, the current I5 flowing through the smoothing inductor 5 decreases linearly. As a result, the equivalent primary current in the current I3 flowing through the primary winding 3a decreases linearly, in a similar manner to the current I5. On the other hand, the exciting current in the current I3 flowing through the primary winding 3a is maintained substantially at a constant value, since the voltage V3 applied across the primary winding 3a is substantially zero. As a result, the current I3 flowing through the primary winding 3a decreases linearly.

At a time T7, the switching control circuit 7 changes the switching signal G2 from H to L, thereby turning OFF the second switching device 12S. Then, a resonance occurs among the leakage inductance of the primary winding 3a, the first capacitor 11C and the second capacitor 12C, whereby the second capacitor 12C charges, while the first capacitor 11C discharges. Accordingly, the voltage V12 across the second switching section 12 increases from zero, while the voltage V11 across the first switching section 11 decreases from the maximum value Vin.

The voltage V12 across the second switching section 12 reaches the maximum value Vin, and at the same time, the voltage V11 across the first switching section 11 reaches zero. Then, the first diode 11D turns ON. At a time T8 immediately after that, the switching control circuit 7 changes the switching signal G1 from L to H, thereby turning ON the first switching device 11S. Thus, the ZVS is carried out for the turning ON of the first switching device 11S.

When the first switching device 11S turns ON, a voltage Vin is provided across the primary winding 3a through the first switching device 11S and the fourth switching device 14S that is already ON. Then, the current I3 flowing through the primary winding 3a rapidly reverses the direction again. After that, the operation described above is repeated.

Transient intervals T1–T2, T3–T4, T5–T6 and T7–T8 in which each switching device turns from ON to OFF or vice versa are referred to as dead time. In general, each length of the dead times is sufficiently shorter than the intervals T0–T1, T2–T3, T4–T5 and T6–T7 in which each switching device is stably ON or OFF. In Example 1, the former is a few tens nsec to a few hundreds nsec, while the latter is approximately a few $\mu$ sec. Under the approximation of neglecting the dead time, the relation between the input voltage Vin and the output voltage Vout is obtained as follows.

The interval length is assumed to be Ton both for the interval (ON-time) T0–T1 in which the first switching device 11S is ON and the ON-time T4–T5 of the third switching device 13S. Since the voltage, Vin/n–Vout, is provided across the smoothing inductor 5 in each of the above-described ON-times, the magnetic flux stored in the smoothing inductor 5 increases by (Vin/n–Vout)×Ton.

On the other hand, the time length is assumed to be Toff both for interval T1–T4 from the turning OFF of the first switching device 11S to the turning ON of the third switching device .13S, and for interval T5–T8 from the turning OFF of the third switching device 13S to the turning ON of the first switching device 11S. Since the voltage, –Vout, is provided across the smoothing inductor 5 in each of the above-described intervals, the magnetic flux stored in the smoothing inductor 5 decreases by Vout×Toff.

Accordingly, the condition for the reset of the smoothing inductor 5, which is the condition for the balancing between the increase and the decrease in the magnetic flux in the smoothing inductor 5, is expressed by the following Equation (1).

$$(Vin/n-Vout) \times Ton = Vout \times Toff \quad (1)$$

Therefore, the relation between the input voltage Vin and the output voltage Vout is expressed by the following Equation (2).

$$Vout = \delta \times Vin/n \text{ with } \delta = Ton/(Ton+Toff) \quad (2)$$

As is known from Equation (2), the output voltage Vout is maintained substantially constant by controlling the duty ratio $\delta$ of the turning ON and OFF of the first switching device 11S and the third switching device 13S.

Further, the switching loss is small, since all of the switching devices 11S, 12S, 13S and 14S are turned ON with the above-described ZVS.

The input current I9 flowing through the primary winding 9a of the current transformer 9 equals to the sum of the current I12 flowing through the second switching section 12 and the current I14 flowing through the fourth switching section 14. Accordingly, the change in the input current I9 is shown in FIG. 16. By virtue of this change, the delay circuit 8 can measure the value of the input current I9 using the current transformer 9.

Operation in the Light-Load Period

In the light-load period, the switching power supply of Example 1 operates as follows. The input voltage Vin and the output voltage Vout are maintained substantially constant in the light-load period similarly to the heavy-load period.

Figure 2:
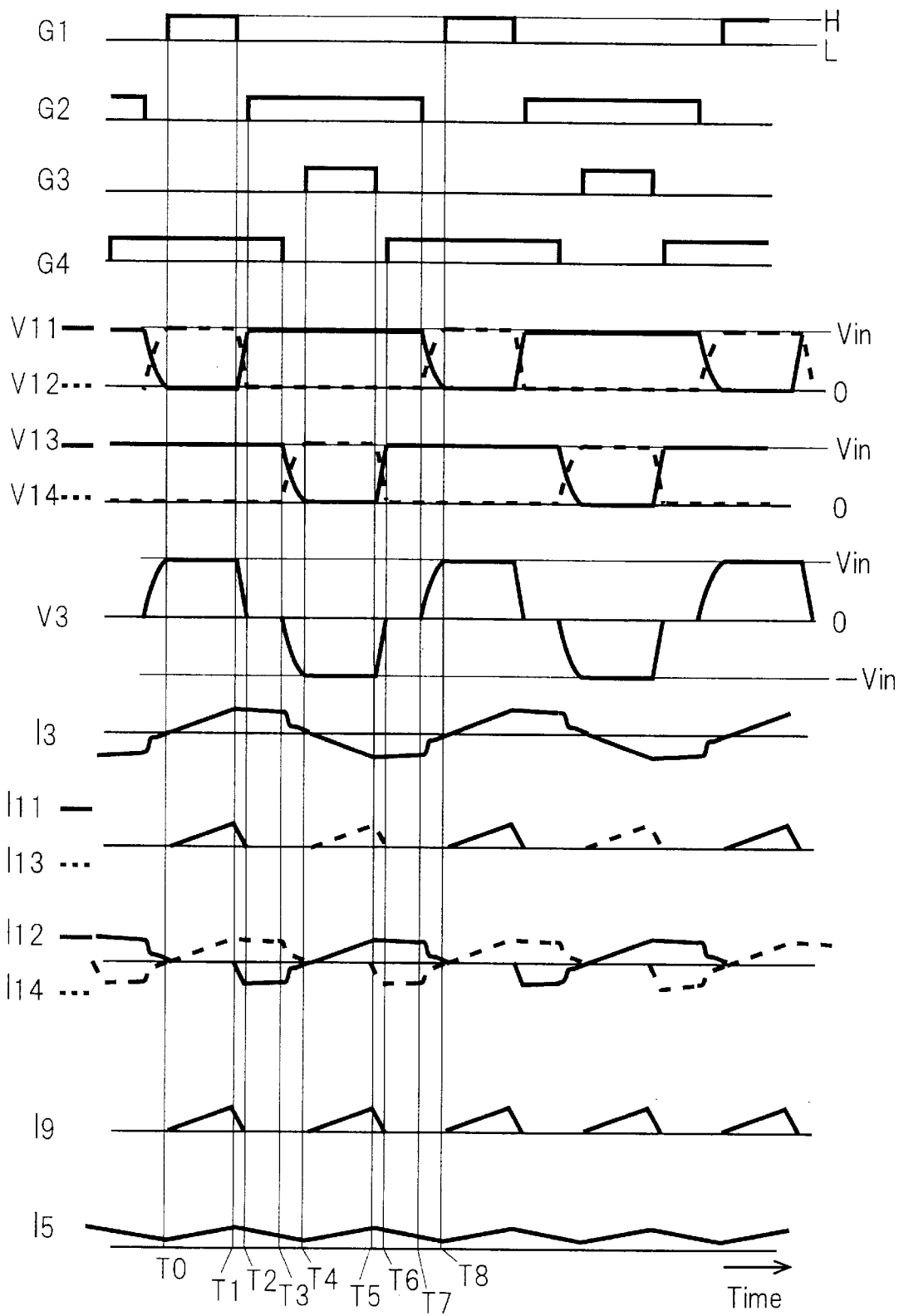
FIG.2 is a waveform diagram of the voltage and current pulses generated in the light-load period in each part of the switching power supply of Example 1.

FIG. 2 shows the waveforms of the voltage and current pulses generated in the light-load period in each part of the switching power supply of Example 1. In FIG. 2 and FIG. 16, the same reference signs designate the voltages and the currents in the same parts of the circuit of Example 1 shown in FIG. 1, and the explanation of the voltages and the currents in the heavy-load period is cited.

In comparison with the heavy-load period shown in FIG. 16, the current I5 flowing through the smoothing inductor 5 is small in the light-load period shown in FIG. 2. Accordingly, the current I3 flowing through the primary winding 3a of the transformer 3 and the input current I9 flowing through the primary winding 9a of the current transformer 9 both are small.

The delay circuit 8 senses the smaller time average of the input current I9 than a predetermined threshold value. On the sensing, the delay circuit 8 delays the switching signals G1 and G3 input from the switching control circuit 7 for a delay time, which is set as described below. In Example 1, the threshold value is preferably set to be about 20% of the average of the input current I9 in the heavy-load period.

The switching signals G1 and G3 are output to the first switching device 11S and the third switching device 13S, respectively, with the delay for the predetermined delay time in contrast to the heavy-load period. Thus, as is clear from the comparison between FIG. 2 and FIG. 16, the time lengths of the interval T3–T4 and the interval T7–T8 in the light-load period are longer than in the heavy-load period.

The operation during the interval T3–T4 of the switching power supply of Example 1 is described below with contrast between the light-load period and the heavy-load period. The operation during the interval T7–T8 is similar to that during the interval T3–T4, and hence would be easily understood from the following description. The operation during other intervals in the light-load period is similar to that in the heavy-load period. Accordingly, the description of the operation is omitted for the intervals other than the interval T3–T4.

Immediately before the time T3, the second switching device 12S and the fourth switching device 14S are ON, thereby shunting the primary winding 3a. The current I3 flowing through the primary winding 3a flows from the junction point P1 to the junction point Q1, and the voltage V3 applied across the primary winding 3a is substantially zero. Accordingly, no substantial electromotive force from the primary is generated in the secondary windings 3b and 3c of the transformer 3. At this time, a first secondary current I3b flows through the secondary winding 3b in the forward direction of the first rectifier diode 4b. At the same time, a second secondary current I3c flows through the secondary winding 3c in the forward direction of the second rectifier diode 4c.

The secondary windings 3b and 3c have substantially the same self-inductances. Further, the mutual inductance there between is sufficiently negligible in comparison with the self-inductance. Therefore, the time-dependent changes in the secondary currents I3b and I3c substantially cancel out. As a result, the current I5 flowing through the smoothing inductor 5 decreases sufficiently slowly in comparison with the change after the time T3. Accordingly, the magnetic energy stored in the exciting inductance of the transformer 3 does not substantially change. Therefore, the magnetic energy stored in the leakage inductance of the primary winding 3a solely contributes to the operation in the primary.

When the fourth switching device 14S turns OFF at the time T3, a resonance occurs among the leakage inductance of the primary winding 3a, the third capacitor 13C and the fourth capacitor 14C, whereby the fourth capacitor 14C charges, while the third capacitor 13C discharges. Accordingly, the voltage V14 across the fourth switching section 14 increases from zero, while the voltage V13 across the third switching section 13 decreases from the maximum value Vin. At the same time, the voltage V3 applied across the primary winding 3a increases in the negative direction. Then, an electromotive force from the primary is generated in the secondary windings 3b and 3c. The electromotive force acts on the first secondary winding 3b so as to reduce the first secondary current I3b, and acts on the second secondary winding 3c so as to increase the second secondary current I3c.

[(A) Operation during Interval T3–T4 in the Heavy-Load Period]

Figure 3B:
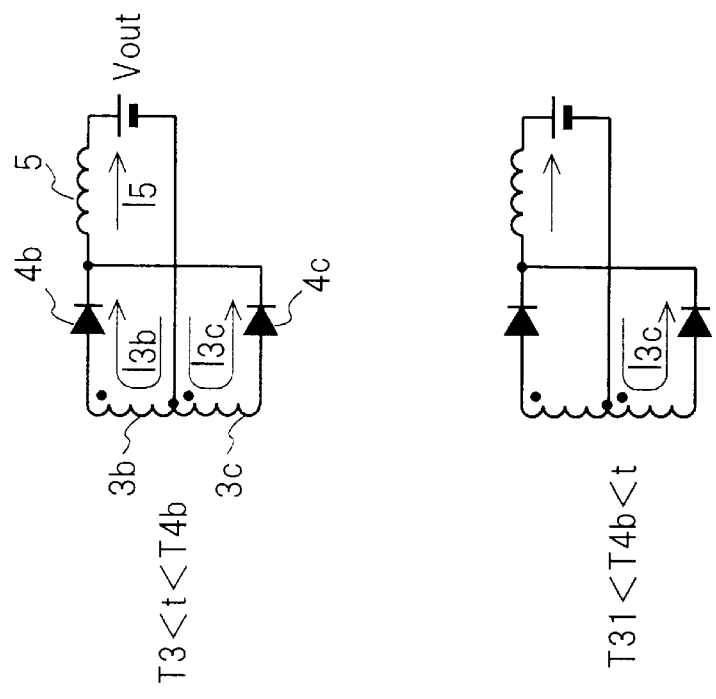
FIG. 3B is a diagram in which arrows schematically indicate the secondary currents I3b and I3c of the transformer 3 in major periods.
Figure 3A:
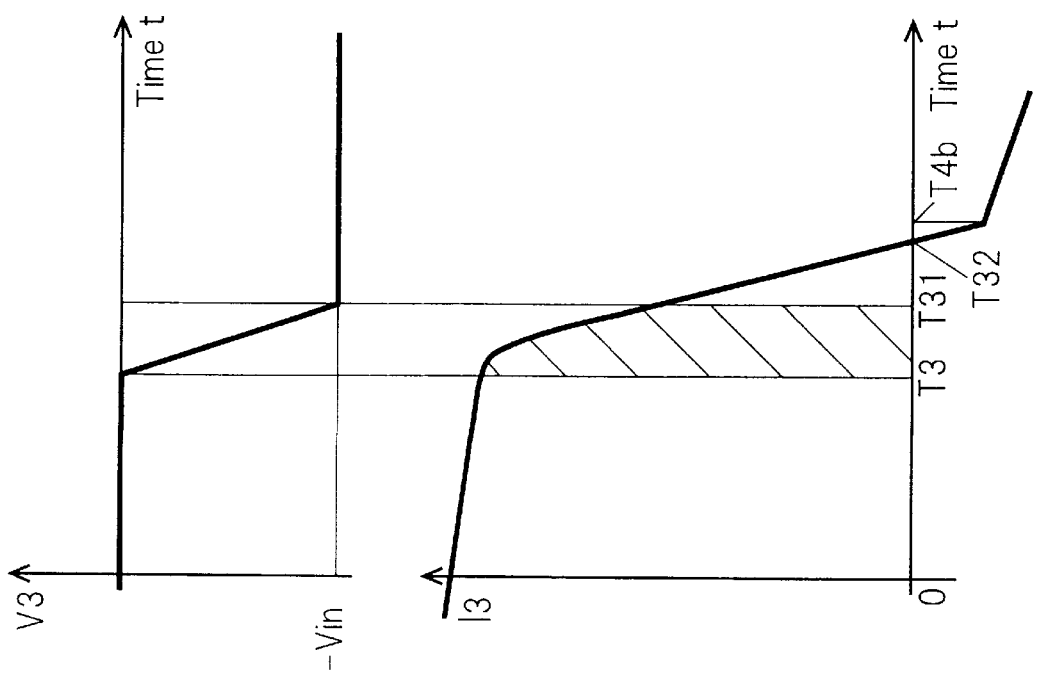
FIG. 3A is a diagram of the pulse waveforms.

FIG. 3 is an enlarged diagram of the pulse waveforms of the voltage V3 applied across the primary winding 3a of the transformer 3 and the current I3 flowing through the primary winding 3a around the time T3 in the heavy-load period. FIG. 3A is a diagram of the pulse waveforms. FIG. 3B is a diagram in which arrows schematically indicate the secondary currents I3b and I3c of the transformer 3 in major periods shown in FIG. 3A.

In the heavy-load period, the current I5 flowing through the smoothing inductor 5 is sufficiently large. Hence, the first secondary current I3b is sufficiently large. Accordingly, the voltage V13 across the third switching section 13 can reach zero as shown in FIG. 16, when the first secondary current I3b flows through the first secondary winding 3b and the second secondary current I3c flows through the second secondary winding 3c as shown in FIG. 3B.

At the time T31 shown in FIG. 3A, the voltage V13 across the third switching section 13 reaches zero. In the interval T3–T31, the leakage inductance L1 of the primary winding 3a contributes to the resonance with the third capacitor 13C and the fourth capacitor 14C. By virtue of the resonance, the current I3 flowing through the primary winding 3a decreases in the shape of a substantial sinewave as shown in FIG. 3A. The resonance period, namely, the period of the substantial sinewave is proportional to the square root of the product between the leakage inductance L1 of the primary winding 3a and the combined capacitance of the third capacitor 13C and the fourth capacitor 14C.

After the time T31, the voltage V13 across the third switching section 13 is maintained at zero (FIG. 16), since the third diode 13D (FIG. 1) is ON. At the time T32, the current I3 flowing through the primary winding 3a becomes zero, and then the direction of the current I3 is reversed. Accordingly, by turning ON the third switching device 13S before the time T32, the ZVS is carried out for the turning ON of the third switching device 13S. Hereinafter, "the dead time satisfies the ZVS condition" refers to that the dead time for the interval T3–T4 is set with the time T4 falling within the interval T31–T32

The area of the shaded region of FIG. 3A determines the time length of the interval T3–T31. The area of the shaded region corresponds to the amount of charge to be moved away from both the third capacitor 13C and the fourth capacitor 14C so that the voltage V13 across the third switching section 13 reaches zero.

After the time T31, the voltage V3 applied across the primary winding 3a is maintained at a constant value, −Vin. Accordingly, the current I3 flowing through the primary winding 3a decreases linearly. During the time when the secondary currents I3b and I3c flow simultaneously, the slope of the linear decrease in the current I3 flowing through the primary winding 3a is inversely proportional to the leakage inductance L1 of the primary winding 3a. Further, the slope of the change in the current I3 flowing through the primary winding 3a is substantially unchanged before and after the time T31. Accordingly, ¼ of the substantial resonance period of the resonance in the interval T3–T31 is longer than the time length of the interval T3–T31, but shorter than the time length of the interval T3–T32. Therefore, by setting the dead time to be ¼ of the resonance period, the dead time satisfies the ZVS condition.

After the time T3, the first secondary current I3b flowing through the first secondary winding 3b continues to decrease. In the heavy-load period, the first secondary current I3b at the time T3 is sufficiently large. Accordingly, the first secondary current I3b becomes zero at the time T4b after the time T31, as shown in FIG. 3A, whereby the first rectifier diode 4b turns OFF.

On reaching the time T4b, the first secondary current I3b becomes zero, as shown in FIG. 3B, and only the second secondary current I3c flows through the second secondary winding 3c. Then, the current I5 flowing through the smoothing inductor 5 starts a substantial change. Preferably, the inductance of the smoothing inductor 5 is sufficiently larger than the self-inductance of the primary winding 3a, the self-inductance of the second secondary winding 3c, and the mutual inductance therebetween. Accordingly, the magnetic energy stored in the transformer 3 starts a large change with the change in the magnetic energy stored in the smoothing inductor 5. As a result, the whole of the self-inductance L of the primary winding 3a starts to contribute to the operation in the primary. The voltage V3 applied across the primary winding 3a is maintained at a constant value, −Vin. Accordingly, the current I3 flowing through the primary winding 3a decreases linearly with a slope inversely proportional to the self-inductance L of the primary winding 3a. After the change in direction, the current I3 flowing through the primary winding 3a further increases in the absolute value thereof.

[(B) Operation during Interval T3–T4 in the Light-Load Period]

With decreasing of the time average of the load current, the first secondary current I3b at the time T3 becomes smaller. In addition, the time length becomes shorter between the time T3 and the time when the first secondary current I3b becomes zero and the first rectifier diode 4b turns OFF. In short, the time T4b goes near to the time T3. Further, the current I3 flowing through the primary winding 3a becomes smaller. On the other hand, the area of the shaded region of FIG. 3A is constant independently of the value of the load current. The area of the shaded region corresponds to the amount of charge to be moved away from both the third capacitor 13C and the fourth capacitor 14C so that the voltage V13 across the third switching section 13 reaches zero. Therefore, the time length of the interval T3–T31 becomes longer.

When the time average of the load current becomes much smaller, at last the time T4b substantially agrees with the time T31. In the light-load period, the time average of the load current is smaller than the case that the time T4b agrees with the time T31.

FIG. 4 is an enlarged diagram of the pulse waveforms both of the voltage V3 applied across the primary winding 3a of the transformer 3 and the current I3 flowing through the primary winding 3a around the time T3 in the light-load period. FIG. 4A is a diagram of the pulse waveforms. FIG. 4B is a diagram in which arrows schematically indicate the secondary currents I3b and I3c of the transformer 3 in major periods shown in FIG. 4A.

At the time T31, the voltage V13 across the third switching section 13 reaches zero. At the time T4b, the first secondary current I3b becomes zero, and hence the. first rectifier diode 4b turns OFF. As shown in FIG. 4A, in the light-load period, the time T4b precedes the time T31.

As shown in FIG. 4B, in the interval T3–T4b, the secondary currents I3b and I3c flow through the secondary windings 3b and 3c, respectively. In the state, the leakage inductance L1 of the primary winding 3a contributes to the operation in the primary as described above. Accordingly, the current I3 flowing through the primary winding 3a in the interval T3–T4b decreases in the shape of a substantial sinewave by virtue of the resonance among the leakage inductance L1 of the primary winding 3a, the third capacitor 13C and the fourth capacitor 14C.

On reaching the time T4b, the first secondary current I3b becomes zero. After that, in the interval T4b–T31, only the second secondary current I3c flows as shown in FIG. 4B. In the state, the self-inductance L of the primary winding 3a contributes to the operation in the primary. Accordingly, after the time T4b, the current I3 flowing through the primary winding 3a decreases in the shape of a substantial sinewave by virtue of the resonance among the self-inductance L of the primary winding 3a, the third capacitor 13C and the fourth capacitor 14C. In general, the self-inductance L is much larger than the leakage inductance L1 (that is, L>>L1). Accordingly, the resonance period becomes much larger at the time T4b in comparison with the previous value. With this increase in the resonance period, the decreasing of the current I3 is much slowed down at the time T4b in comparison with the previous value, as shown in FIG. 4A.

After the time T31, the third diode 13D (FIG. 1) turns ON, and hence the voltage V13 across the third switching section 13 is maintained at zero. At the time T32, the current I3 flowing through the primary winding 3a becomes zero, and then the direction of the current I3 is reversed. Accordingly, by turning ON the third switching device 13S in the interval T31–T32, the ZVS is carried out for the turning ON of the third switching device 13S.

Similarly to FIG. 3A, the area of the shaded region of FIG. 4A indicates the amount of charge to be moved away from both the third capacitor 13C and the fourth capacitor 14C so that the voltage V13 across the third switching section 13 reaches zero. The amount of charge is substantially unchanged in both the heavy-load period and the light-load period. Accordingly, the area of the shaded region of FIG. 3A is substantially equal to that of FIG. 4A. As is clear in comparison between both of the shaded regions, the current I3 flowing through the primary winding 3a at the time T3 in the light-load period is smaller than in the heavy-load period. Accordingly, the time length of the interval T3–T31 in the light-load period is longer than in the heavy-load period.

After the time T31, similarly to the heavy-load period, the voltage V3 applied across the primary winding 3a is maintained at a constant value, −Vin. Accordingly, the current I3 flowing through the primary winding 3a decreases linearly. The slope of this linear decrease is inversely proportional to the self-inductance L of the primary winding 3a.

The current I3 at the time T3 is small in the light-load period. On the other hand, the resonance period becomes longer at the time T4b as described above, thereby extending the time length between the time T3 and the time when the current I3 becomes zero. Accordingly, by extending the interval T3–T4 and equivalently the dead time, the dead time satisfies the ZVS condition.

[(C) Operation during the Interval T3–T4 When the Load Current is Much Smaller than in the Light-Load Period of Case (B)]

Figure 5B:
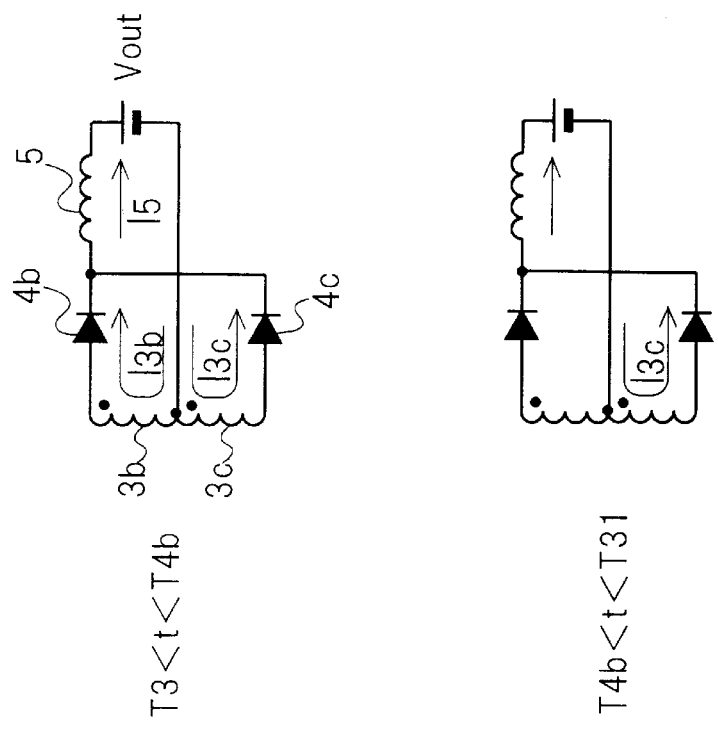
FIG. 5B is a diagram in which arrows schematically indicate the secondary currents I3b and I3c of the transformer 3 in major periods.
Figure 5A:
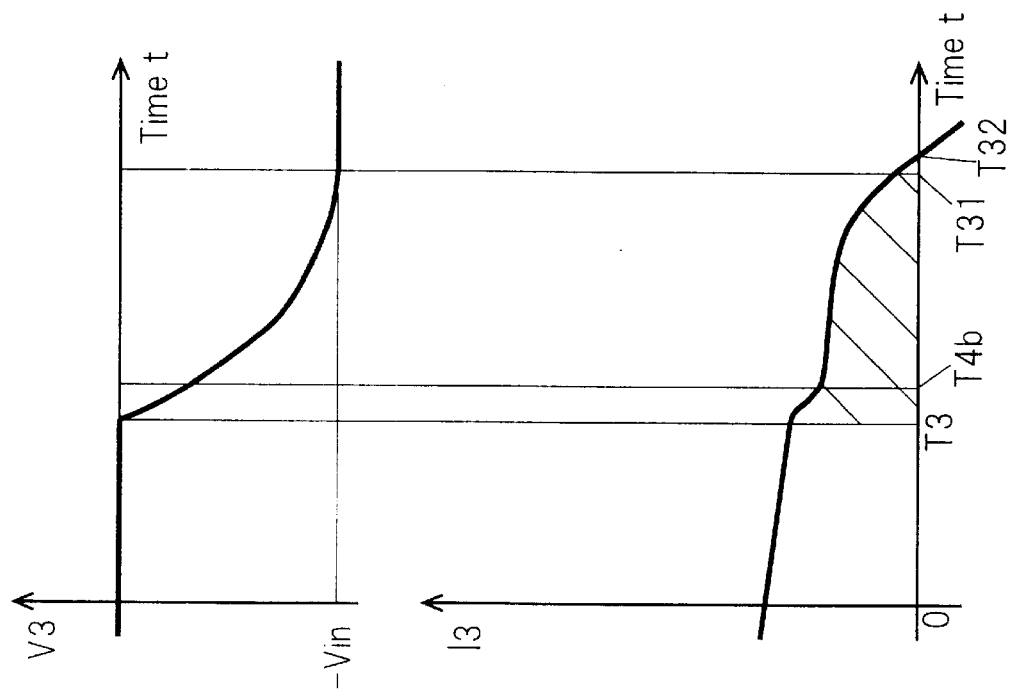
FIG. 5A is a diagram of the pulse waveforms.

FIG. 5 is an enlarged diagram of the pulse waveforms both of the voltage V3 applied across the primary winding 3a of the transformer 3 and the current I3 flowing through the primary winding 3a around the time T3 in a period when the load current is much smaller than in the light-load period of the above-mentioned case (B). FIG. 5A is a diagram of the pulse waveforms. FIG. 5B is a diagram in which arrows schematically indicate the secondary currents I3b and I3c of the transformer 3 in major periods shown in FIG. 5A.

With the further decreasing of the time average of the load current in comparison with the case (B) of the light-load period, the current I5 flowing through the smoothing inductor 5 at the time T3 becomes much smaller, and hence the current I3 flowing through the primary winding 3a becomes much smaller. On the other hand, each area of the whole shaded regions of FIG. 4A and FIG. 5A remains constant. Each area of the shaded regions corresponds to the amount of charge to be moved away from both the third capacitor 13C and the fourth capacitor 14C. Accordingly, a smaller time average of the load current causes a more delay of the time T31 at which the voltage V13 across the third switching section 13 becomes zero.

In the light-load period, the first rectifier diode 4b turns OFF before the time T31. In other words, the time T4b precedes the time T31. In the case, the time length of the interval T3–T4b is substantially constant at approximately ¼ of the resonance period determined by the leakage inductance L1 of the primary winding 3a.

As a result, when the time average of the load current is sufficiently small, the interval T4b–T31 of the resonance by the self-inductance L of the primary winding 3a is sufficiently long to neglect the interval T3–T4b of the resonance by the leakage inductance L1 of the primary winding 3a, as shown in FIG. 5A. In the light-load period of this extent, the interval T3–T4 and equivalently the dead time are set to be ¼ of the resonance period determined by the self-inductance L of the primary winding 3a. Thereby, the dead time satisfies the ZVS condition.

The period of the resonance among the primary winding 3a, the third capacitor 13C and the fourth capacitor 14C cannot substantially exceed the length determined by the self-inductance L of the primary winding 3a. Accordingly, the time T31 agrees with the time T32, when the current I3 flowing through the primary winding 3a at the time T3 is much smaller. Therefore, the dead time of any time length does not satisfy the ZVS condition.

Figure 6:
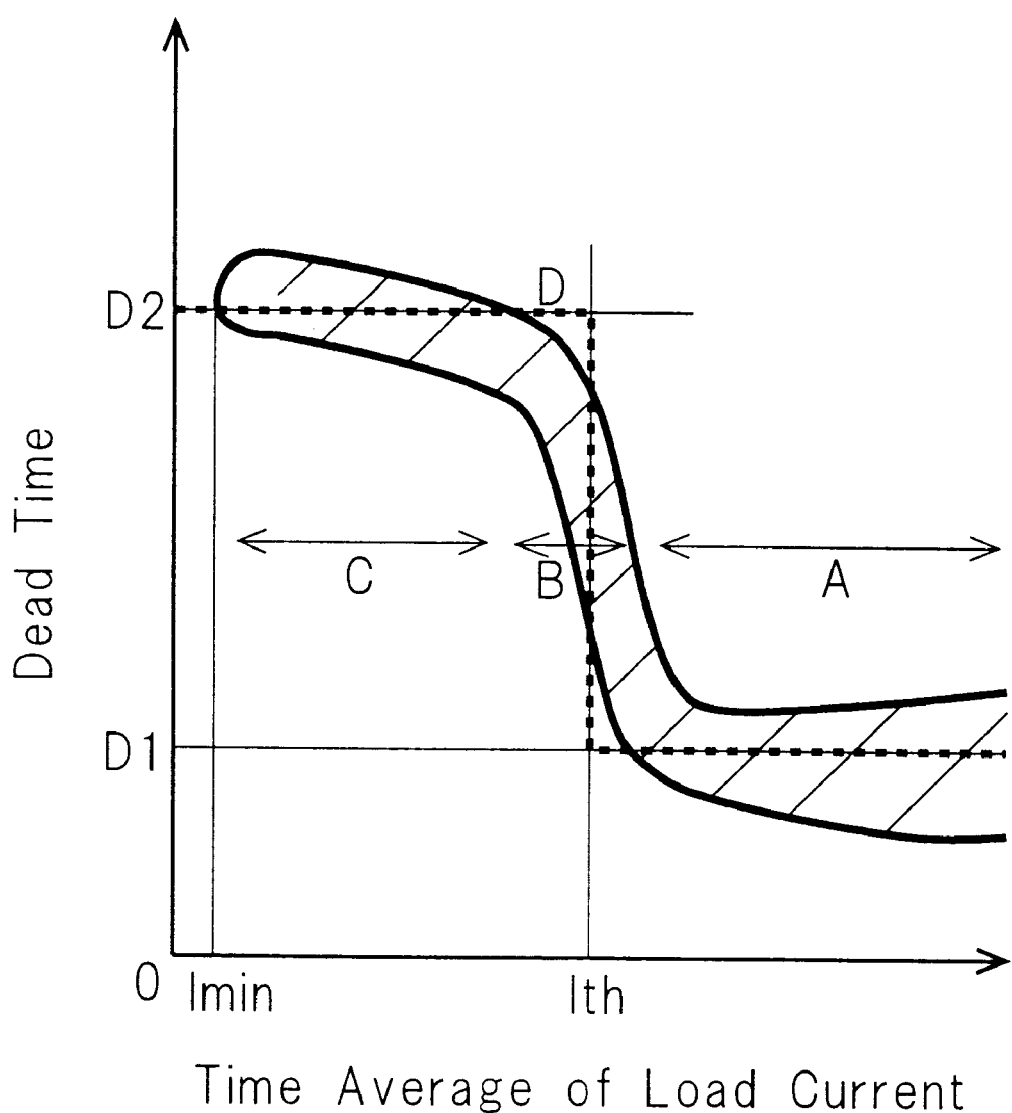
FIG. 6 is a diagram schematically showing the region of dead time satisfying the ZVS condition for various values of the time average of the load current in the switching power supply of Example 1.

FIG. 6 is a diagram schematically showing the region of the dead time satisfying the ZVS condition for various values of the time average of the load current for case (A) of the heavy-load period, case (B) of the light-load period, and case (C) of light-load period. FIG. 6 is obtained from the above-mentioned analysis of the operation in Example 1 for case (A) of the heavy-load period, case (B) of the light-load period, and case (C) of light-load period, as well as the consideration based on the experiments on the operation. The horizontal axis in FIG. 6 indicates the value of the load current. The regions indicated by arrows A, B and C parallel to the horizontal axis correspond to case (A) of the heavy-load period, case (B) of the light-load period, and case (C) of light-load period, respectively. Depending on the value of the load current, the dead time is adjusted to fall within the region shown in FIG. 6. Thus, the dead time can substantially satisfy the ZVS condition for the load current of any value.

In Example 1, particularly, the dead time is set to be ¼ of the resonance period determined by the leakage inductance L1 of the primary winding 3a (D1 of FIG. 6), when the time average of the load current falls within the region specified by arrow A. In addition, the dead time is set to be ¼ of the resonance period determined by the self-inductance L of the primary winding 3a (D2 of FIG. 6), when the time average of the load current falls within the region specified by arrow C. In Example 1, the dead time satisfies the ZVS condition by the setting. Accordingly, in Example 1, a threshold value Ith is firstly defined within the range specified by arrow B as shown in FIG. 6. The dead time is set at the values D1 and D2, when the load current is substantially larger and smaller than the threshold value Ith, respectively. That is, the dead time is set on the bent line D shown as the broken line in FIG. 6.

Setting the dead time at D1 in the heavy-load period is the conventional approach of the known switching control circuit 7 (FIG. 1). In addition to the conventional approach, in Example 1, the delay time of the delay circuit 8 is set to be D2−D1≈D2 (because D2>>D1), when the load current is substantially smaller than the threshold value Ith. The time average of the load current correlates with the time average of the input current I9 flowing through the primary winding 9a of the current transformer 9. Accordingly, a threshold value I9th can be set for the input current I9, correspondingly to the threshold value Ith for the load current. When the input current I9 is substantially smaller than the threshold value I9th, the load current is also substantially smaller than the threshold value Ith.

Thus, in Example 1, the dead time can be set with the delay circuit 8, whereby the ZVS can be carried out for the turning ON of the third switching device 13S even in the light-load period.

The range of the dead time for satisfying the ZVS condition shown in FIG. 6 has a lower limit Imin. For a load current smaller than the lower limit Imin, the dead time of any time length cannot satisfy the ZVS condition. However, in this case, the dead time is set at D2 as described above. Thereby, in Example 1, the amount of charge left in the third capacitor 13C (FIG. 1) at the time T4 (FIG. 2) is smaller than in the prior art in which the dead time is fixed at D1. Accordingly, the switching loss at the time T4 is reduced in Example 1 in comparison with the prior art.

In Example 1, as shown by the bent line D in FIG. 6, the dead time is set discretely with a discontinuation at the threshold value Ith for load current. However, the dead time may be otherwise set on any straight or curved line in the region specified by arrow B in FIG. 6, as long as the line is included within the region satisfying the ZVS condition.

EXAMPLE 2

Example 2 of the present invention is described below. In Example 2, the present invention is implemented in a switching power supply comprising a half-bridge type converter.

Circuit Configuration of Example 2

Figure 7:
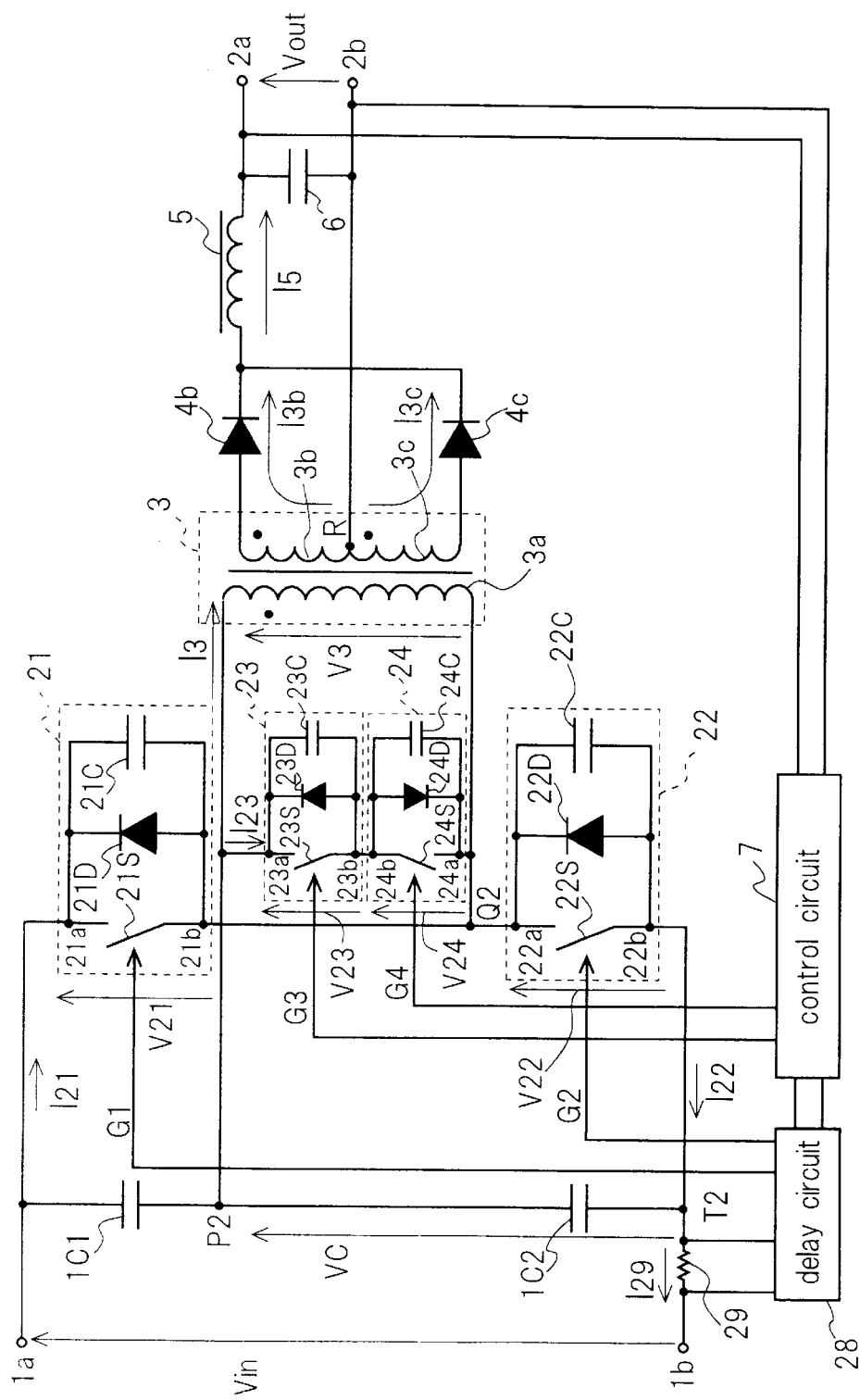
FIG. 7 is a circuit diagram showing the configuration of a switching power supply of Example 2 according to the present invention.

FIG. 7 shows the circuit of a switching power supply of Example 2. In FIG. 7, the same reference signs as in Example 1 (FIG. 1) designate the similar components of Example 1, and the explanation of the similar components in Example 1 is cited as the explanation of the components in Example 2.

Similarly to Example 1, a DC power source is connected to input terminals 1a and 1b. The DC power source may be a substantial one obtained through rectifying the AC current from an AC power source. The input voltage from the DC power source is Vin. The high and low potential terminals of the DC power source are connected to the first input terminal 1a and the second input terminal 1b, respectively.

The circuit of Example 2 comprises two capacitors 1C1 and 1C2 and four switching sections 21, 22, 23 and 24.

The first capacitor 1C1 and the second capacitor 1C2 are interconnected in series at a junction point P2. The opposite end of the first capacitor 1C1 to the junction point P2 is connected to the first input terminal 1a, while the opposite end of the second capacitor 1C2 to the junction point P2 is connected to the second input terminal 1b. Each of the first capacitor 1C1 and the second capacitor 1C2 has a sufficiently large capacitance, whereby the voltage across each capacitor is substantially unchanged in the below-described period of driving in Example 2.

Similarly to the switching sections in Example 1, each of the switching sections 21, 22, 23 and 24 comprises a switching device, a diode and a capacitor, which are interconnected in parallel between the cathode and the anode of each of the switching sections. The four switching sections are separated into two pairs each consisting of two switching sections interconnected in series. In FIG. 7, the first switching section 21 and the second switching section 22 are interconnected in series, while the third switching section 23 and the fourth switching section 24 are interconnected in series.

The anode 21b of the first switching section 21 and the cathode 22a of the second switching section 22 are interconnected at a junction point Q2. Further, the cathode 21a of the first switching section 21 is connected to the first input terminal 1a, while the anode 22b of the second switching section 22 is connected to the second input terminal 1b.

The cathode 23a of the third switching section 23 is connected to the junction point P2 between the first capacitor 1C1 and the second capacitor 1C2. The cathode 24a of the fourth switching section 24 is connected to the junction point Q2 between the first switching section 21 and the second switching section 22.

The switching devices 21S, 22S, 23S and 24S preferably comprise MOS-FET's. Alternatively, they may comprise bi-polar transistors or IGBT's.

The diodes 21D, 22D, 23D and 24D are preferably body diodes of the switching devices 21S, 22S, 23S and 24S, respectively. Alternatively, the diodes 21D, 22D, 23D and 24D may be independent devices separate from the switching devices 21S, 22S, 23S and 24S.

Four parasitic capacitors 21C, 22C, 23C and 24C are parasitic capacitors equivalently connected in parallel to the switching devices 21S, 22S, 23S and 24S, respectively. The parasitic capacitors 21C, 22C, 23C and 24C equivalently include not only the parasitic capacitors of the respective switching devices but also the parasitic capacitors of wirings and a below-described transformer 3. Further, the parasitic capacitors 21C, 22C, 23C and 24C may include independent capacitor devices.

A primary winding 3a of a transformer 3 is connected between the junction points P2 and Q2. The structure of the secondary of the transformer 3 is similar to Example 1, and hence the description of Example 1 is to be cited.

Similarly to Example 1, a switching control circuit 7 is connected to the output terminals 2a and 2b so as to measure the output voltage Vout. On the other hand, the switching control circuit 7 is connected to the switching devices 21S, 22S, 23S and 24S so as to send switching signals G1, G2, G3 and G4, respectively. Similarly to Example 1, the switching devices are preferably MOS-FET's. The switching control circuit 7 is connected to the gates of the switching devices, thereby changing the respective gate voltages.

The switching control circuit 7 having the above-mentioned configuration outputs the switching signals G1–G4 at a fixed switching frequency. The switching control circuit 7 further controls the duty ratios of the switching devices 21S, 22S, 23S and 24S depending on the measured value of the output voltage. Thereby, the output voltage Vout is maintained at a constant value.

A current sensing resistor 29 is connected in series between the junction point T2 of the second capacitor 1C2 and the anode 22b of the second switching section 22, and the second input terminal 1b. The resistance of the current sensing resistor 29 is sufficiently small such that the voltage drop across the resistor 29 conducting the input current I29 is negligible in comparison with the input voltage Vin.

The time average of the input current I29 varies similarly to the time average of the load current. Accordingly, the load current is known through measuring the input current I29. Therefore, a delay circuit 28 is connected across the current sensing resistor 29 so as to measure the voltage, thereby comparing the measured voltage with a predetermined threshold voltage. Thus, the delay circuit 28 compares the input current I29 flowing through the current sensing resistor 29 with the predetermined threshold current. The threshold current is set to be substantially equal to the time average of the input current I29a t the time when the substantial value of the load current equals to a below-described threshold value Ith. When the time average of the measured input current I29 is substantially smaller than the threshold current, the delay circuit 28 holds the switching signals G1 and G2 from the switching control circuit 7 for a delay time described below. On the elapsing of the delay time, the delay circuit 28 outputs the switching signals G1 and G2 to the first switching device 21S and the second switching device 22S, respectively.

Operation in the Heavy-Load Period

In the heavy-load period, the switching power supply of Example 2 operates as follows.

As shown in FIG. 7, an input voltage Vin is provided across the input terminals 1a and 1b, while an output voltage Vout is provided across the output terminals 2a and 2b. The input voltage Vin and the output voltage Vout are maintained substantially constant.

A voltage VC is a voltage of the junction point P2 between the first capacitor 1C1 and the second capacitor 1C2 with respect to the second input terminal 1b. The polarity is defined as positive in the direction shown by the arrow in FIG. 7. That is, the positive direction is that directing from the end on the second input terminal 1b side to the end on the junction point P2 side. Here, the voltage drop across the current sensing resistor 29 is negligibly small. Further, each of the first capacitor 1C1 and the second capacitor 1C2 has a sufficiently large capacitance, whereby the voltage across each capacitor is substantially unchanged. In the case, the voltage VC is smaller than the input voltage Vin (VC<Vin).

In the heavy-load period, the average of the input current I29 is sufficiently large as described below. Accordingly, the delay circuit 28 does not substantially delay the switching signals G1 and G2.

Figure 8:
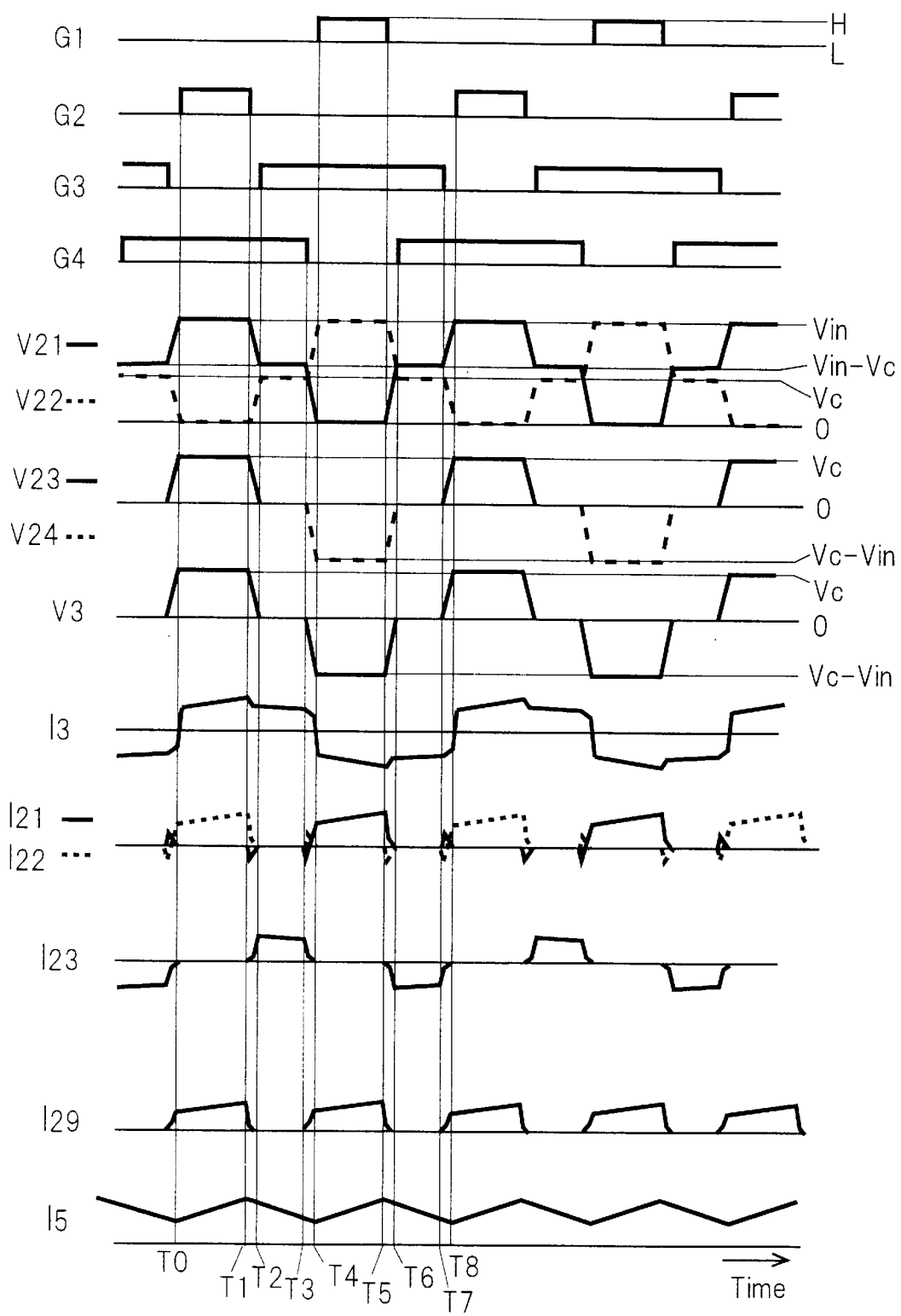
FIG. 8 is a waveform diagram of the voltage and current pulses generated in the heavy-load period in each part of the switching power supply of Example 2.

FIG. 8 is a waveform diagram of the voltage and current pulses generated in the heavy-load period in each part of the switching power supply of Example 2.

The switching signals G1, G2, G3 and G4, the voltage V3 and the currents I3 and I5 shown in FIG. 8 are similar to Example 1 (FIG. 2).

Voltages V21, V22, V23 and V24 are provided across the switching sections 21, 22, 23 and 24, respectively. The polarity of each voltage is defined as positive in the direction shown by each arrow in FIG. 7. That is, the potential at the end on the first input terminal 1a side is defined as positive with respect to the end on the second input terminal 1b side.

Currents I21, I22 and I23 flow through the switching sections 21, 22 and 23, respectively. The polarity of each current is defined as positive in the direction shown by each arrow in FIG. 7. That is, the positive direction is that directing from the end on the first input terminal 1a side to the end on the second input terminal 1b side. Here, the current I23 further equals to the current flowing through the fourth switching section 24.

A current I29 flows through the current sensing resistor 29. That is, the current I29 is the input current of the switching power supply of Example 2. The polarity is defined as positive in the direction shown by the arrow in FIG. 7. That is, the positive direction is that directing from the end on the second capacitor 1C2 side to the end on the second input terminal 1b side.

At the time T0, the switching control circuit 7 changes the switching signal G2 from L to H, thereby turning ON the second switching device 22S. Then, the current I3 flows through the primary winding 3a of the transformer 3 so that the first capacitor 1C1 charges and the second capacitor 1C2 discharges. At this time, substantial electromotive forces VC/n and −VC/n are generated in the first secondary winding 3b and the second secondary winding 3c, respectively. Here, similarly to Example 1, the ratios among the turn numbers of the primary winding 3a and the secondary windings 3b and 3c are n:1:1. Further, the input voltage Vin is sufficiently larger than the output voltage Vout, and hence, Vin/n>Vout, holds. Further, the voltage VC is also sufficiently large, and hence, VC/n>Vout, holds. Then, a substantially constant voltage, VC/n−Vout, is provided across the smoothing inductor 5 through the first rectifier diode 4b or second rectifier diode 4c. As a result, the current I5 flowing through the smoothing inductor 5 increases linearly.

In the interval T0–T1, the voltage V3 applied across the primary winding 3a is maintained substantially at a constant value VC. Accordingly, the exciting current in the current I3 increases substantially linearly. On the other hand, the equivalent primary current also increases substantially linearly in a similar manner to Example 1. As a result, the current I3 flowing through the primary winding 3a increases substantially linearly.

At the time T1, the switching control circuit 7 changes the switching signal G2 from H to L, thereby turning OFF the second switching device 22S. Then, a resonance occurs among the leakage inductance of the primary winding 3a, the first parasitic capacitor 21C, the second parasitic capacitor 22C and the third parasitic capacitor 23C. Thereby, the second parasitic capacitor 22C charges, while the first parasitic capacitor 21C and the third parasitic capacitor 23C discharge. Accordingly, the voltage V22 across the second switching section 22 increases from zero. At the same time, the voltage V21 across the first switching section 21 decreases from the maximum value Vin, while the voltage V23 across the third switching section 23 decreases from the maximum value VC.

The voltage V22 across the second switching section 22 reaches the voltage VC. At the same time, the voltage V21 across the first switching section 21 reaches a voltage, Vin−VC, while the voltage V23 across the third switching section 23 reaches zero. Then, the third diode 23D turns ON. At the time T2 immediately after that, the switching control circuit 7 changes the switching signal G3 from L to H, thereby turning ON the third switching device 23S. Thus, the ZVS is carried out for the turning ON of the third switching device 23S.

For a while after the time T2, the primary winding 3a is shunted through the third diode 23D or the third switching device 23S and the fourth switching device 24S that is already ON. At this time, a substantially constant voltage, −Vout, is provided across the smoothing inductor 5, since the voltage V3 applied across the primary winding 3a is substantially zero. Accordingly, the current I5 flowing through the smoothing inductor 5 decreases linearly. As a result, the equivalent primary current in the current I3 flowing through the primary winding 3a decreases linearly, as is similar to the current I5. On the other hand, the exciting current in the current I3 flowing through the primary winding 3a is maintained substantially constant, since the voltage V3 applied across the primary winding 3a is substantially zero. As a result, the current I3 flowing through the primary winding 3a decreases linearly.

At the time T3, the switching control circuit 7 changes the switching signal G4 from H to L, thereby turning OFF the fourth switching device 24S. Then, a resonance occurs among the leakage inductance of the primary winding 3a, the first parasitic capacitor 21C, the second parasitic capacitor 22C and the fourth parasitic capacitor 24C. Thereby, the second parasitic capacitor 22C and the fourth parasitic capacitor 24C charge, while the first parasitic capacitor 21C discharges. Accordingly, the voltage V22 across the second switching section 22 increases from the voltage VC. At the same time, the voltage V21 across the first switching section 21 decreases from the voltage Vin −VC, while the voltage V24 across the fourth switching section 24 decreases from zero.

The voltage V22 across the second switching section 22 reaches the maximum value Vin, while the voltage V24 across the fourth switching section 24 reaches the minimum value VC−Vin (<0). At the same time, the voltage V21 across the first switching section 21 reaches zero. Then, the first diode 21D turns ON. At the time T4 immediately after that, the switching control circuit 7 changes the switching signal G1 from L to H, thereby turning ON the first switching device 21S. Thus, the ZVS is carried out for the turning ON of the first switching device 21S.

When the first switching device 21S turns ON, a. voltage VC−Vin is provided across the primary winding 3a. Then, the current I3 flowing through the primary winding 3a rapidly reverses the direction.

On the other hand, substantial electromotive forces, (VC−Vin)/n and (Vin−VC)/n, are generated in the first secondary winding 3b and the second secondary winding 3c, respectively. Accordingly, the second rectifier diode 4c turns ON, whereby a substantially constant voltage, (Vin −VC)/n−Vout, is provided across the smoothing inductor 5. As a result, the current I5 flowing through the smoothing inductor 5 increases linearly. Then, the current I3 flowing through the primary winding 3a flows in the direction opposite to that before the time T3, and further increases linearly.

At the time T5, the switching control circuit 7 changes the switching signal G1 from H to L, thereby turning OFF the first switching device 21S. Then, a resonance occurs among the leakage inductance of the primary winding 3a, the first parasitic capacitor 21C, the second parasitic capacitor 22C and the fourth parasitic capacitor 24C. Thereby, the first parasitic capacitor 21C charges, while the second parasitic capacitor 22C and the fourth parasitic capacitor 24C discharge. Accordingly, the voltage V21 across the first switching section 21 increases from zero, while the voltage V24 across the fourth switching section 24 increases from the minimum value, VC−Vin. At the same time, the voltage V22 across the second switching section 22 decreases from the maximum value Vin.

The voltage V21 across the first switching section 21 reaches the voltage, Vin−VC, while the voltage V22 across the second switching section 22 reaches the voltage VC. At the same time, the voltage V24 across the fourth switching section 24 reaches zero. Then, the fourth diode 24D turns ON. At the time T6 immediately after that, the switching control circuit 7 changes the switching signal G4 from L to H, thereby turning ON the fourth switching device 24S. Thus, the ZVS is carried out for the turning ON of the fourth switching device 24S.

For a while after the time T6, the primary winding 3a is shunted through the fourth diode 24D or the fourth switching device 24S and the third switching device 23S which is already ON. At this time, a substantially constant voltage, −Vout, is provided across the smoothing inductor 5, since the voltage V3 applied across the primary winding 3a is substantially zero. Accordingly, the current I5 flowing through the smoothing inductor 5 decreases linearly. As a result, the equivalent primary current in the current I3 flowing through the primary winding 3a decreases linearly, as is similar to the current I5. On the other hand, the exciting current in the current I3 flowing through the primary winding 3a is maintained substantially constant, since the voltage V3 applied across the primary winding 3a is substantially zero. As a result, the current I3 flowing through the primary winding 3a decreases linearly.

At the time T7, the switching control circuit 7 changes the switching signal G3 from H to L, thereby turning OFF the third switching device 23S. Then, a resonance occurs among the leakage inductance of the primary winding 3a, the first parasitic capacitor 21C, the second parasitic capacitor 22C and the third parasitic capacitor 23C. Thereby, the first parasitic capacitor 21C and the third parasitic capacitor 23C charge, while the second parasitic capacitor 22C discharges. Accordingly, the voltage V21 across the first switching section 21 increases from the voltage, Vin−VC, while the voltage V23 across the third switching section 23 increases from zero. At the same time, the voltage V22 across the second switching section 22 decreases from the voltage VC.

The voltage V21 across the first switching section 21 reaches the maximum value Vin, while the voltage V23 across the third switching section 23 reaches the voltage VC. At the same time, the voltage V22 across the second switching section 22 reaches zero. Then, the second diode 22D turns ON. At the time T8 immediately after that, the switching control circuit 7 changes the switching signal G2 from L to H, thereby turning ON the second switching device 22S. Thus, the ZVS is carried out for the turning ON of the second switching device 22S.

When the second switching device 22S turns ON, a voltage VC is provided across the primary winding 3a. Then, the current I3 flowing through the primary winding 3a rapidly reverses the direction again. After that, the above-described operation is repeated.

Each length of the dead times in Example 2, that is, the transient intervals T1–T2, T3–T4, T5–T6 and T7–T8, is sufficiently shorter than the intervals T0–T1, T2–T3, T4–T5 and T6–T7 in which each switching device is stably ON or OFF. In Example 2, the former is a few tens nsec to a few hundreds nsec, while the latter is approximately a few $\mu$ sec. Under the approximation of neglecting the dead time, the relation between the input voltage Vin and the output voltage Vout is obtained as follows.

The interval length is Ton for both the interval (ON-time) T0–T1 in which the second switching device 22S is ON, and the ON-time T4–T5 of the first switching device 21S. As described above, the voltages, VC/n–Vout and (Vin –VC)/n–Vout, are provided across the smoothing inductor 5 in the ON-time T0–T1 and the ON-time T4–T5, respectively. Accordingly, the magnetic flux stored in the smoothing inductor 5 increases by (Vin/n–2Vout)×Ton during the ON-times T0–T1 and T4–T5.

On the other hand, the time length is Toff for both the interval T1–T4 from the turning OFF of the second switching device 22S to the turning ON of the first switching device 21S, and the interval T5–T8 from the turning OFF of the first switching device 21S to the turning ON of the second switching device 22S. Since the voltage, –Vout, is provided across the smoothing inductor 5 in each of the above-described intervals, the magnetic flux stored in the smoothing inductor 5 decreases by 2Vout×Toff during the intervals T1–T4 and T5–T8.

Accordingly, the condition for the reset of the smoothing inductor 5, which is the condition for the balancing between the increase and the decrease in the magnetic flux in the smoothing inductor 5, is expressed by Equation (1) of Example 1 with the replacement of Vout by 2×Vout. Therefore, the relation between the input voltage Vin and the output voltage Vout is expressed by Equation (2) of Example 1 with the replacement of Vin by Vin/2. Thus, in Example 2, the output voltage Vout is maintained substantially constant by controlling the duty ratio $\delta$ of the turning ON and OFF of the first switching device 21S and the second switching device 22S.

Further, the switching loss is small, since all of the switching devices 21S, 22S, 23S and 24S are turned ON with the above-described ZVS.

The input current I29 flowing through the current sensing resistor 29 equals to the sum of the current I22 flowing through the second switching section 22. and the current flowing from the second capacitor 1C2 to the second input terminal 1b. Accordingly, the pulse waveform of the input current I29 varies as shown in FIG. 8.

As described above, the third switching section 23 and the fourth switching section 24 contribute to the resonance occurring in each dead time, thereby smoothing the changes in current and voltage. That is, they operate as snubber. In particular, when the voltage of the junction point Q2 is VC, the third switching section 23 and the fourth switching section 24 shunt the primary winding 3a of the transformer 3. Thereby, an overcurrent is prevented from flowing into the first capacitor 1C1 and the second capacitor 1C2. As a result, no surge current and surge voltage occur.

Operation in the Light-Load Period

Figure 9:
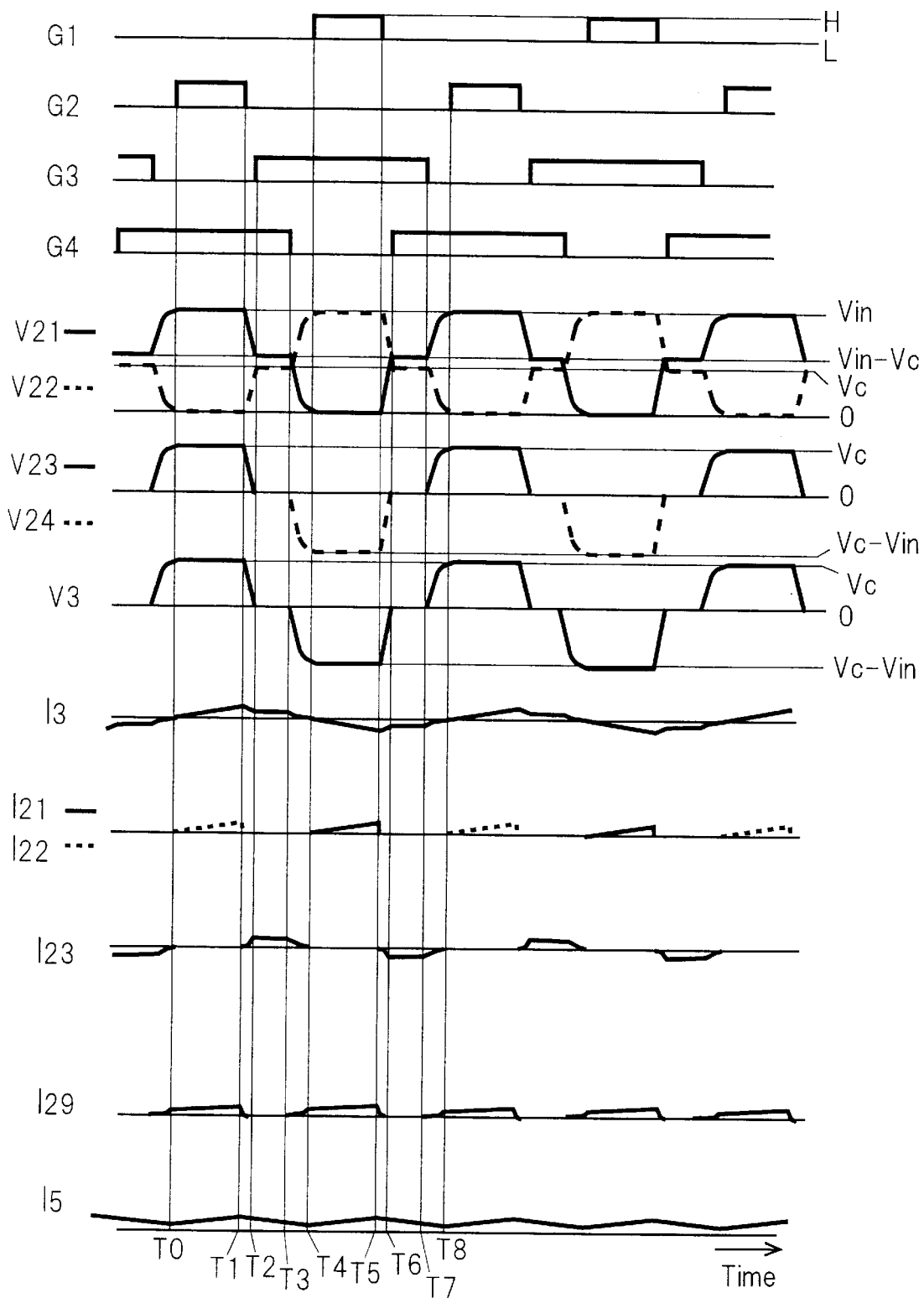
FIG. 9 is a waveform diagram of the voltage and current pulses generated in the light-load period in each part of the switching power supply of Example 2.

FIG. 9 shows the waveforms of the voltage and current pulses generated in the light-load period in each part of the switching power supply of Example 2. In FIG. 8 and FIG. 9, the same reference signs designate the voltages and the currents in the same parts of the circuit of Example 2 shown in FIG. 7, and the explanation of the voltages and the currents in the heavy-load period is cited.

In comparison with the heavy-load period shown in FIG. 8, the current I5 flowing through the smoothing inductor 5 is small in the light-load period shown in FIG. 9. Accordingly, both of the current I3 flowing through the primary winding 3a of the transformer 3 and the input current I29 flowing through the current sensing resistor 29 in the light-load period are smaller than in the heavy-load period.

The delay circuit 28 senses the smaller value of the pulse of the input current I29 than a predetermined threshold value. On the sensing, the delay circuit 28 delays the switching signals G1 and G2 input from the switching control circuit 7 for a delay time set as described below. In Example 2, the threshold value is preferably set to be about 20% of the value of the pulse of the input current I29 in the heavy-load period.

The switching signals G1 and G2 are output to the first switching device 21S and the second switching device 22S, respectively, with the delays for the predetermined delay time in contrast to the heavy-load period. Thus, as is clear from the comparison between FIG. 8 and FIG. 9, the time lengths of the intervals T3–T4 and T7–T8 are longer than in the heavy-load period.

Next, the pulse waveforms (FIG. 8) in the heavy-load period of Example 2 are compared with Example 1 (FIG. 16). Further, the pulse waveforms (FIG. 9) in the light-load period of Example 2 are compared with Example 1 (FIG. 2). As is obvious from the comparison, in Example 2, the voltage V3 applied across the primary winding 3a and the current I3 flowing therethrough each have substantially the same pulse waveforms as Example 1. Further, the secondary of the transformer 3 of Example 2 has substantially the same configuration as that of Example 1. Accordingly, the dead time for satisfying the ZVS condition in the light-load period in Example 2 can be set in the following manner substantially similar to Example 1.

The operation during the interval T3–T4 of the switching power supply of Example 2 is described below with comparison between the light-load period and the heavy-load period. The operation during the interval T7–T8 is similar to that during the interval T3–T4, and hence would be easily understood from the following description. The operation during other intervals in the light-load period is similar to that in the heavy-load period, and hence the description of the operation is omitted for the intervals other than the interval T3–T4.

Immediately before the time T3, the third switching section 23 and the fourth switching section 24 are ON, thereby shunting the primary winding 3a. That is, the voltage V3 applied across the primary winding 3a is substantially zero. Accordingly, no substantial electromotive force from the primary is generated in the secondary windings 3b and 3c. At this time, a first secondary current I3b flows through the secondary winding 3b in the forward direction of the first rectifier diode 4b. At the same time, a second secondary current I3c flows through the secondary winding 3c in the forward direction of the second rectifier diode 4c. In this state, as described above in Example 1, the magnetic energy stored in the leakage inductance of the primary winding 3a solely contributes to the operation in the primary.

When the fourth switching device 24S turns OFF at the time T3, a resonance occurs among the leakage inductance of the primary winding 3a, the first parasitic capacitor 21C, the second parasitic capacitor 22C and the fourth parasitic capacitor 24C. Thereby, the second parasitic capacitor 22C and the fourth parasitic capacitor 24C charge, while the first parasitic capacitor 21C discharges. Accordingly, the voltage V22 across the second switching section 22 increases from VC. At the same time, the voltage V21 across the first switching section 21 decreases from the voltage Vin−VC, while the voltage V24 across the fourth switching section 24 decreases from zero. Accordingly, the voltage V3 applied across the primary winding 3a increases in the negative direction. Then, an electromotive force from the primary is generated in each of the secondary windings 3b and 3c. The electromotive force acts so as to reduce the first secondary current I3b in the first secondary winding 3b and increase the second secondary current I3c in the second secondary winding 3c.

[(A) Operation during Interval T3–T4 in the Heavy-Load Period]

The enlarged pulse waveforms of the voltage V3 and the current I3 of the primary winding 3a in the heavy-load period is substantially the same as FIG. 3A.

In the heavy-load period, the current I5 flowing through the smoothing inductor 5 is sufficiently large. Hence, the first secondary current I3b is sufficiently large. Accordingly, the voltage V21 across the first switching device 21S can reach zero, when a first secondary current I3b flows through the first secondary winding 3b and a second secondary current I3c flows through the second secondary winding 3c as shown in FIG. 3B.

At the time T31 after the time T3, the voltage V21 across the first switching section 21 reaches zero. In the interval from the time T3 to the time T31, the current I3 flowing through the primary winding 3a decreases in the shape of a substantial sinewave as shown in FIG. 3A by virtue of the resonance among the leakage inductance L1 of the primary winding 3a, the first parasitic capacitor 21C, the second parasitic capacitor 22C and the fourth parasitic capacitor 24C. The resonance period, namely, the period of the substantial sinewave is proportional to the square root of the product between the leakage inductance L1 of the primary winding 3a and the combined capacitance of the first parasitic capacitor 21C, the second parasitic capacitor 22C and the fourth parasitic capacitor 24C.

After the time T31, the voltage V21 across the first switching device 21S is maintained at zero, since the first diode 21D is ON. At the time T32, the current I3 flowing through the primary winding 3a becomes zero, and then the direction of the current I3 is reversed. Accordingly, by turning ON the first switching device 21S before the time T32, the ZVS is carried out for the turning ON of the third switching device 23S.

The area of the shaded region of FIG. 3A determines the time length of the interval T3–T31. The area of the shaded region corresponds to the amount of charge to be moved away from the first parasitic capacitor 21C, the second parasitic capacitor 22C and the fourth parasitic capacitor 24C so that the voltage V21 across the first switching section 21 reaches zero.

After the time T31, the current I3 decreases linearly, since the voltage V3 is maintained at a constant value, −Vin. During the time when the secondary currents I3b and I3c flow simultaneously, the slope of the linear decrease in the current I3 is inversely proportional to the leakage inductance L1 of the primary winding 3a. Further, the slope of the change in the current I3 is substantially unchanged before and after the time T31. Accordingly, ¼ of the substantial resonance period of the resonance in the interval T3–T31 is longer than the time length of the interval T3–T31, but shorter than the time length of the interval T3–T32. Accordingly, by setting the dead time to be ¼ of the substantial resonance period, the dead time satisfies the ZVS condition.

After the time T3. the first secondary current I3b flowing through the first secondary winding 3b continues to decrease. Similarly to Example 1, as shown in FIG. 3A in the heavy-load period, the first secondary current I3b becomes zero at the time T4b after the time T31, whereby the first rectifier diode 4b turns OFF.

On reaching the time T4b, as shown in FIG. 3B, the first secondary current I3b becomes zero, and hence only the second secondary current I3c flows through the second secondary winding 3c. Accordingly, similarly to Example 1, the current I3 flowing through the primary winding 3a decreases linearly with a slope inversely proportional to the self-inductance L of the primary winding 3a. After the change in direction, the current I3 flowing through the primary winding 3a further increases with the same slope.

[(B) Operation during Interval T3–T4 in the Light-Load Period]

Similarly to Example 1, with decreasing of the time average of the load current, at last the time T4b substantially agrees with the time T31. Also in Example 2, in the light-load period, the time average of the load current is smaller than that at the time when the time T4b agrees with the time T31.

In the light-load period corresponding to case (B) of Example 1, a voltage V3 is applied across the primary winding 3a of the transformer 3 around the time T3, while a current I3 flows through the primary winding 3a. The pulse waveforms of the voltage V3 and the current I3 are substantially the same as FIG. 4A of Example 1.

In the light-load period corresponding to case (B) of Example 1, the time T4b when the first rectifier diode 4b turns OFF precedes the time T31 when the voltage V21 across the first switching section 21 reaches zero.

As shown in FIG. 4B, in the interval T3–T4b, both of the secondary windings 3b and 3c are provided with secondary currents I3b and I3c, respectively. Hence, the leakage inductance L1 of the primary winding 3a contributes to the operation in the primary. Accordingly, the current I3 flowing through the primary winding 3a in the interval T3–T4b decreases in the shape of a substantial sinewave by virtue of the resonance among the leakage inductance L1 of the primary winding 3a, the first parasitic capacitor 21C, the second parasitic capacitor 22C and the fourth parasitic capacitor 24C.

In the interval T4b–T31, only the second secondary current I3c flows as shown in FIG. 4B. Hence, the self-inductance L of the primary winding 3a contributes to the operation in the primary. Accordingly, similarly to Example 1, the resonance period becomes much larger at the time T4b in comparison with the previous value. As a result, as shown in FIG. 4A, the decreasing of the current I3 is much slowed down.

After the time T31, the first diode 21D turns ON, and hence the voltage V21 across the first switching section 21 is maintained at zero. Further, similarly to the heavy-load period, the voltage V3 is maintained at a constant voltage, −Vin. Accordingly, the current I3 decreases linearly with a slope inversely proportional to the self-inductance L of the primary winding 3a. At the time T32, the current I3 flowing through the primary winding 3a becomes zero, and then the direction of the current I3 is reversed.

Accordingly, by turning ON the first switching device 21S in the interval T31–T32, the ZVS is carried out for the turning ON of the first switching device 21S.

Similarly to Example 1, the current I3 at the time T3 is small in the light-load period. On the other hand, the resonance period becomes longer at the time T4b, thereby extending the time length between the time T3 and the time when the current I3 becomes zero. Accordingly, by extending the interval T3–T4 and equivalently the dead time, the dead time satisfies the ZVS condition.

[(C) Operation during Interval T3–T4 When the Load Current is Much Smaller than in the Light-Load Period of Case (B)]

In the light-load period corresponding to case (C) of Example 1, the voltage V3 is applied across the primary winding 3a of the transformer 3 around the time T3, while the current I3 flows through the primary winding 3a. The pulse waveforms of the voltage V3 and the current I3 are substantially the same as FIG. 5A of Example 1.

Similarly to Example 1, further decreasing of the time average of the load current in comparison with case (B) of the light-load period causes a more delay in the time T31 when the voltage V23 across the third switching section 23 becomes zero. On the other hand, the time length of the interval T3–T4b is substantially constant at approximately ¼ of the resonance period determined by the leakage inductance L1 of the primary winding 3a. As a result, when the time average of the load current is sufficiently small, as shown in FIG. 5A, the interval T4b–T31 of the resonance by the self-inductance L of the primary winding 3a is sufficiently long to neglect the interval T3–T4b of the resonance by the leakage inductance L1 of the primary winding 3a. In the light-load period of this extent, the interval T3–T4 and equivalently the dead time are set to be ¼ of the resonance period determined by the self-inductance L of the primary winding 3a. Thereby, the dead time satisfies the ZVS condition.

Similarly to Example 1, the period of the resonance among the primary winding 3a, the first parasitic capacitor 21C, the second parasitic capacitor 22C and the fourth parasitic capacitor 24C cannot substantially exceed the length determined by the self-inductance L of the primary winding 3a. Accordingly, when the current I3 at time T3 becomes much smaller, the dead time of any time length does not satisfy the ZVS condition.

In Example 2, the region of the dead time for satisfying the ZVS condition for various values of the time average of load current is generally as shown in FIG. 6 similarly to Example 1. Accordingly, depending on the value of the load current, the dead time is adjusted to fall within the region shown in FIG. 6. Thus, the dead time substantially satisfies the ZVS condition for the load current of any value.

Similarly to Example 1, in Example 2, a threshold value Ith is firstly defined within the range specified by arrow B. Further, the dead time is set at the values D1 and D2, when the load current is substantially larger and smaller than the threshold value Ith, respectively. That is, the dead time is set on the bent line D shown as the broken line in FIG. 6.

Similarly to Example 1, setting the dead time at D1 in the heavy-load period is the conventional approach of the known switching control circuit 7 (FIG. 7). In addition to the conventional approach, in Example 2, the delay time of the delay circuit 28 is set to be D2−D1≈D2 (because D2>>D1), when the load current is substantially smaller than the threshold value Ith. The time average of the load current correlates with the value of the pulse of the input current I29. Accordingly, a threshold value I29th can be set for the input current I29, correspondingly to the threshold value Ith for the load current. When the input current I29 is substantially smaller than the threshold value I29th, the load current is also substantially smaller than the threshold value Ith.

Thus, in Example 2, the dead time can be set with the delay circuit 28 so that the ZVS is carried out for the turning ON of the first switching device 21S even in the light-load period.

The range of the dead time for satisfying the ZVS condition shown in FIG. 6 has a lower limit Imin. The dead time of any time length cannot satisfy the ZVS condition for the load current smaller than the lower limit Imin. However, in this case, the dead time is set at D2 as described above. Thereby, the amount of charge left in the first parasitic capacitor 21C (FIG. 7) at the time T4 (FIG. 2) is smaller than in the prior art in which the dead time is fixed at D1. As a result, the switching loss at the time T4 is reduced in Example 2 in comparison with the prior art.

In Example 2, as shown by the bent line D in FIG. 6, the dead time is set discretely with a discontinuation at the threshold value Ith for the load current. However, the dead time may be otherwise set on any straight or curved line in the region specified by arrow B in FIG. 6, as long as the line is included within the region satisfying the ZVS condition.

EXAMPLE 3

Example 3 of the present invention is described as follows. In Example 3, the present invention is implemented in a switching power supply comprising a half-bridge type converter with an auxiliary winding.

Figure 10:
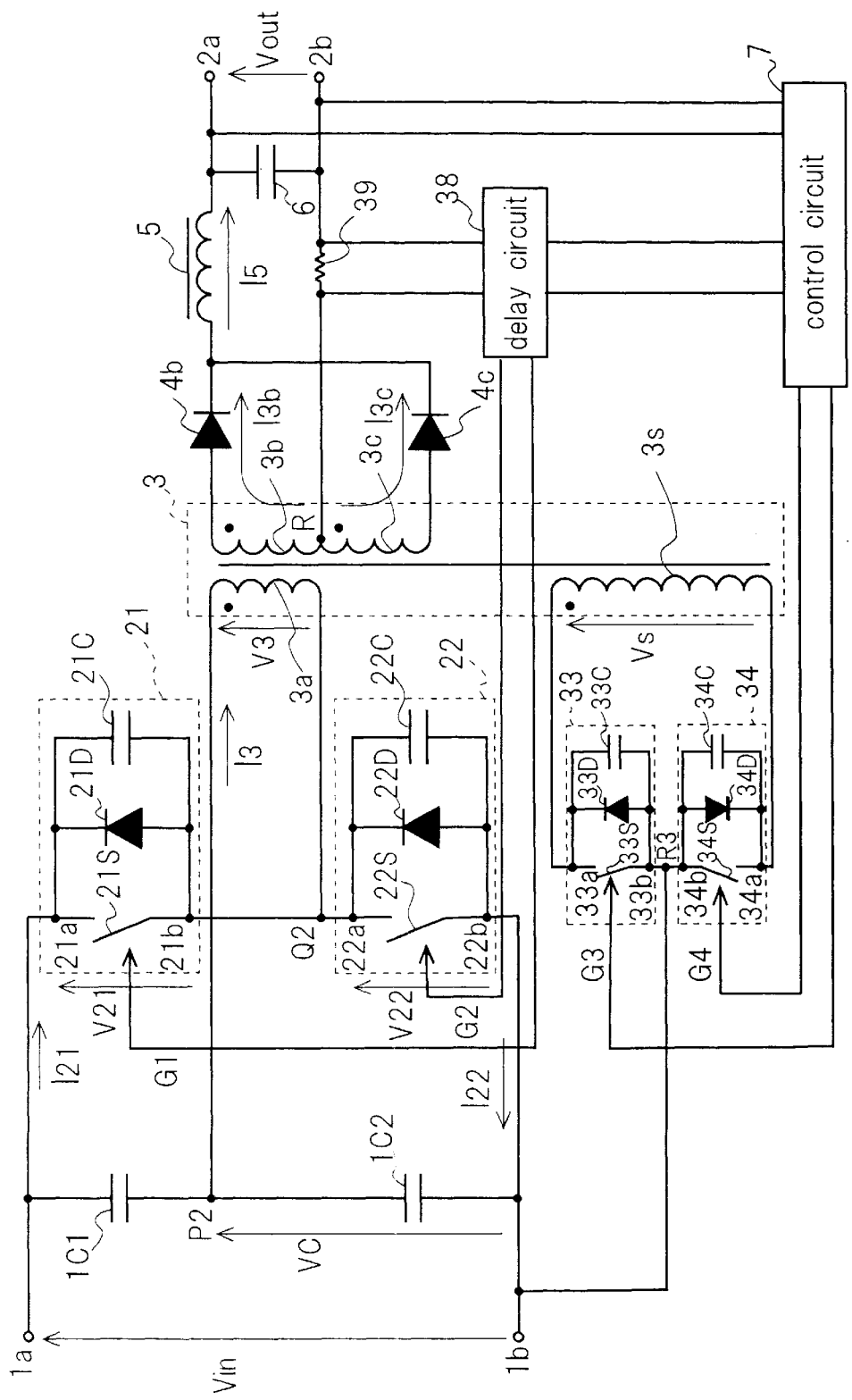
FIG. 10 is a circuit diagram showing the configuration of a switching power supply of Example 3 according to the present invention.

FIG. 10 shows the circuit of a switching power supply of Example 3. In FIG. 10, the same reference signs as in Example 2 (FIG. 7) designate the similar components of Example 2, and the explanation of the similar components in Example 2 is cited as the explanation of the components in Example 3.

In Example 3, the transformer 3 further comprises an auxiliary winding 3s. The ratio between the turn numbers of the auxiliary winding 3s and the primary winding 3a is 1:1. The voltage Vs applied across the auxiliary winding 3s is always substantially equal to the voltage V3 applied on the primary winding 3a.

In contrast to Example 2, the third switching section 33 and the fourth switching section 34 both are connected to the auxiliary winding 3s in parallel. Similarly to the first switching section 21 and the second switching section 22, each of the third switching section 33 and the fourth switching section 34 comprises a switching device, a diode and a capacitor interconnected in parallel.

The anode 33b of the third switching section 33 and the anode 34b of the fourth switching section 34 are interconnected. The junction point R3 between the third switching section 33 and the fourth switching section 34 is connected to the second input terminal 1b.

The switching devices 33S and 34S preferably comprise MOS-FET's. Alternatively, they may comprise bi-polar transistors or IGBT's.

The anodes of the third diode 33D and the fourth diode 34D are connected to the junction point R3. The diodes 33D and 34D may be independent devices separate from the switching devices 33S and 34S. When the switching devices 33S and 34S are MOS-FET's, the diodes 33D and 34D are preferably body diodes of the respective switching devices.

Parasitic capacitors 33C and 34C are the parasitic capacitors equivalently connected in parallel to the switching devices 33S and 34S, respectively. The parasitic capacitors 33C and 34C equivalently include not only the parasitic capacitors of the respective switching devices but also the parasitic capacitors of the wiring and the auxiliary winding 3s. Further, the parasitic capacitors 33C and 34C may include independent capacitor devices.

An output current sensing resistor 39 is connected in series between the junction point R of the first secondary winding 3b and the second secondary winding 3c, and the connected end of the smoothing capacitor 6 to the second output terminal 2b. The resistance of the output current sensing resistor 39 is sufficiently small so that the voltage drop across the resistor 39 conducting the current I5 is negligible in comparison with the output voltage Vout. A delay circuit 38 is connected across the output current sensing resistor 39 so as to measure the voltage drop of the current I5, then comparing it with a predetermined threshold value. Thereby, the delay circuit 38 compares the input current I5 flowing through the output current sensing resistor 39 with the predetermined threshold value. The delay circuit 38 holds the switching signals G1 and G2 from the switching control circuit 7 for a delay time set in a manner similar to Example 2, when the current I5 is substantially smaller than the threshold value. After that, the delay circuit 38 outputs the switching signals G1 and G2 to the first switching device 21S and the second switching device 22S, respectively.

As shown in FIG. 8 and FIG. 9, the third switching device 33S and the fourth switching device 34S of Example 3 are turned ON and OFF substantially at the same timing as that for the third switching device 23S and the fourth switching device 24S of Example 2. Then, the voltages applied across the primary winding 3a and the auxiliary winding 3s are substantially equal to each other, as described above. Accordingly, the operation in Example 3 is substantially equivalent to that of Example 2. Here, in the intervals T2–T3 and T6–T7, the auxiliary winding 3s is shunted in Example 3, and hence no substantial current flows through the primary winding 3a, while the primary winding 3a is shunted in Example 2.

Since the operation in Example 3 is substantially identical to Example 2, the ZVS is carried out for the turning ON of both the first switching device 21S and the second switching device 22S by extending the dead time in the light-load period similarly to Example 2.

In Example 3, the potential at the junction point. R3 between the third switching device 33S and the fourth switching device 34S is always constant, since the junction point R3 is connected to the second input terminal 1b. Accordingly, the levels of the high potential (H) and the low potential (L) can be maintained constant, for the switching signals G3 and G4 output from the switching control circuit 7 to the third switching device 33S and the fourth switching device 34S.

EXAMPLE 4

Example 4 of the present invention is described below. In Example 4, the present invention is implemented in a switching power supply comprising a push-pull type converter.

Circuit Configuration of Example 4

Figure 11:
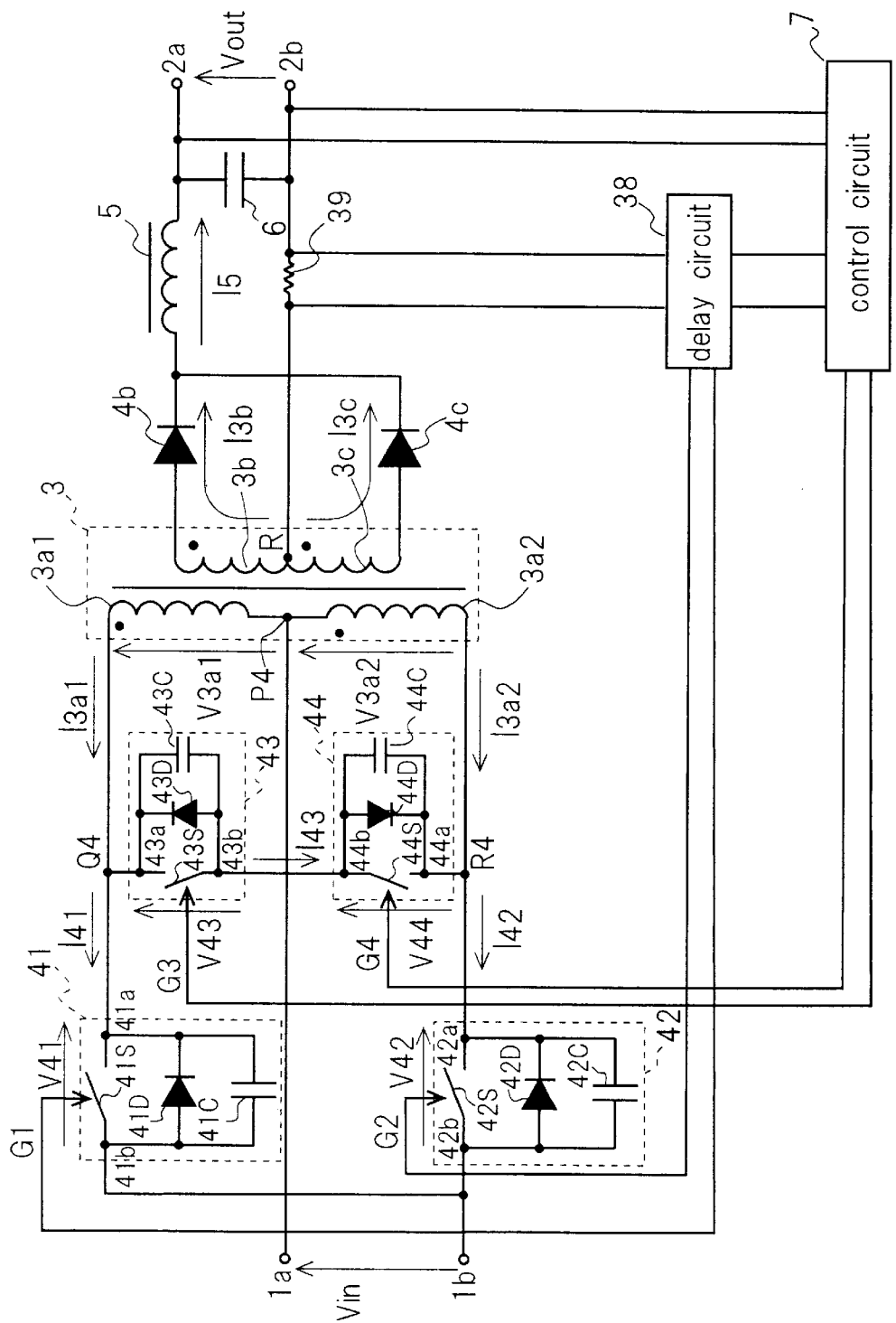
FIG. 11 is a circuit diagram showing the configuration of a switching power supply of Example 4 according to the present invention.

FIG. 11 shows the circuit of a switching power supply of Example 4. In FIG. 11, the same reference signs as in Example 3 (FIG. 10) designate the similar components of Example 3, and the explanation of the similar components in Example 3 is cited as the explanation of the components in Example 4.

Similarly to Example 3, a DC power source is connected to input terminals 1a and 1b. The DC power source may be a substantial one obtained through rectifying the AC current from an AC power source. The input voltage from the DC power source is Vin. The high and low potential terminals of the DC power source are connected to the first input terminal 1a and the second input terminal 1b, respectively.

The circuit of Example 4 comprises two primary windings 3a1 and 3a2 and four switching sections 41, 42, 43 and 44.

The first primary winding 3a1 and the second primary winding 3a2 are interconnected in series at a junction point P4. The junction point P4 is connected to the first input terminal 1a. The ratios among the turn numbers of the primary windings 3a1 and 3a2 and the secondary windings 3b and 3c are n:n:1:1.

Similarly to the switching sections of Example 3, each of the switching sections 41, 42, 43 and 44 comprises a switching device, a diode and a capacitor interconnected in parallel.

The cathode 41a of the first switching section 41 is connected to the opposite end of the first primary winding 3a1 to the junction point P4, while the anode 41b of the first switching section 41 is connected to the second input terminal 1b. The cathode 42a of the second switching section 42 is connected to the opposite end of the second primary winding 3a2 to the junction point P4, while the anode 42b of the second switching section 42 is connected to the second input terminal 1b.

The anode 43b of the third switching section 43 and the anode 44b of the fourth switching section 44 are interconnected. The cathode 43a of the third switching section 43 is connected to the junction point Q4 between the first switching section 41 and the first primary winding 3a1, while the cathode 44a of the fourth switching section 44 is connected to the junction point R4 between the second switching section 42 and the second primary winding 3a2.

The switching devices 41S, 42S, 43S and 44S preferably comprise MOS-FET's. Alternatively, they may comprise bi-polar transistors or IGBT's.

The diodes 41D, 42D, 43D and 44D are preferably body diodes of the switching devices 41S, 42S, 43S and 44S, respectively. Alternatively, the diodes 41D, 42D, 43D and 44D may be independent devices separate from the switching devices 41S, 42S, 43S and 44S.

Four parasitic capacitors 41C, 42C, 43C and 44C are parasitic capacitors equivalently connected in parallel to the switching devices 41S, 42S, 43S and 44S, respectively. The parasitic capacitors 41C, 42C, 43C and 44C equivalently include not only the parasitic capacitors of the respective switching devices but also the parasitic capacitors of the wiring and a below-described transformer 3. Further, the parasitic capacitors 41C, 42C, 43C and 44C may include independent capacitor devices.

The structure of the secondary of the transformer 3 is similar to that of Example 3, and hence the description of Example 3 is to be cited.

Operation in the Heavy-load Period

In the heavy-load period, the switching power supply of Example 4 operates as follows.

As shown in FIG. 11, an input voltage Vin is provided across the input terminals 1a and 1b, while an output voltage Vout is provided across the output terminals 2a and 2b. The input voltage Vin and the output voltage Vout are maintained substantially constant.

In the heavy-load period, the average of the current I5 is sufficiently large as described below. Accordingly, the delay circuit 38 does not substantially delay the switching signals G1 and G2.

Figure 12:
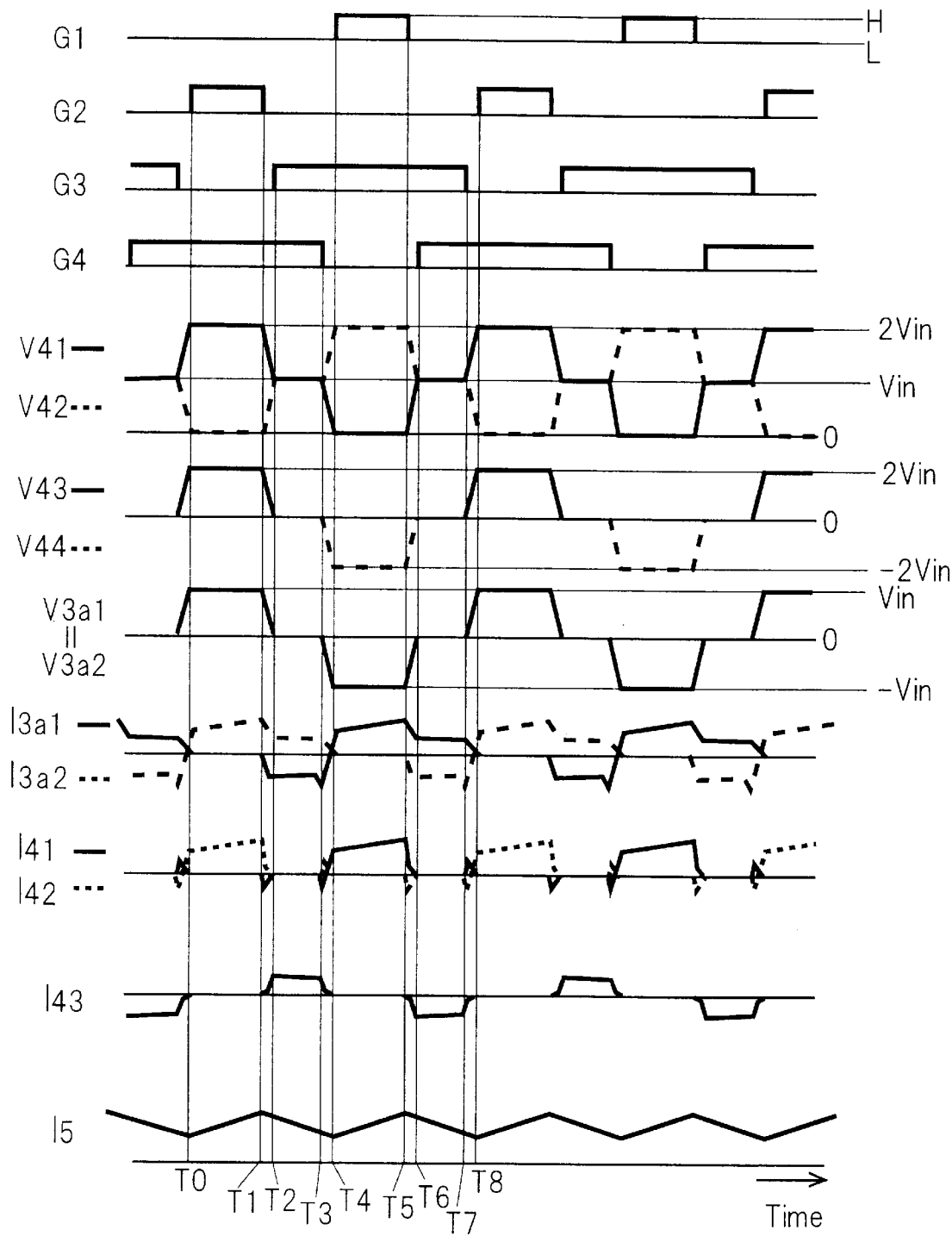
FIG. 12 is a waveform diagram of the voltage and current pulses generated in the heavy-load period in each part of the switching power supply of Example 4.

FIG. 12 is a waveform diagram of the voltage and the current pulses generated in the heavy-load period in each part of the switching power supply of Example 4.

Switching signals G1, G2, G3 and G4, the voltage V3, and the currents I3 and I5 shown in FIG. 12 are similar to Example 2 (FIG. 8).

Voltages V41, V42, V43 and V44 are provided across the switching sections 41, 42, 43 and 44, respectively. Each polarity of the voltages is defined as positive in the direction shown by each arrow in FIG. 11. That is, the potential at the end on the transformer 3 side is defined as positive with respect to the end on the second input terminal 1b side.

Currents I41, I42, I43 and I44 flow through the switching sections 41, 42, 43 and 44, respectively. Each polarity of the currents is defined as positive in the direction shown by each arrow in FIG. 11. That is, the positive direction is that directing from the end on the transformer 3 side to the end on the second input terminal. 1b side.

A voltage V3a1 is provided across the first primary. winding 3a1. The polarity is defined as positive in the direction shown by the arrow in FIG. 11. That is, the potential at the end on the first switching section 41 side is defined as positive with respect to the junction point P4.

A voltage V3a2 is provided across the second primary winding 3a2. The polarity is defined as positive in the direction shown by the arrow in FIG. 11. That is, the potential at the junction point P4 is defined as positive with respect to the end on the second switching section 42 side. However, the voltage V3a1 and the voltage V3a2 are substantially equal to each other, since the primary windings 3a1 and 3a2 have substantially the same turn number as each other.

A current I3a1 flows through the first primary winding 3a1. The polarity is defined as positive in the direction shown by the arrow in FIG. 11. That is, the positive direction is that directing from the end on the first switching section 41 side to the junction point P4.

A current I3a2 flows through the second primary winding 3a2. The polarity is defined as positive in the direction shown by the arrow in FIG. 11. That is, the positive direction is that directing from the junction point P4 to the end on the second switching section 42 side.

At the time T0, the switching control circuit 7 changes the switching signal G2 from L to H, thereby turning ON the second switching device 42S. Then, the voltage V3a2 provided across the second primary winding 3a2 is substantially equal to Vin, and the current I3a2 flows in the direction from the first input terminal 1a to the second input terminal 1b. At this time, substantial electromotive forces Vin/n and −Vin/n is generated in the first secondary winding 3b and the second secondary winding 3c, respectively. Here, the input voltage Vin is sufficiently larger than the output voltage Vout, and hence Vin/n>Vout holds. A substantially constant voltage, Vin/n−Vout, is provided across the smoothing inductor 5 through the first rectifier diode 4b or second rectifier diode 4c. As a result, the current I5 flowing through the smoothing inductor 5 increases linearly.

On the other hand, the electromotive force generated in the first primary winding 3a1 is substantially equal to Vin.

Hence, the voltage V41 across the first switching section 41 and the voltage V43 across the third switching section 43 are substantially equal to 2Vin. The current I3a1 flowing through the first primary winding 3a1 is substantially zero.

In the interval T0–T1, the voltage V3a2 applied across the second primary winding 3a2 is maintained substantially at a constant value Vin. Accordingly, the exciting current in the current I3a2 increases substantially linearly. On the other hand, similarly to Example 2, the equivalent primary current also increases substantially linearly. As a result, the current I3a2 flowing through the second primary winding 3a2 increases substantially linearly.

At the time T1, the switching control circuit 7 changes the switching signal G2 from H to L, thereby turning OFF the second switching device 42S. Then, a resonance occurs among the leakage inductances of the primary windings 3a1 and 3a2, the first parasitic capacitor 41C, the second parasitic capacitor 42C and the third parasitic capacitor 43C. Thereby, the second parasitic capacitor 42C charges, while the first parasitic capacitor 41C and the third parasitic capacitor 43C discharge. Accordingly, the voltage V42 across the second switching section 42 increases from zero. At the same time, the voltage V41 across the first switching section 41 and the voltage V43 across the third switching section 43 decrease from the maximum value 2Vin.

The voltage V41 across the first switching section 41 and the voltage V42 across the second switching section 42 reach the voltage Vin. At the same time, the voltage V43 across the third switching section 43 reaches zero. Then, the third diode 43D turns ON. At the time T2 immediately after that, the switching control circuit 7 changes the switching signal G3 from L to H, thereby turning ON the third switching device 43S. Thus, the ZVS is carried out for the turning ON of the third switching device 43S.

For a while after the time T2, the primary windings 3a1 and 3a2 are shunted through the third diode 43D or the third switching device 43S and the fourth switching device 44S that is already ON. At this time, a substantially constant voltage, −Vout, is provided across the smoothing inductor 5, since the voltages V3a1 and V3a2 applied across the primary windings 3a1 and 3a2, respectively, are substantially zero. Accordingly, the current I5 flowing through the smoothing inductor 5 decreases linearly. As a result, the equivalent primary current in the currents I3a1 and I3a2 flowing through the primary windings 3a1 and 3a2 decreases linearly, as is similar to the current I5. On the other hand, the exciting current in the currents I3a1 and I3a2 flowing through the primary windings 3a1 and 3a2 is maintained substantially constant, since the voltages V3a1 and V3a2 applied across the primary windings 3a1 and 3a2, respectively, are substantially zero. As a result, the currents I3a1 and I3a2 flowing through the primary windings 3a1 and 3a2 decrease linearly.

At the time T3, the switching control circuit 7 changes the switching signal G4 from H to L, thereby turning OFF the fourth switching device 44S. Then, a resonance occurs among the leakage inductances of primary windings 3a1 and 3a2, the first parasitic capacitor 41C, the second parasitic capacitor 42C and the fourth parasitic capacitor 44C. Thereby, the second parasitic capacitor 42C and the fourth parasitic capacitor 44C charge, while the first parasitic capacitor 41C discharges. Accordingly, the voltage V42 across the second switching section 42 increases from the voltage Vin. At the same time, the voltage V41 across the first switching section 41 decreases from the voltage Vin, while the voltage V44 across the fourth switching section 44 decreases from zero.

The voltage V42 across the second switching section 42 reaches the maximum value 2Vin, while the voltage V44 across the fourth switching section 44 reaches the minimum value, −2Vin. At the same time, the voltage V41 across the first switching section 41 reaches zero. Then, the first diode 41D turns ON. At the time T4 immediately after that, the switching control circuit 7 changes the switching signal G1 from L to H, thereby turning ON the first switching device 41S. Thus, the ZVS is carried out for the turning ON of the first switching device 41S.

When the first switching device 41S turns ON, a voltage, −Vin, is provided across the first primary winding 3a1. Then, the current I3a1 flowing through the first primary winding 3a1 rapidly reverses the direction. On the other hand, a substantial electromotive force, −Vin, is generated in the second primary winding 3a2, and is substantially equal to the voltage V3a2=Vin provided across the second primary winding 3a2. As a result, the current I3a2 flowing through the second primary winding 3a2 rapidly decreases to zero.

At this time, substantial electromotive forces, (−Vin)/n and Vin/n, are generated in the first secondary winding 3b and the second secondary winding 3c, respectively. Accordingly, the second rectifier diode 4c turns ON, whereby a substantially constant voltage, Vin/n−Vout, is provided across the smoothing inductor 5. Then, the current I5 flowing through the smoothing inductor 5 increases linearly. As a result, the current I3a1 flowing through the first primary winding 3a1 increases linearly.

At the time T5, the switching control circuit 7 changes the switching signal G1 from H to L, thereby turning OFF the first switching device 41S. Then, a resonance occurs among the leakage inductances of the primary windings 3a1 and 3a2, the first parasitic capacitor 41C, the second parasitic capacitor 42C and the fourth parasitic capacitor 44C. Thereby, the first parasitic capacitor 41C charges, while the second parasitic capacitor 42C and the fourth parasitic capacitor 44C discharge. Accordingly, the voltage V41 across the first switching section 41 increases from zero, while the voltage V44 across the fourth switching section 44 increases from the minimum value, −2Vin. At the same time, the voltage V42 across the second switching section 42 decreases from the maximum value 2Vin.

The voltage V41 across the first switching section 41 and the voltage V42 across the second switching section 42 reach the voltage Vin. At the same time, the voltage V44 across the fourth switching section 44 reaches zero. Then, the fourth diode 44D turns ON. At the time T6 immediately after that, the switching control circuit 7 changes the switching signal G4 from L to H, thereby turning On the fourth switching device 44S. Thus, and ZVS is carried out for the turning ON of the fourth switching device 44S.

For a while after the time T6, the primary windings 3a1 and 3a2 are shunted through the fourth diode 44D or the fourth switching device 44S and the third switching device 43S which is already ON. At this time, a substantially constant voltage, −Vout, is provided across the smoothing inductor 5, since the voltages V3a1 and V3a2 applied across the primary windings 3a1 and 3a2 are substantially zero. Accordingly, the current I5 flowing through the smoothing inductor 5 decreases linearly. As a result, the equivalent primary current in the currents I3a1 and I3a2 flowing through the primary windings 3a1 and 3a2 decreases linearly, as is similar to the current I5. On the other hand, the exciting current in the currents I3a1 and I3a2 is maintained substantially constant, since the voltages V3a1 and V3a2 are substantially zero. As a result, the currents I3a1 and I3a2 decrease linearly.

At the time T7, the switching control circuit 7 changes the switching signal G3 from H to L, thereby turning OFF the third switching device 43S. Then, a resonance occurs among the leakage inductances of the primary windings 3a1 and 3a2, the first parasitic capacitor 41C, the second parasitic capacitor 42C and the third parasitic capacitor 43C. Thereby, the first parasitic capacitor 41C and the third parasitic capacitor 43C charge, while the second parasitic capacitor 42C discharges. Accordingly, the voltage V41 across the first switching section 41 increases from the voltage Vin, while the voltage V43 across the third switching section 43 increases from zero. At the same time, the voltage V42 across the second switching section 42 decreases from the voltage Vin.

The voltage V41 across the first switching section 41 and the voltage V43 across the third switching section 43 reach the maximum value 2Vin. At the same time, the voltage V42 across the second switching section 42 reaches zero. Then, the second diode 42D turns ON. At the time T8 immediately after that, the switching control circuit 7 changes the switching signal G2 from L to H, thereby turning ON the seconds witching device 42S. Thus, the ZVS is carried out for the turning ON of the second switching device 42S.

When the second switching device. 42S turns ON, a voltage Vin is provided across the second primary winding 3a2. Accordingly, the current I3a2 flowing through the second primary winding 3a2 rapidly reverses the direction. On the other hand, a substantial electromotive force Vin is generated in the first primary winding 3a1. As a result, the current I3a1 flowing through the first primary winding 3a1 rapidly decreases to zero.

Thus, the state at the time T0 is reproduced. After that, the above-described operation is repeated.

Each length of the dead times in Example 4, namely, the transient intervals T1–T2, T3–T4, T5–T6 and T7–T8, is sufficiently shorter than the intervals T0–T1, T2–T3, T4–T5 and T6–T7 in which each switching device is stably ON or OFF. In Example 4, the former is a few tens nsec to a few hundreds nsec, while the latter is approximately a few $\mu$ sec. Under the approximation of neglecting the dead times, the relation between the input voltage Vin and the output voltage Vout is obtained as Equation (2) of Example 1 in the same manner as Example 1. That is, in Example 4, the output voltage Vout is maintained substantially constant by controlling the duty ratio $\delta$ of the turning ON and OFF of the first switching device 41S and the second switching device 42S.

Further, the switching loss is small, since all of the switching devices 41S, 42S, 43S and 44S are turned ON with the above-described ZVS.

Similarly to Example 2, the third switching section 43 and the fourth switching section 44 contribute to the resonance in each of the dead time as described above, thereby smoothing the change in current and voltage. That is, the third switching section 43 and the fourth switching section 44 operate as snubber. In particular, the third switching section 43 and the fourth switching section 44 shunt the primary windings 3a1 and 3a2, when the voltage of the junction point Q4 equals to the potential at the junction point R4. Thereby, an overcurrent is prevented flowing into the first parasitic capacitor 41C, the second parasitic capacitor 42C, and the like. As a result, no surge current and voltage occur.

Operation in the Light-Load Period

Figure 13:
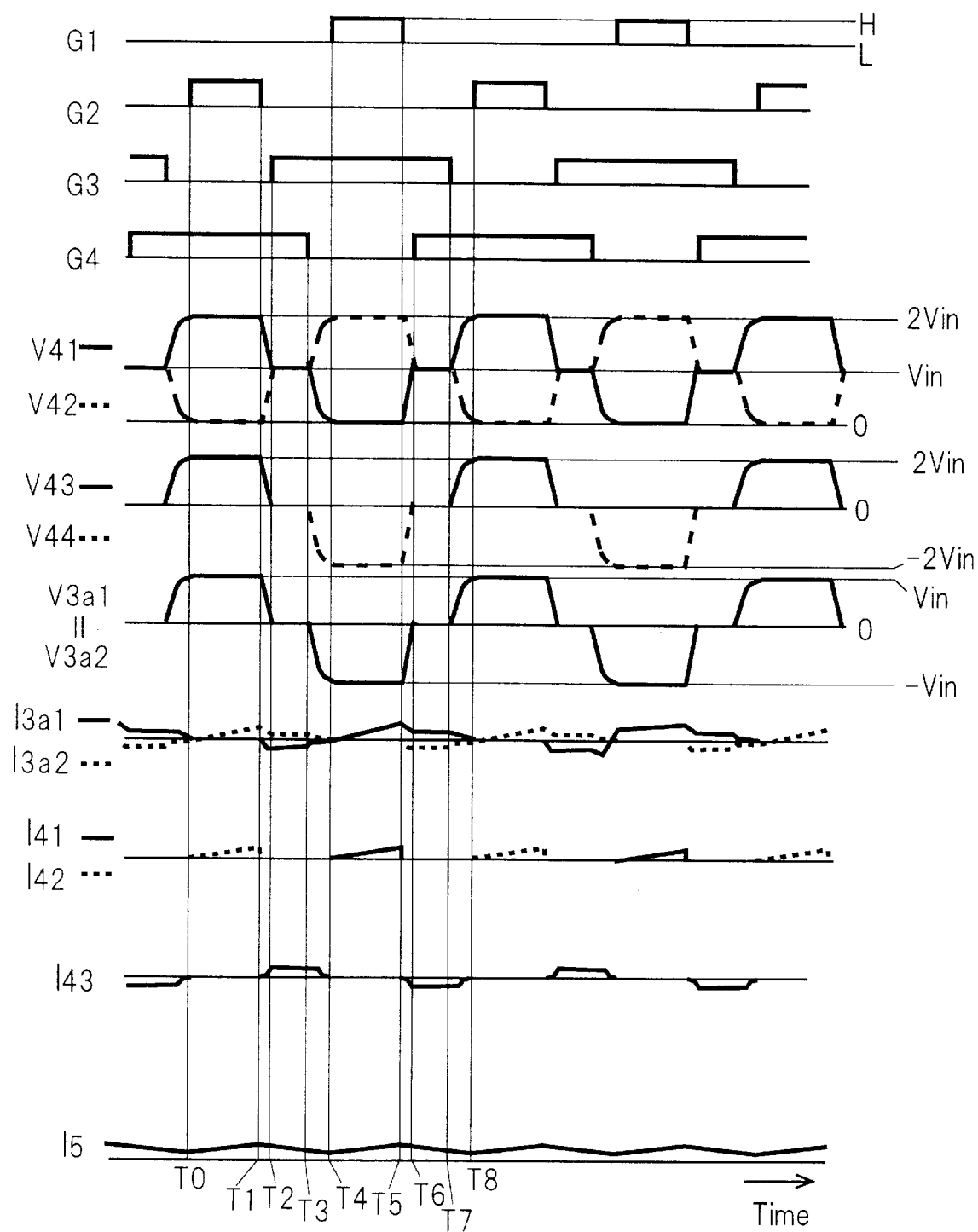
FIG. 13 is a waveform diagram of the voltage and current pulses generated in the light-load period in each part of the switching power supply of Example 4.

FIG. 13 shows the waveforms of the voltage and the current pulses generated in the light-load period in each part of the switching power supply of Example 4. In FIG. 12 and FIG. 13, the same reference signs designate the voltages and the currents in the same parts of the circuit of Example 4 shown in FIG. 11.

In comparison with the heavy-load period shown in FIG. 12, the current I5 flowing through the smoothing inductor 5 is small in the light-load period shown in FIG. 13. Accordingly, the currents I3a1 and I3a2 flowing through the primary windings 3a1 and 3a2 in the light-load period both are smaller than in the heavy-load period.

The delay circuit 38 senses the current I5 smaller than a predetermined threshold value. On the sensing, the delay circuit 38 delays the switching signals G1 and G2 input from the switching control circuit 7 for a delay time set as described below. In Example 4, the threshold value is preferably set to be about 20% of the current I5 in the heavy-load period.

The switching signals G1 and G2 are output to the first switching device 41S and the second switching device 42S, respectively, with the delay for the predetermined delay time in contrast to the heavy-load period. Thus, as is clear from the comparison between FIG. 12 and FIG. 13, the time lengths of the intervals T3–T4 and T7–T8 are longer than in the heavy-load period.

Next, the pulse waveforms (FIG. 12 and FIG. 13) in the heavy-load period of Example 4 is compared with Example 1 and Example 2. Then, as known from the comparison, the voltage V3a1 and the current I3a1 of the first primary winding 3a1 each have similar pulse waveforms to the voltage V3 and the current I3, respectively, of the primary winding 3a of Example 1 and Example 2. Further, the secondary of the transformer 3 of Example 4 has substantially the same configuration as Example 1 and Example 2. Accordingly, the dead time for satisfying the ZVS condition in the light-load period in Example 4 can be set in a manner substantially similar to Example 1 and Example 2 as follows.

The operation during the interval T3–T4 of the switching power supply of Example 4 is described below with comparison between the light -load period and the heavy-load period. The operation during the interval T7–T8 is similar to during the interval T3–T4, and hence would be easily understood from the following description. The operation during other intervals in the light-load period is similar to the heavy-load period. Hence, the description of the operation is omitted for the intervals other than the interval T3–T4.

Immediately before the time T3, the third switching section 43 and the fourth switching section 44 are ON, thereby shunting the primary windings 3a1 and 3a2. That is, the voltages V3a1 and V3a2 applied across the primary windings 3a1 and 3a2 are substantially zero. Accordingly, no substantial electromotive force from the primary is generated in the secondary windings 3b and 3c. At this time, a first secondary current I3b flows through the secondary winding 3b in the forward direction of the first rectifier diode 4b. At the same time, a second secondary current I3c flows through the secondary winding 3c in the forward direction of the second rectifier diode 4c. In this state, as described above in Example 1, the magnetic energy stored in the leakage inductances of the primary windings 3a1 and 3a2 contributes to the operation in the primary.

When the fourth switching device 44S turns OFF at the time T3, a resonance occurs among the leakage inductances of the primary windings 3a1 and 3a2, the first parasitic capacitor 41C, the second parasitic capacitor 42C and the fourth parasitic capacitor 44C. Thereby, the voltage V42 across the second switching section 42 increases from Vin. At the same time, the voltage V41 across the first switching section 41 decreases from the voltage Vin, while the voltage V44 across the fourth switching section 44 decreases from zero. Accordingly, the voltage V3a1 applied across the first primary winding 3a1 and the voltage V3a2 applied across the second primary winding 3a2 increase from zero in the negative direction. Then, an electromotive force from the primary is generated in each of the secondary windings 3b and 3c. The electromotive force acts so as to reduce the first secondary current I3b in the first secondary winding 3b and acts so as to increase the second secondary current I3c in the second secondary winding 3c.

[(A) Operation during Interval T3–T4 in the Heavy-Load Period]

Apart from the inversion in polarity, the pulse wave forms of the voltage V3a1 and the current I3a1 of the primary winding 3a1 around the time T3 in the heavy-load period is substantially the same as FIG. 3A.

In the heavy-load period, similarly to Example 1 and Example 2, the voltage V41 across the first switching section 41 can reach zero, when both of the secondary currents I3b and I3c are flowing (FIG. 3B).

At the time T31 after the time T3, the voltage V41 across the first switching section 41 reaches zero. In the interval from the time T3 to the time T31, the current I3a1 decreases in the shape of a substantial sinewave by virtue of the resonance among the leakage inductances of the primary windings 3a1 and 3a2, the first parasitic capacitor 41C, the second parasitic capacitor 42C and the fourth parasitic capacitor 44C. The resonance period is substantially proportional to the square root of the product between the leakage inductance L1 of the first primary winding 3a1 and the combined capacitance of the first parasitic capacitor 41C, the second parasitic capacitor 42C and the fourth parasitic capacitor 44C.

After the time T31, since the first diode 41D is ON, the voltage V41 across the first switching section 41 is maintained at zero. At the time T32, the current I3a1 becomes zero, and then the direction of the current I3a1 is reversed. Accordingly, by turning ON the first switching device 41S before the time T32, the ZVS is carried out for the turning ON of the first switching device 41S.

The area of the shaded region of FIG. 3A determines the time length of the interval T3–T31. The area of the shaded region corresponds to the amount of charge to be moved away from the first parasitic capacitor 41C, the second parasitic capacitor 42C and the fourth parasitic capacitor 44C so that the voltage V41 across the first switching section 41 reaches zero.

After the time T31, the current I3a1 decreases linearly, since the voltage V3a1 is maintained at a constant value, −Vin. At this time, both of the secondary currents I3b and I3c are flowing. On the other hand, no current is flowing through the second primary winding 3a2. Accordingly, the slope of the linear decrease is inversely proportional to the leakage inductance of the first primary winding 3a1. Further, the slope of the change in the current I3a1 is substantially unchanged before and after the time T31. Accordingly, ¼ of the substantial resonance period of the resonance in the interval T3–T31 is longer than the time length of the interval T3–T31, but shorter than the time length of the interval T3–T32. Accordingly, by setting the dead time to be ¼ of the substantial resonance period, the dead time satisfies the ZVS condition.

[(B) Operation during Interval T3–T4 in the Light-Load Period]

In the light-load period corresponding to case (B) of Example 1, a voltage V3a1 is provided across the first primary winding 3a1 around the time T3, while a current I3a1 flows through the first primary winding 3a1. Apart from the inversion in polarity, the pulse waveforms of the voltage V3a1 and the current I3a1 are substantially the same as FIG. 4A of Example 1.

In the light-load period corresponding to case (B) of Example 1, the time T4b when the first rectifier diode 4b turns OFF precedes the time T31 when the voltage V41 across the first switching section 41 reaches zero.

As shown in FIG. 4B, in the interval T3–T4b, both of the secondary windings 3b and 3c are provided with secondary currents I3b and I3c, respectively. Accordingly, the leakage inductance L1 of the first primary winding 3a1 contributes to the operation in the primary. Accordingly, the current I3a1 in the interval T3–T4b decreases in the shape of a substantial sinewave by virtue of the resonance among the leakage inductance L1 of the first primary winding 3a1, the first parasitic capacitor 41C, the second parasitic capacitor 42C and the fourth parasitic capacitor 44C as shown in FIG. 4A.

In the interval T4b–T31, only the second secondary current I3c flows as shown in FIG. 4B. Accordingly, the self-inductance L of the first primary winding 3a1 contributes to the operation in the primary. Thus, similarly to Example 1, the resonance period becomes much larger at the time T4b in comparison with the previous value. As a result, as shown in FIG. 4A, the decreasing of the current I3a1 is much slowed down.

After the time T31, the first diode 41D turns ON, and hence the voltage V41 across the first switching section 41 is maintained at zero. Further, similarly to the heavy-load period, the voltage V3a1 is maintained at a constant voltage, −Vin. Accordingly, the current I3a1 decreases linearly with a slope inversely proportional to the self-inductance L of the first primary winding 3a1. At the time T32, the current I3a1 becomes zero, and then the direction of the current I3a1 is reversed. Accordingly, by turning ON the first switching device 41S in the interval T31–T32, the ZVS is carried out for the turning ON of the first switching device 41S.

Similarly to Example 1, the currents I3a1 and I3a2 at the time T3 are small in the light-load period. On the other hand, the resonance period becomes longer at the time T4b, thereby extending the time length between the time T3 and the time when the currents I3a1 and I3a2 become zero. Accordingly, by extending the interval T3–T4 and equivalently the dead time, the dead time satisfies the ZVS condition.

[(C) Operation during Interval T3–T4 in Period When the Load Current is Much Smaller than in the Light-Load Period of Case (B)]

In the light-load period corresponding to case (C) of Example 1, apart from the inversion in polarity, the pulse waveforms of the voltage V3a1 and the current I3a1 of the first primary winding 3a1 around the time T3 are substantially the same as FIG. 5A.

Similarly to Example 1, further decreasing of the time average of the load current in comparison with case (B) of the light-load period causes a more delay in the time T31 when the voltage V41 across the first switching section 41 becomes zero. On the other hand, the time length of the interval T3–T4b is substantially constant at approximately ¼ of the resonance period determined by the leakage inductance L1 of the first primary winding 3a1. As a result, when the time average of the load current is sufficiently small, as shown in FIG. 5A, the interval T4b–T31 of the resonance by the self-inductance L of the first primary winding 3a1 is sufficiently long to neglect the interval T3–T4b of the resonance by the leakage inductance L1. In the light-load period of this extent, the interval T3–T4 and equivalently the dead time are set to be ¼ of the resonance period determined by the self-inductance L of the first primary winding 3a1. Thereby, the dead time satisfies the ZVS condition.

Similarly to Example 1, the period of the resonance among the first primary winding 3a1, the first parasitic capacitor 41C, the second parasitic capacitor 42C and the fourth parasitic capacitor 44C cannot substantially exceed the length determined by the self-inductance L of the first primary winding 3a1. Accordingly, when the currents I3a1 and I3a2 at the time T3 become much smaller, the dead time of any time length does not satisfy the ZVS condition.

In Example 4, the region of the dead time for satisfying the ZVS condition for various values of the time average of load current is generally as shown in FIG. 6 similarly to Example 1. Accordingly, depending on the value of the load current, the dead time is adjusted to fall within the region shown in FIG. 6. Thus, the dead time substantially satisfies the ZVS condition for the load current of any value.

Similarly to Example 1, in Example 4, a threshold value Ith is firstly defined within the range specified by arrow B. Further, the dead time is set at the values D1 and D2, when the load current is substantially larger and smaller than the threshold value Ith, respectively. That is, the dead time is set on the bent line D shown as the broken line in FIG. 6.

Similarly to Example 1, setting the dead time at D1 in the heavy-load period is the conventional approach of the known switching control circuit 7 (FIG. 11). In addition to the conventional approach, in Example 4, the delay time of the delay circuit 38 is set to be D2−D1≈D2 (because D2>>D1), when the load current is substantially smaller than the threshold value Ith. The time average of the load current correlates with the value of the current I5. Accordingly, a threshold value can be set for the current I5, correspondingly to the threshold value Ith for the load current. When the current I5 is substantially smaller than the threshold value, the load current is also substantially smaller than the threshold value Ith.

Thus, in Example 4, the dead time can be set with the delay circuit 38 so that the ZVS is carried out for the turning ON of the first switching device 41S even in the light-load period.

The range of the dead time for satisfying the ZVS condition shown in FIG. 6 has a lower limit Imin. The dead time of any time length cannot satisfy the ZVS condition for the load current smaller than the lower limit Imin. However, in this case, the dead time is set at D2 as described above. Thereby, the amount of charge left in the first parasitic capacitor 41C (FIG. 11) at the time T4 (FIG. 13) is smaller than in the prior art in which the dead time is fixed at D1. Accordingly, the switching loss at the time T4 is reduced in Example 4 in comparison with the prior art.

In Example 4, as shown by the bent line D in FIG. 6, the dead time is set discretely with a discontinuation at the threshold value Ith for the load current. However, the dead time may be otherwise set on any straight or curved line in the region specified by arrow B in FIG. 6, as long as the line is included within the region satisfying the ZVS condition.

EXAMPLE 5

Example 5 of the present invention is described below. In Example 5, the present invention is implemented in a switching power supply comprising a push-pull type converter with an auxiliary winding.

Figure 14:
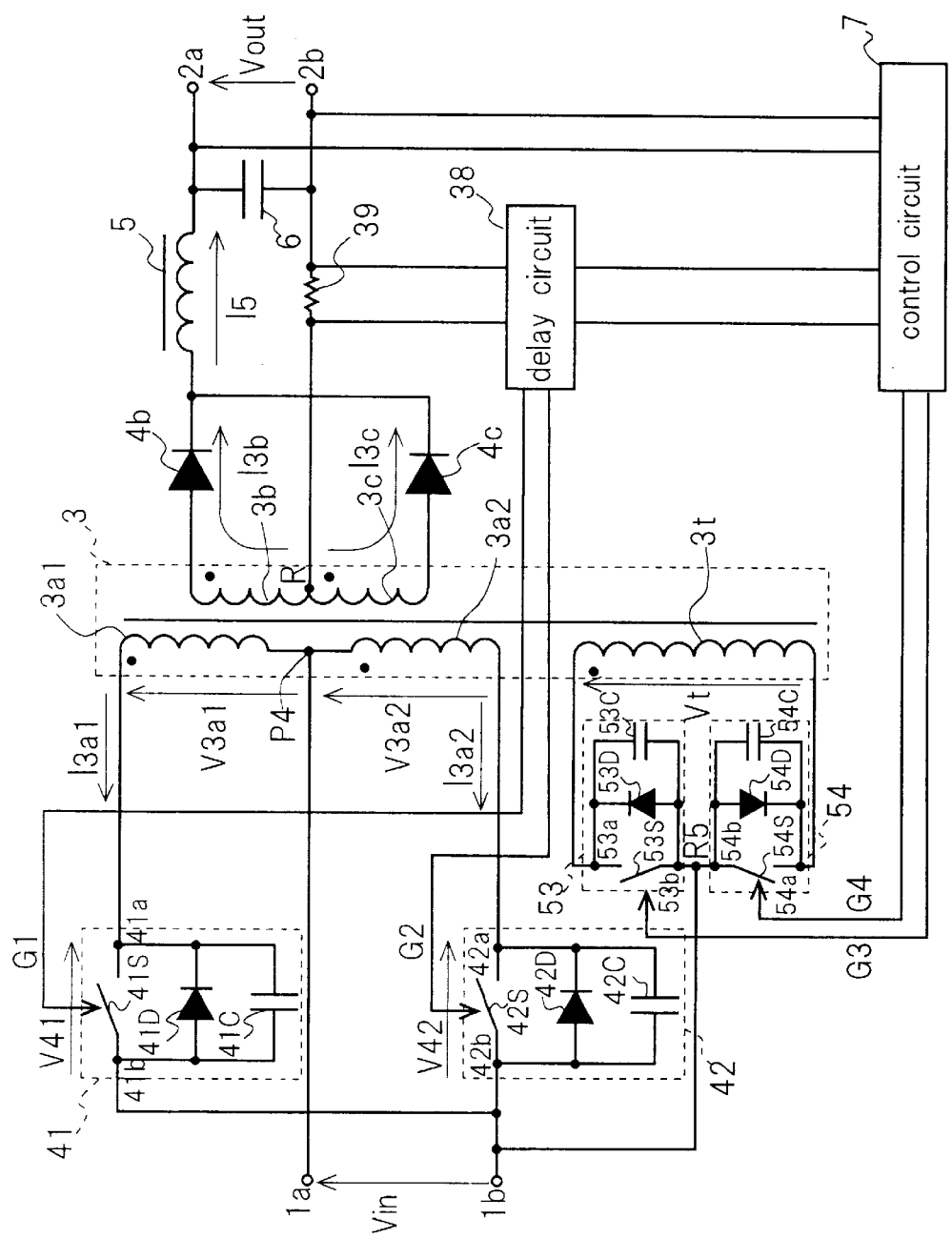
FIG. 14 is a circuit diagram showing the configuration of a switching power supply of Example 5 according to the present invention.

FIG. 14 shows the circuit of a switching power supply of Example 5. In FIG. 14, the same reference signs as in Example 4 (FIG. 11) designate the similar components of Example 4, and the explanation of the similar components in Example 4 is cited as the explanation of the components in Example 5.

In Example 5, the transformer 3 further comprises an auxiliary winding 3t. The ratio between the turn numbers of the auxiliary winding 3t and the primary windings 3a1 and 3a2 is 1:2. Hence, the voltage Vt applied across the auxiliary winding 3t is substantially equal to twice the voltage V3a1 applied across the first primary winding 3a1.

In contrast to Example 4, the third switching section 53 and the fourth switching section 54 are connected in parallel to the auxiliary winding 3t. Similarly to the first switching section 41 and the second switching section 42, each of the third switching section 53 and the fourth switching section 54 comprises a switching device, a diode and a capacitor interconnected in parallel.

The switching devices 53S and 54S preferably comprise MOS-FET's. Alternatively, they may comprise bi-polar transistors or IGBT's. The switching devices 53S and 54S are interconnected in series. The junction point R5 between the switching devices 53S and 54S is connected to the second input terminal 1b.

The anodes of the third diode 53D and the fourth diode 54D are connected to the junction point R5. The diodes 53D and 54D are preferably body diodes of the switching devices 53S and 54S, respectively. Alternatively, the diodes 53D and 54D may be independent devices separate from the switching devices 53S and 54S.

Parasitic capacitors 53C and 54C are parasitic capacitors equivalently connected in parallel to the switching devices 53S and 54S, respectively. The parasitic capacitors 53C and 54C equivalently include not only the parasitic capacitors of the respective switching devices but also the parasitic capacitors of the wiring and the auxiliary winding 3t. Further, the parasitic capacitors 53C and 54C may include independent capacitor devices.

The third switching device 53S and the fourth switching device 54S of Example 5 are turned ON and OFF substantially at the same timing as the third switching device 43t and the fourth switching device 44S of Example 4, as shown in FIG. 12 and FIG. 13. As described above, the ratio of voltages between the primary windings 3a1 and 3a2 and the auxiliary winding 3t is always substantially 1:1:2. Accordingly, the operation in Example 5 is substantially similar to Example 4. Here, in the intervals T2–T3 and T6–T7, the primary windings 3a1 and 3a2 are shunted in Example 4. In contrast, in Example 5, the auxiliary winding 3t is shunted, whereby no substantial current flows through the primary windings 3a1 and 3a2.

The operation in Example 5 is substantially identical to that of Example 4. Accordingly, the ZVS is carried out for the turning ON of the first switching device 41S and the second switching device 42S by extending the dead time in the light-load period similarly to Example 4.

In Example 5, the junction point R5 between the third switching device 53S and the fourth switching device 54S is connected to the second input terminal 1b. Accordingly, the potential at the junction point R5 is always constant. Thus, the levels of the high potential (H) and the low potential (L) can be maintained constant for the switching signals G3 and G4 output from the switching control circuit 7 to the third switching device 53S and the fourth switching device 54S.

Position for Current Sensing

In any of the above-mentioned examples, the time average of the current flowing through each part of the circuit correlates with the time average of the load current. Accordingly, the position for current sensing by each delay circuit is not restricted to those described above.

In Examples 6–19 described below, the position for current sensing by the delay circuit is different from Examples 1–5. These examples are illustrative and not restrictive, and hence it should be noted that the present invention is not restricted to those positions for current sensing by the delay circuit.

Further, the load current sensing section may be the means of a current transformer 9 of Example 1, the means of measuring the voltage drop across a current sensing resistor of Example 2 and the like, and the means of measuring the current through detecting the magnetic field generated by the current with a Hall probe and the like. In that case, depending on the characteristics of the current in the sensing position, any appropriate means maybe selected as long as the time average of the current can be measured with precision. For example, a current sensing resistor is applicable, in case that a one-way current is measured. Further, a current transformer is applicable, in case that a periodically alternating current is measured.

EXAMPLE 6

Figure 17:
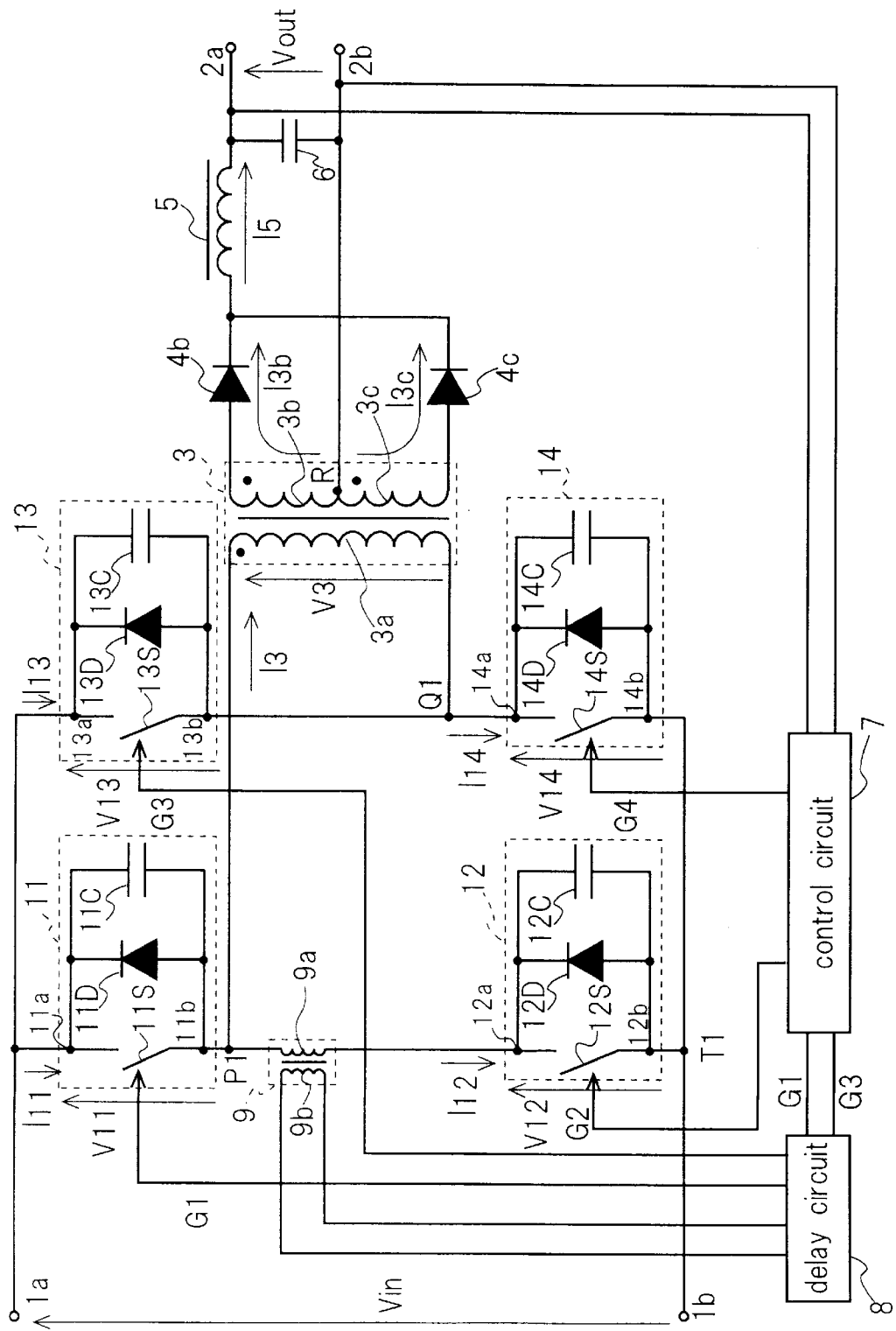
FIG. 17 is a circuit diagram showing the configuration of a switching power supply of Example 6 according to the present invention.

FIG. 17 shows a circuit of Example 6. The configuration of Example 6 is identical to Example 1 (FIG. 1) except for the point that a primary winding 9a of a current transformer 9 is connected in series between the junction point P1 of the first switching section 11 and the second switching section 12, and the cathode 12a of the second switching section 12. In spite of this change in the connecting position of the current transformer 9, the operation in Example 6 is similar to that in Example 1. That is, current and voltage are generated in each part of Example 6 as shown in FIG. 16 in the heavy-load period and as shown in FIG. 2 in the light-load period. The delay circuit 8 of Example 1 measures the input current I9, whereas the delay circuit 8 of Example 6 measures the current I12 flowing through the second switching section 12. As is clear from the comparison between the currents I12 and I9 shown in FIG. 16 and FIG. 2, the current I12 reverses the direction periodically incontrast to the current I9 flowing substantially in one direction. Accordingly, in Example 6, the output from the secondary winding 9b of the current transformer 9 is rectified, and then the time average of the output is measured.

EXAMPLE 7

FIG. 18 shows a circuit of Example 7. The configuration of Example 7 is identical to Example 1 (FIG. 1) except for the point that a primary winding 9a of a current transformer 9 is connected in series between the junction point P1 of the first switching section 11 and the second switching section 12, and the primary winding 3a of the transformer 3. In spite of this change in the connecting position of the current transformer 9, the operation in Example 7 is similar to Example 1. That is, current and voltage are generated in each part of Example 7 as shown in FIG. 16 in the heavy-load period and as shown in FIG. 2 in the light-load period. The delay circuit 8 of Example 1 measures the input current I9, whereas the delay circuit 8 of Example 7 measures the current I3 flowing through the primary winding 3a of the transformer 3. As is clear from the comparison between the currents I3 and I9 shown in FIG. 16 and FIG. 2, the current I3 reverses the direction periodically. Accordingly, in Example 7, the output from the secondary winding 9b of the current transformer 9 is rectified, and then the time average of the output is measured.

EXAMPLE 8

Figure 19:
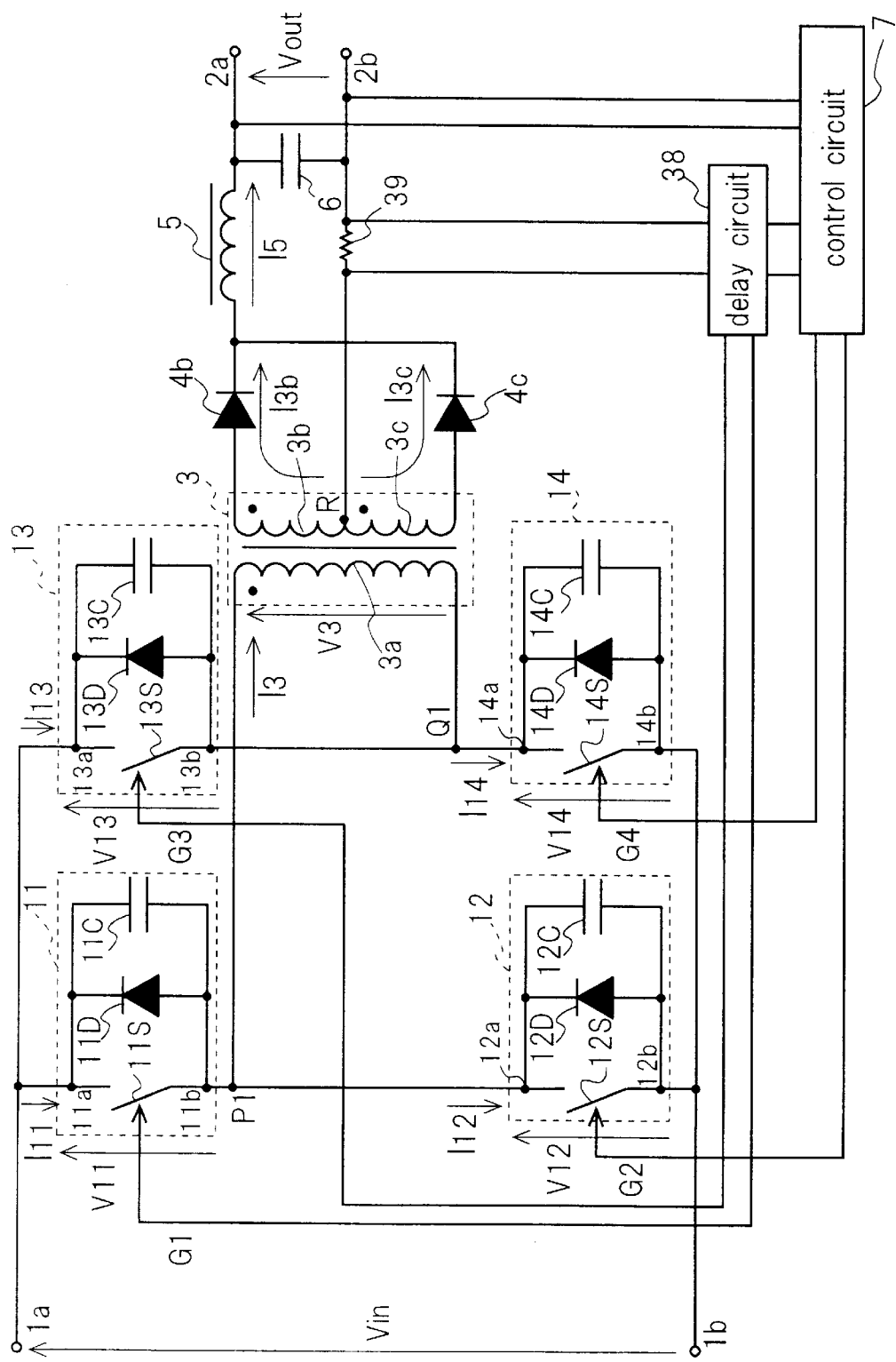
FIG. 19 is a circuit diagram showing the configuration of a switching power supply of Example 8 according to the present invention.

FIG. 19 shows a circuit of Example 8. In Example 8, the delay circuit 8 and the current transformer 9 of Example 1 (FIG. 1) are replaced with a delay circuit 38 and an output current sensing resistor 39 of Example 3 (FIG. 10), respectively. The other configuration is identical to that of Example 1. The resistance of the output current sensing resistor 39 is sufficiently small to neglect the influence on the output current and the output voltage Vout. Accordingly, the operation in Example 8 is similar to Example 1. That is, current and voltage are generated in each part of Example 8 as shown in FIG. 16 in the heavy-load period and as shown in FIG. 2 in the light load period. In contrast to Examples 1, 6, and 7, the output current is substantially measured in Example 8. Thereby, Example 8 has an advantage that the determination of the light-load period can be carried out securely and a disadvantage that the measurement of the current may affect the output.

EXAMPLE 9

Figure 20:
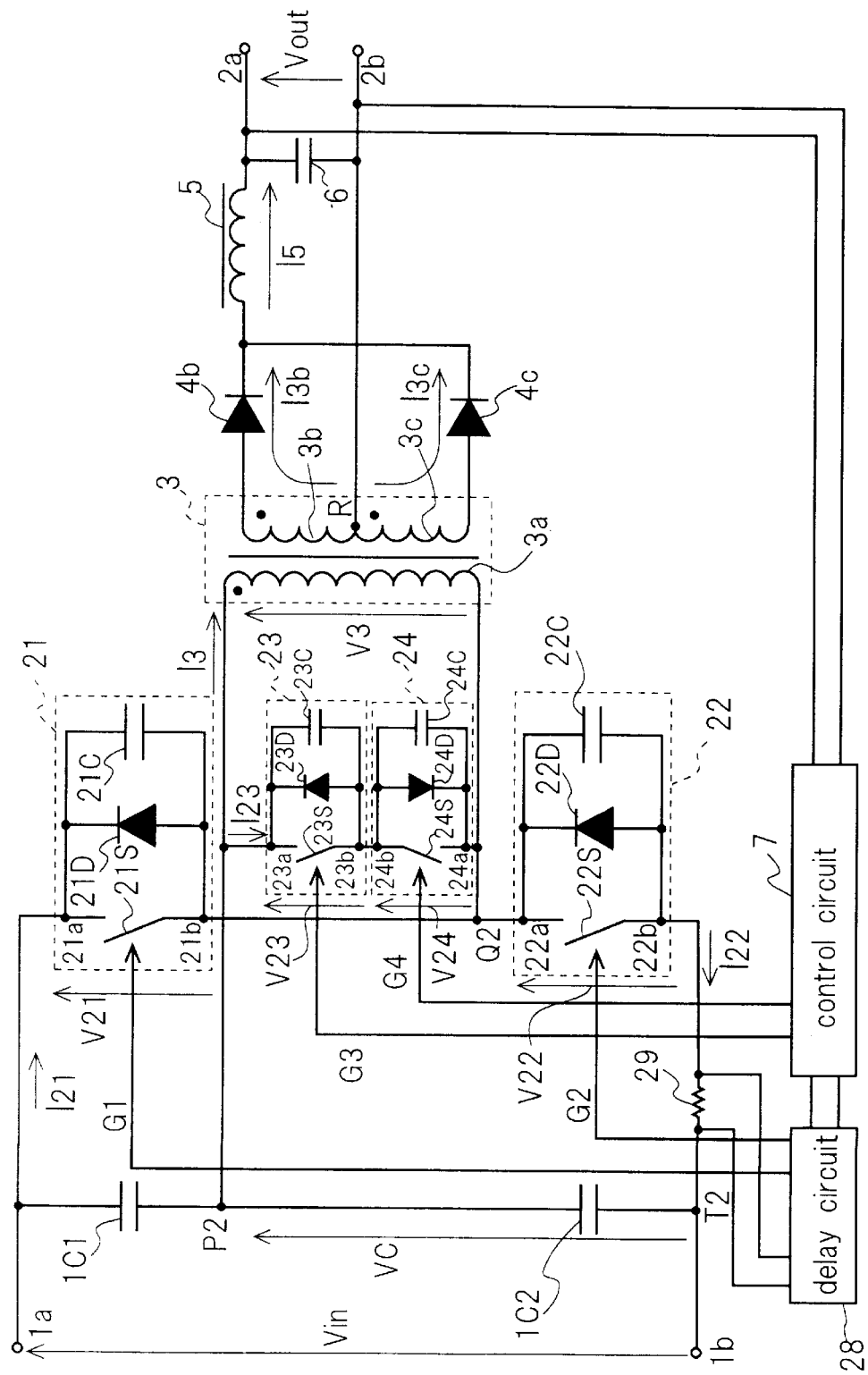
FIG. 20 is a circuit diagram showing the configuration of a switching power supply of Example 9 according to the present invention.

FIG. 20 shows a circuit of Example 9. The configuration of Example 9 is identical to Example 2 (FIG. 7) except for the connecting position of a current sensing resistor 29. The current sensing resistor 29 is connected in series between the junction point T2 of the second voltage dividing capacitor 1C2 and the anode 22b of the second switching section 22, and the anode 22b of the second switching section 22. In spite of this change in the connecting position of the current sensing resistor 29, the operation in Example 9 is similar to Example 2. That is, current and voltage are generated in each part of Example 9 as shown in FIG. 8 in the heavy-load period and as shown in FIG. 9 in the light-load period. The delay circuit 28 of Example 2 measures the input current I29, whereas the delay circuit 28 of Example 9 measures the current I22 flowing through the second switching section 22. As is clear from the comparison between the currents I22 and I29 shown in FIG. 8 and FIG. 9, the frequency of the current I22 is substantially half that of the current I29. However, the pulse waveforms are substantially common with each other. Accordingly, the threshold value of the delay circuit 28 of Example 9 is set to be substantially half the threshold value I29th set for the current I29 in Example 2.

EXAMPLE 10

Figure 21:
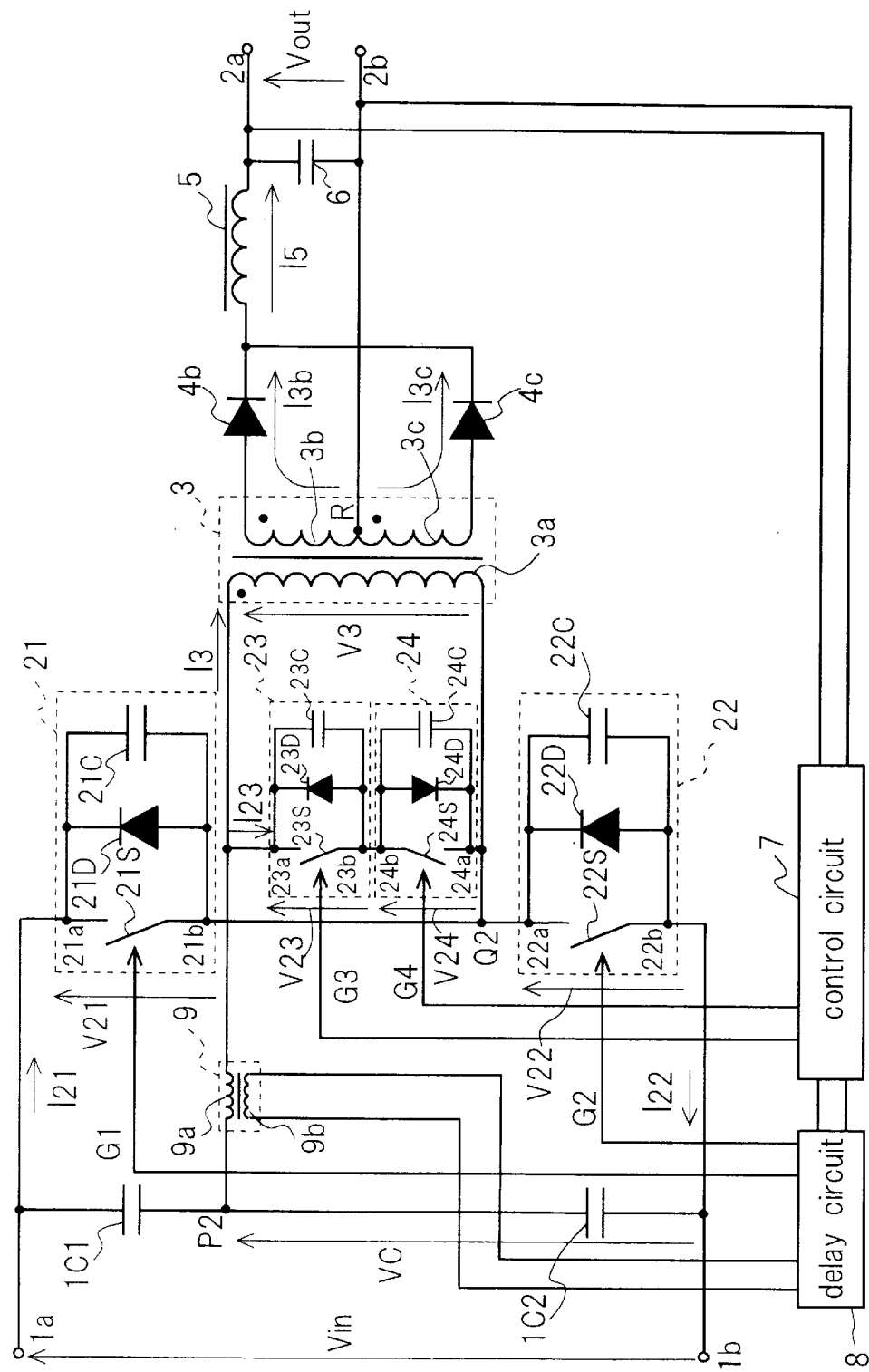
FIG. 21 is a circuit diagram showing the configuration of a switching power supply of Example 10 according to the present invention.

FIG. 21 shows a circuit of Example 10. In Example 10, the delay circuit 28 and the current sensing resistor 29 of Example 2 (FIG. 7) are replaced with a delay circuit 8 and a current transformer 9 of Example 7 (FIG. 18), respectively. The other configuration is identical to Example 2. The primary winding 9a of the current transformer 9 is connected in series between the junction point P2 of the first voltage dividing capacitor 1C1 and the second voltage dividing capacitor 1C2, and the primary winding 3a of the transformer 3. In spite of the current transformer 9 having such configuration, the operation in Example 10 is similar to Example 2. That is, current and voltage are generated in each part of Example 10 as shown in FIG. 8 in the heavy-load period and as shown in FIG. 9 in the light-load period. Similarly to Example 7, the delay circuit 8 measures the current I3 flowing through the primary winding 3a. Since the current I3 reverses the direction periodically, the delay circuit 8 rectifies the output from the secondary winding 9b of the current transformer 9, and then measures the time average of the output.

EXAMPLE 11

Figure 22:
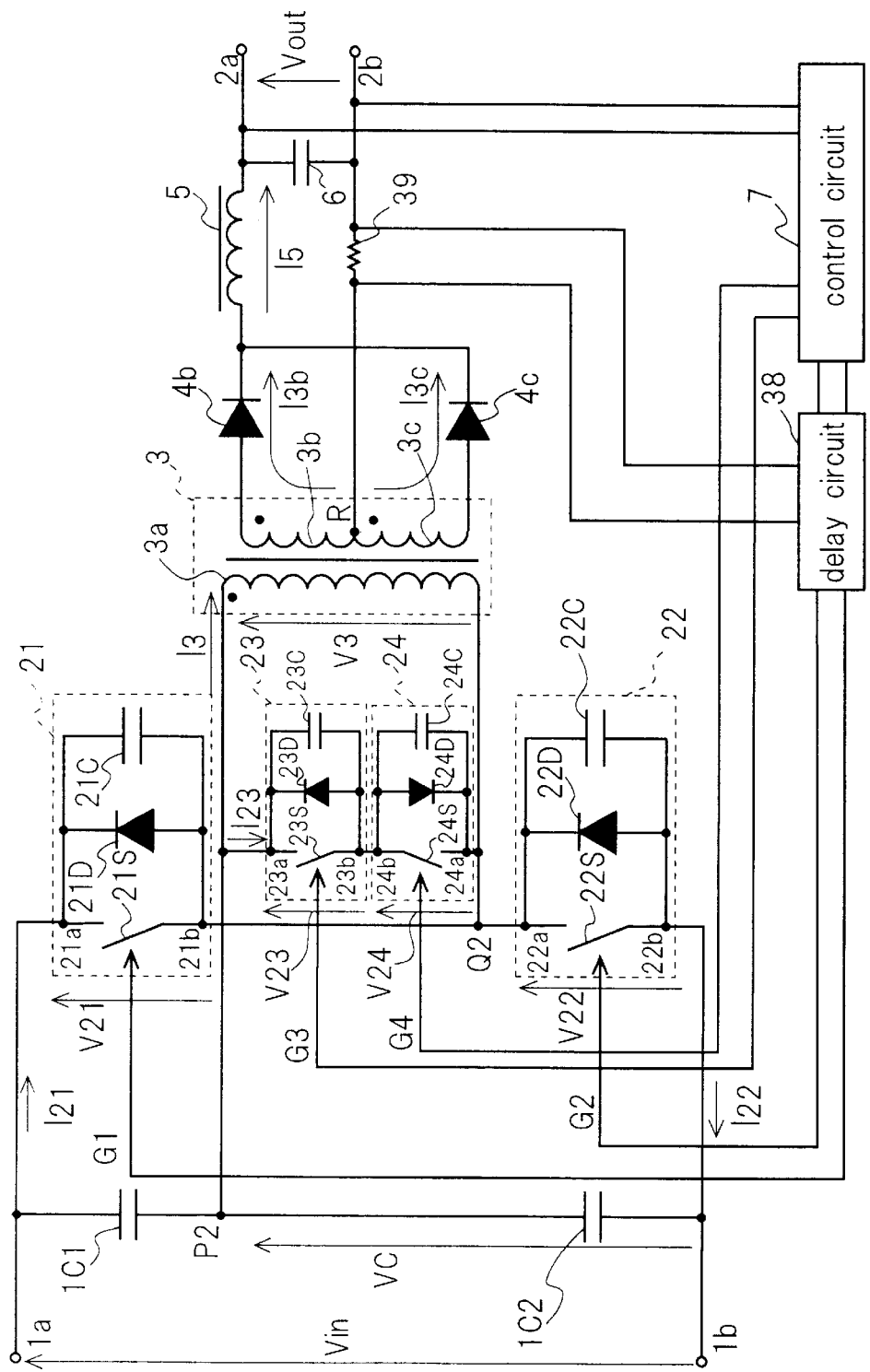
FIG. 22 is a circuit diagram showing the configuration of a switching power supply of Example 11 according to the present invention.

FIG. 22 shows a circuit of Example 11. In Example 11, the delay circuit 28 and the current sensing resistor 29 of Example 2 (FIG. 7) are replaced with a delay circuit 38 and an output current sensing resistor 39 of Example 3 (FIG. 10), respectively. The other configuration is identical to Example 2. The output current sensing resistor 39 is connected in series between. the junction point R of the first secondary winding 3b and the second secondary winding 3c, and the connected end of the smoothing capacitor 6 to the second output terminal 2b. The resistance of the output current sensing resistor 39 is sufficiently small to neglect the influence on the output current and the output voltage Vout. Accordingly, the operation in Example 11 is similar to Example 2. That is, current and voltage are generated in each part of Example 11 as shown in FIG. 8 in the heavy-load period and as shown in FIG. 9 in the light-load period. In contrast with Examples 2, 9, and 10, the output current is substantially measured in Example 11. Accordingly, Example 11 has an advantage that the determination of the light-load period can be carried out securely and a disadvantage that the measurement of the current may affect the output.

EXAMPLE 12

Figure 23:
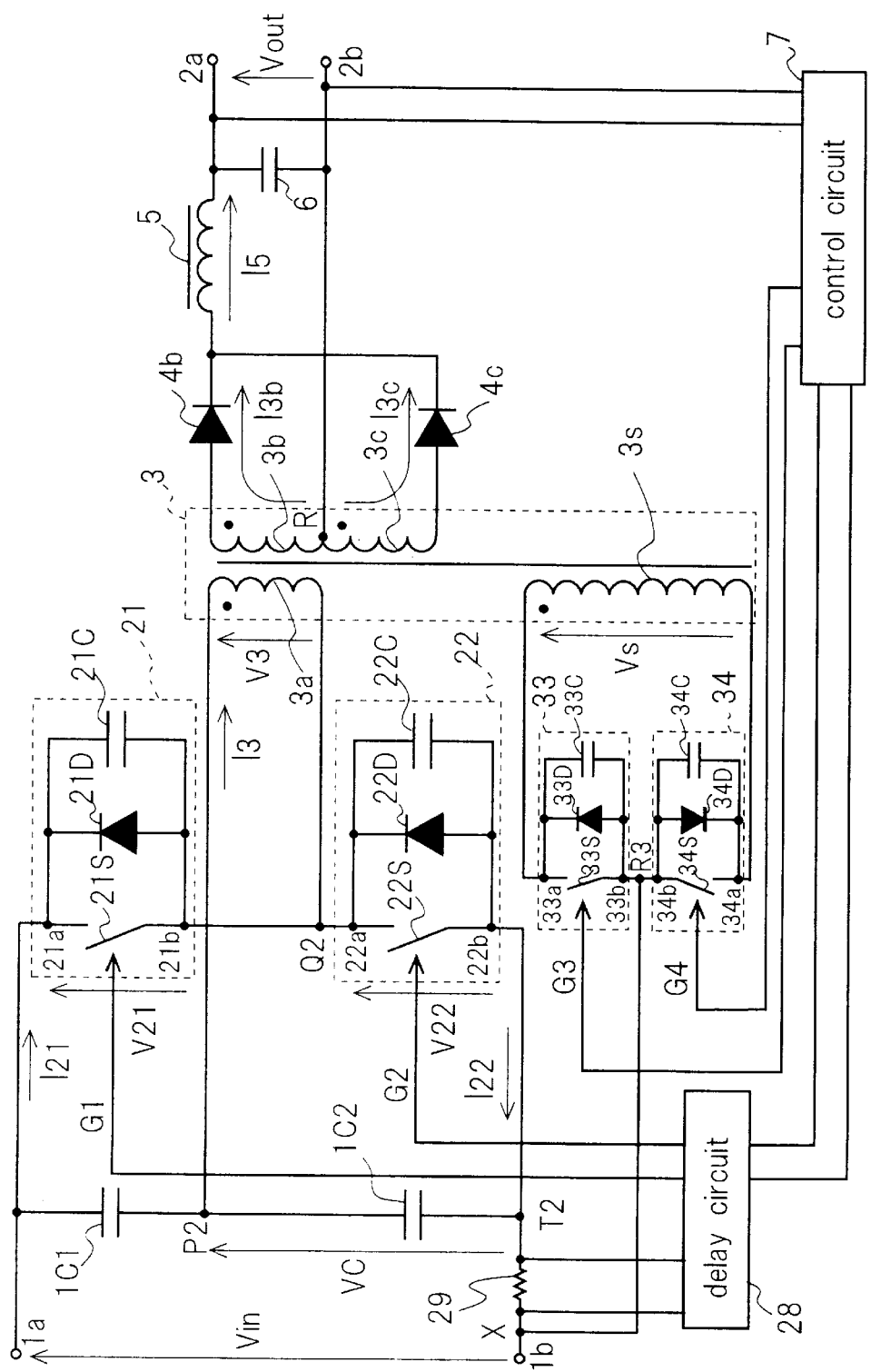
FIG. 23 is a circuit diagram showing the configuration of a switching power supply of Example 12 according to the present invention.

FIG. 23 shows a circuit of Example 12. In Example 12, the delay circuit 38 and the output current sensing resistor 39 of Example 3 (FIG. 10) are replaced with a delay circuit 28 and a current sensing resistor 29 of Example 2 (FIG. 7), respectively. The other configuration is identical to Example 3. The current sensing resistor 29 is connected in series between the junction point T2 of the second voltage dividing capacitor 1C2 and the anode 22b of the second switching section 22, and the junction point X adjacent to the second input terminal 1b. Here, the junction point X links the junction point R3 between the third switching section 33 and the fourth switching section 34 to the second input terminal 1b. The resistance of the current sensing resistor 29 is sufficiently small to neglect the influence on the input current and the input voltage Vin. Accordingly, the operation in Example 12 is similar to Example 3. Further, the current sensing resistor 29 is connected on the high potential side with respect to the junction point X, and hence does not change the gate potentials of the third switching device 33S and the fourth switching device 34S.

EXAMPLE 13

Figure 24:
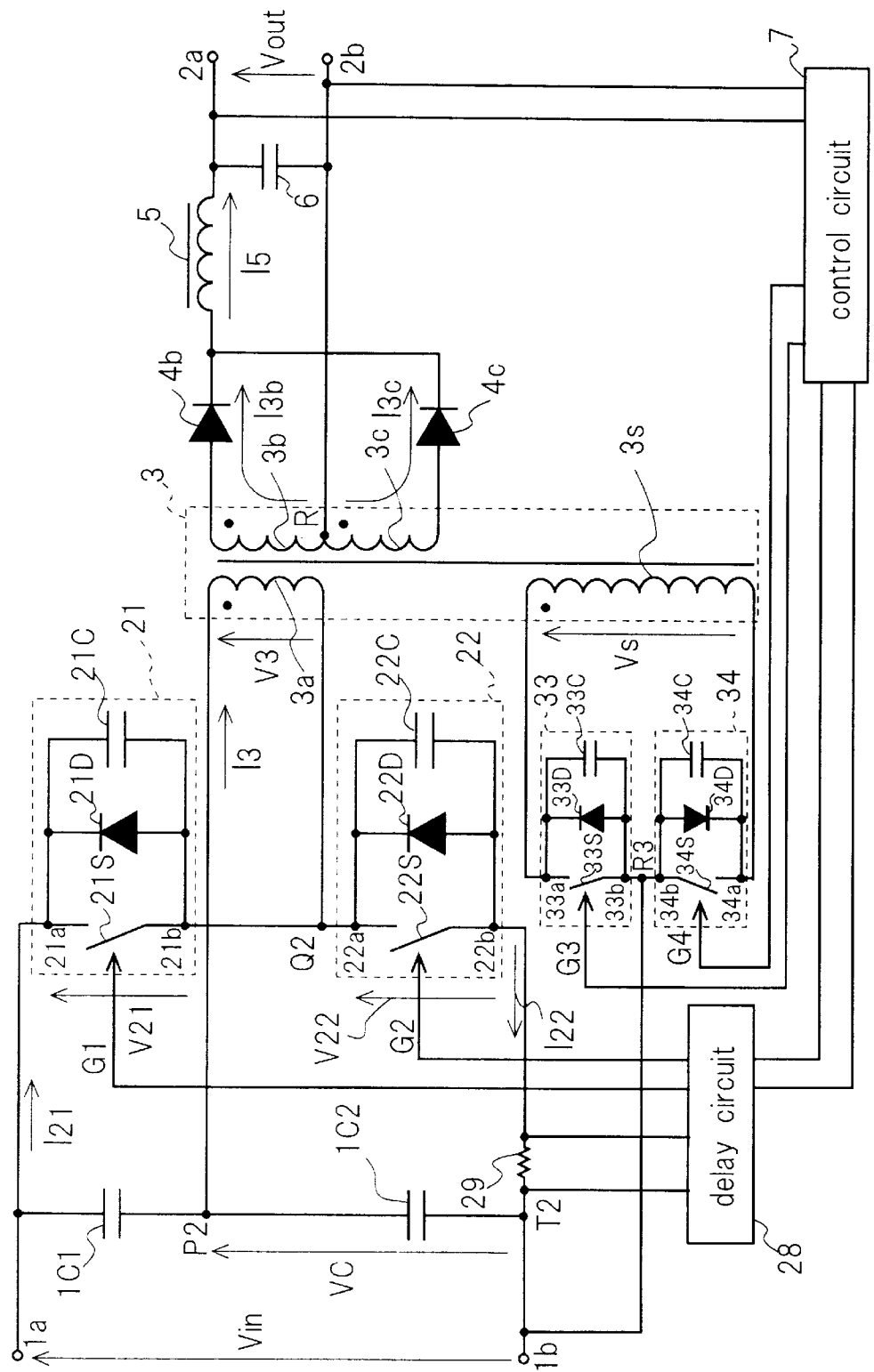
FIG. 24 is a circuit diagram showing the configuration of a switching power supply of Example 13 according to the present invention.

FIG. 24 shows a circuit of Example 13. The configuration of Example 13 is identical to Example 12 (FIG. 23) except for the point that a current sensing resistor 29 is connected in series between the junction point T2 of the second voltage dividing capacitor 1C2 and the anode 22b of the second switching section 22, and the anode 22b of the second switching section 22. In spite of this change in the connecting position of the current sensing resistor 29, the operation in Example 13 is similar to Example 12.

EXAMPLE 14

Figure 25:
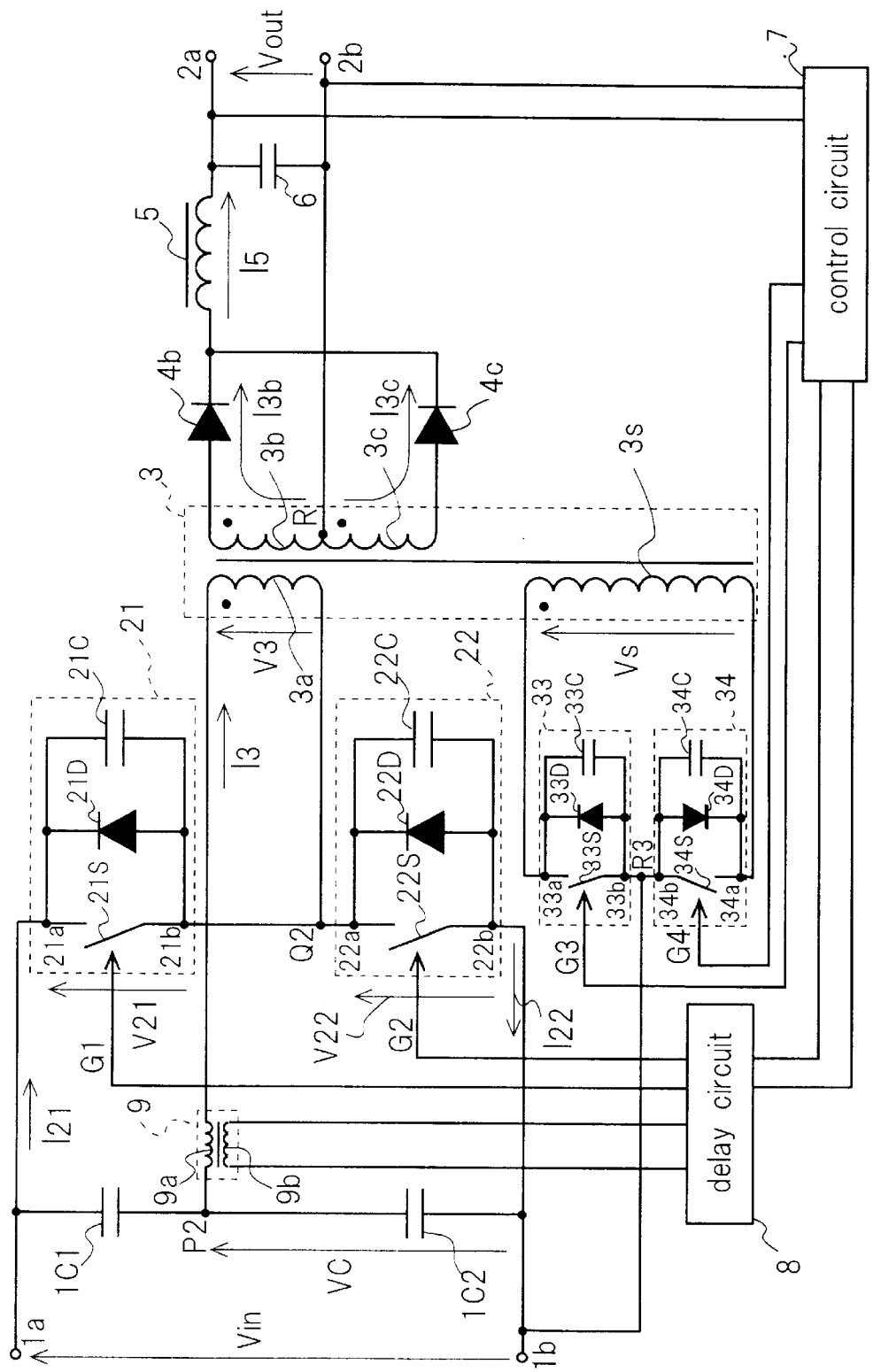
FIG. 25 is a circuit diagram showing the configuration of a switching power supply of Example 14 according to the present invention.

FIG. 25 shows a circuit of Example 14. In Example 14, the delay circuit 28 and the current sensing resistor 29 of Example 12 (FIG. 23) are replaced with a delay circuit 8 and a current transformer 9 of Example 7 (FIG. 18), respectively. The other configuration is identical to Example 12. The primary winding 9a of the current transformer 9 is connected in series between the junction point P2 of the first voltage dividing capacitor 1C1 and the second voltage dividing capacitor 1C2, and the primary winding 3a of the transformer 3. In spite of the current transformer 9 having such configuration, the operation in Example 14 is similar to Example 12. Similarly to Example 7, the delay circuit 8 measures the current I3 flowing through the primary winding 3*a*. Since the current I3 reverses the direction periodically, the delay circuit 8 rectifies the output from the secondary winding 9*b* of the current transformer 9, and then measures the time average of the output.

EXAMPLE 15

Figure 26:
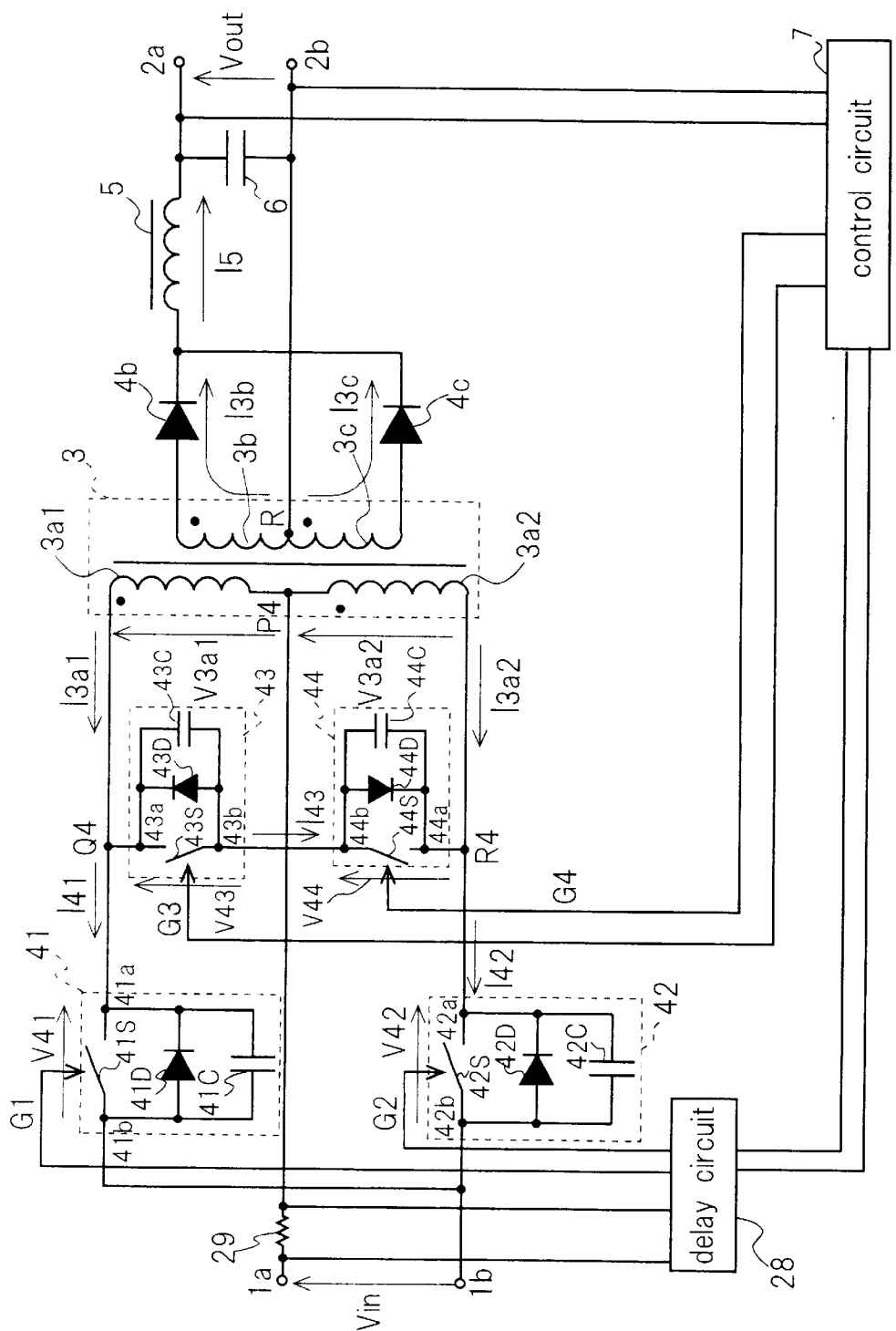
FIG. 26 is a circuit diagram showing the configuration of a switching power supply of Example 15 according to the present invention.

FIG. 26 shows a circuit of Example 15. In Example 15, the delay circuit 38 and the output current sensing resistor 39 of Example 4 (FIG. 11) are replaced with a delay circuit 28 and a current sensing resistor 29 of Example 2 (FIG. 7), respectively. The other configuration is identical to Example 4. The current sensing resistor 29 is connected in series between the junction point P4 of the first primary winding 3*a*1 and the second primary winding 3*a*2, and the first input terminal 1*a*. The resistance of the current sensing resistor 29 is sufficiently small to neglect the influence on the input current and the input voltage Vin. Accordingly, the operation in Example 15 is similar to Example 4. That is, current and voltage are generated in each part of Example 15 as shown in FIG. 12 in the heavy-load period and as shown in FIG. 13 in the light-load period.

EXAMPLE 16

Figure 27:
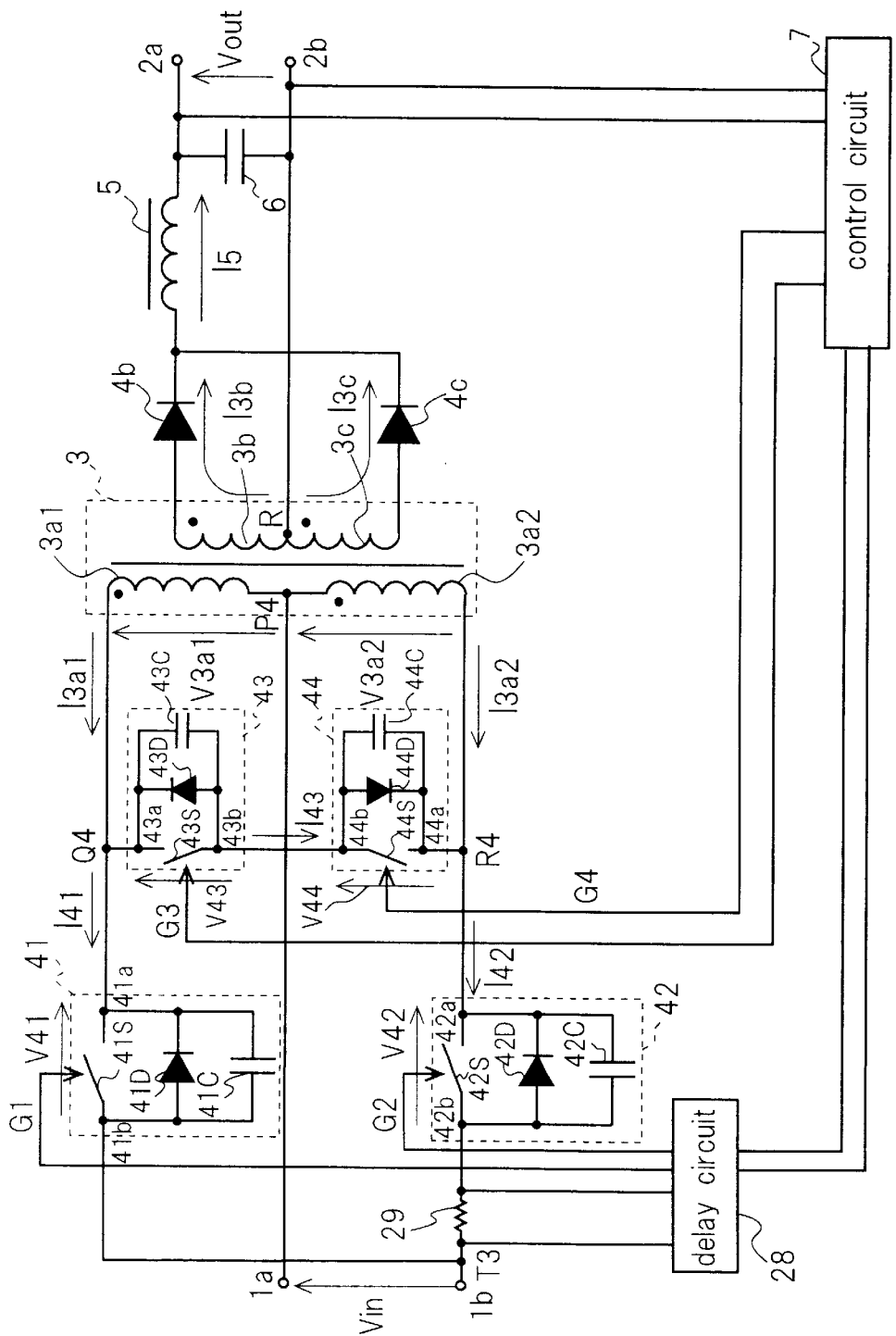
FIG. 27 is a circuit diagram showing the configuration of a switching power supply of Example 16 according to the present invention.

FIG. 27 shows a circuit of Example 16. The configuration of Example 16 is identical to Example 15 (FIG. 26) except for the point that a current sensing resistor 29 is connected in series between the junction point T3 of the anode 41*b* of the first switching section 41 and the second input terminal 1*b*, and the anode 42*b* of the second switching section 42. The resistance of the current sensing resistor 29 is sufficiently small to neglect the influence on the input current and the input voltage Vin. Accordingly, the operation in Example 16 is similar to Example 15.

EXAMPLE 17

Figure 28:
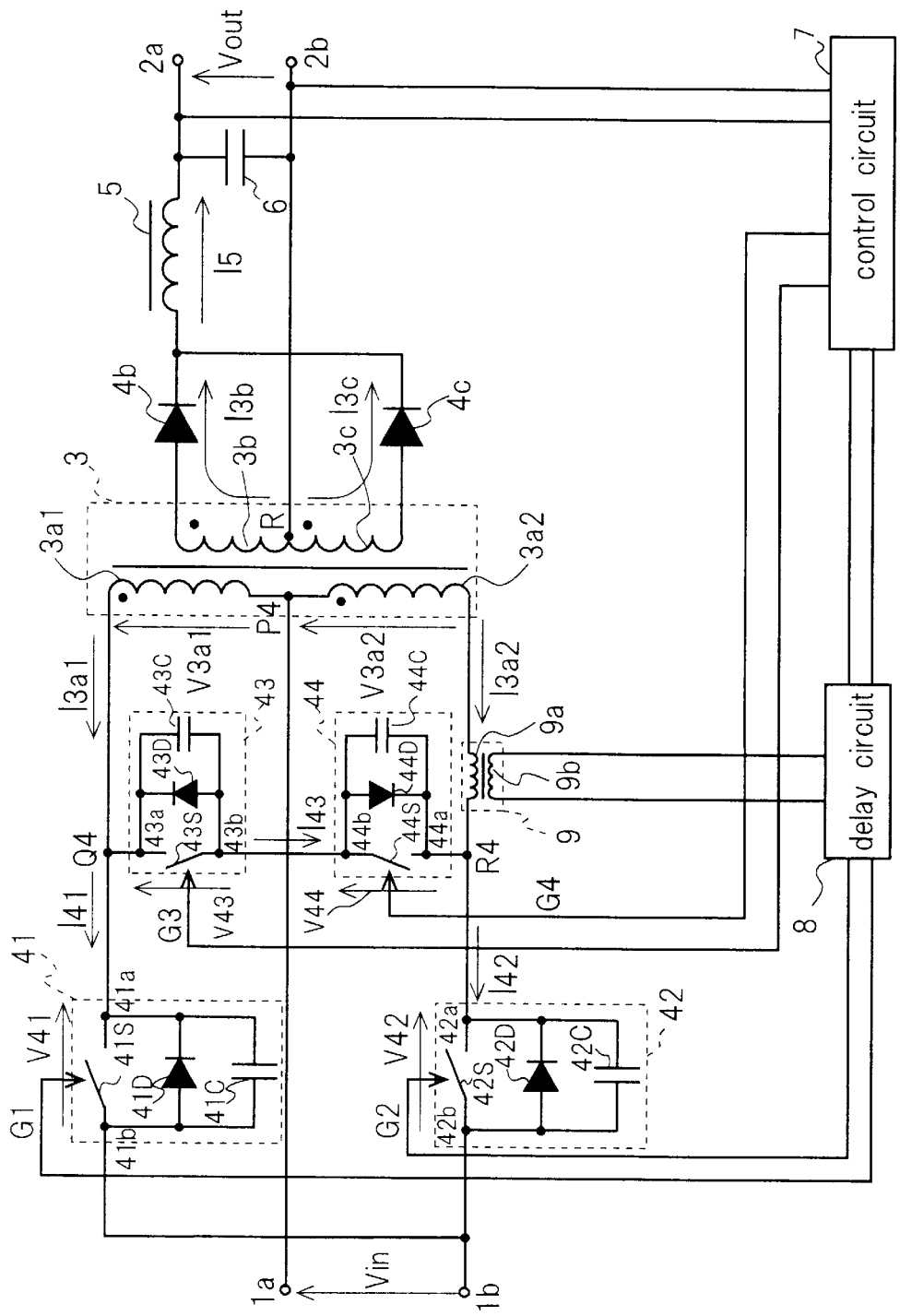
FIG. 28 is a circuit diagram showing the configuration of a switching power supply of Example 17 according to the present invention.

FIG. 28 shows a circuit of Example 17. In Example 17, the delay circuit 38 and the output current sensing resistor 39 of Example 4 (FIG. 11) are replaced with a delay circuit 8 and a current transformer 9 of Example 1 (FIG. 1), respectively. The other configuration is identical to Example 4. The primary winding 9*a* of the current transformer 9 is connected in series between the junction point R4 of the cathode 42*a* of the second switching section 42 and the cathode 44*a* of the fourth switching section 44, and the second primary winding 3*a*2 of the transformer 3. In spite of the current transformer 9 having such configuration, the operation in Example 17 is similar to Example 4. The delay circuit 8 measures the current I3*a*2 flowing through the second primary winding 3*a*2. As shown in FIG. 12 and FIG. 13, the delay circuit 8 rectifies the output from the secondary winding 9*b* of the current transformer 9, and then measures the time average of the output, since the current I3*a*2 reverses the direction periodically.

EXAMPLE 18

Figure 29:
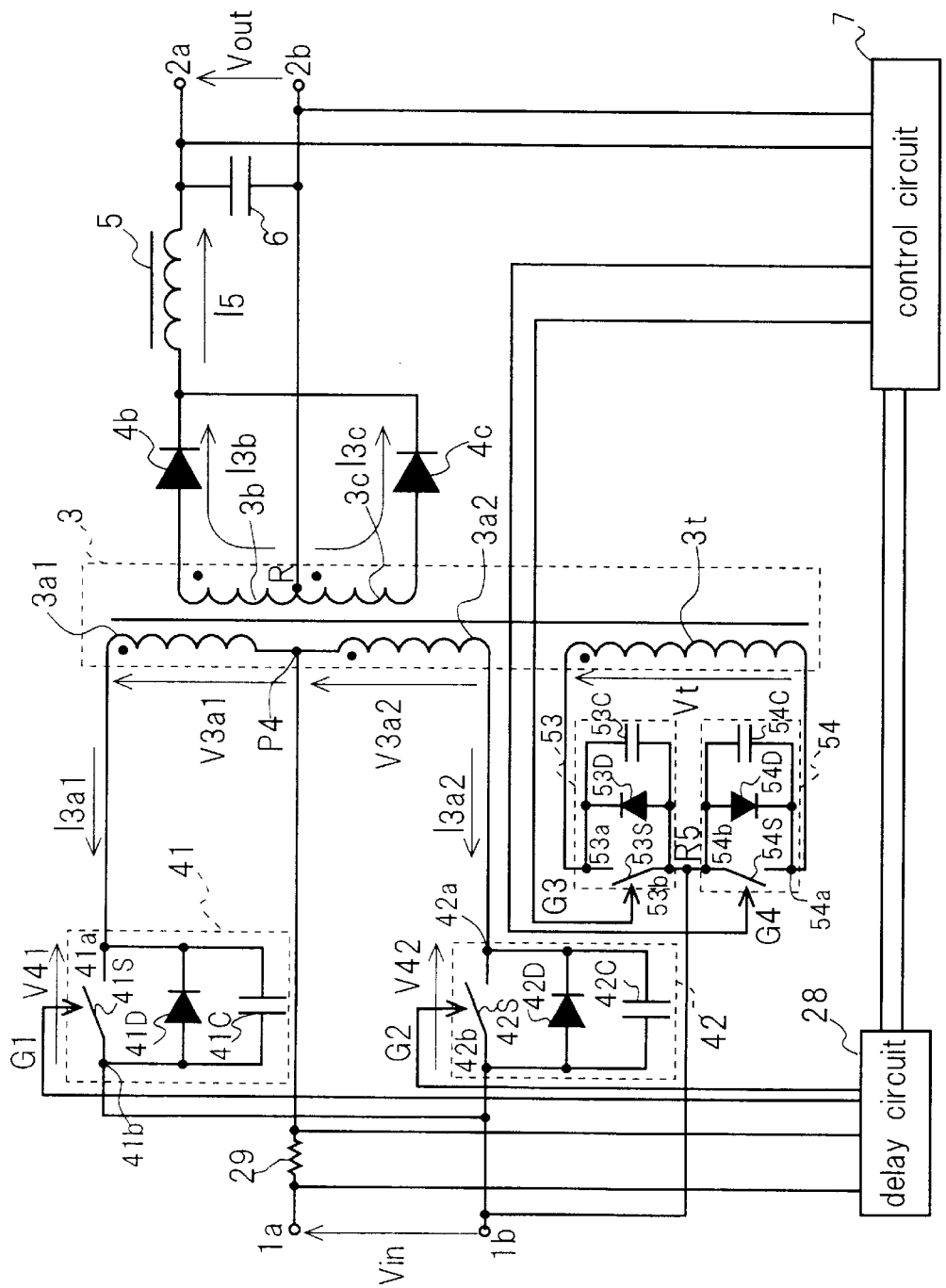
FIG. 29 is a circuit diagram showing the configuration of a switching power supply of Example 18 according to the present invention.

FIG. 29 shows a circuit of Example 18. In Example 18, the delay circuit 38 and the output current sensing resistor 39 of Example 5 (FIG. 14) are replaced with a delay circuit 28 and a current sensing resistor 29 of Example 15 (FIG. 26), respectively. The other configuration is identical to Example 5. The current sensing resistor 29 is connected in series between the junction point P4 of the first primary winding 3*a*1 and the second primary winding 3*a*2, and the first input terminal 1*a*. The resistance of the current sensing resistor 29 is sufficiently small to neglect the influence on the input current and the input voltage Vin. Accordingly, the operation in Example 18 is similar to Example 5.

EXAMPLE 19

Figure 30:
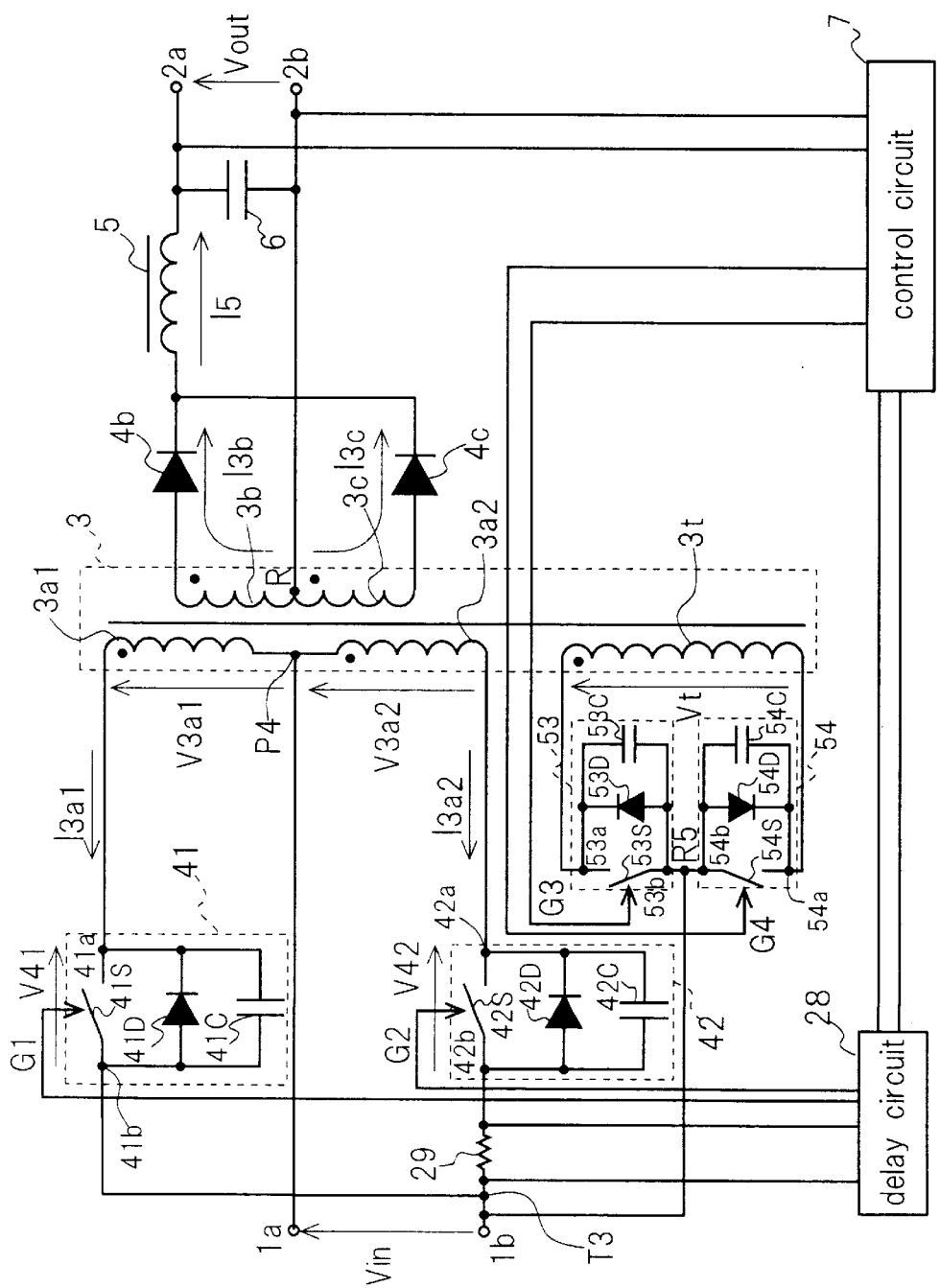
FIG. 30 is a circuit diagram showing the configuration of a switching power supply of Example 19 according to the present invention.

FIG. 30 shows a circuit of Example 19. The configuration of Example 19 is identical to Example 18 (FIG. 29) except for the point that a current sensing resistor 29 is connected in series between the junction point T3 of the anode 41*b* of the first switching section 41 and the second input terminal 1*b*, and the anode 42*b* of the second switching section 42. The resistance of the current sensing resistor 29 is sufficiently small to neglect the influence on the input current and the input voltage Vin. Accordingly, the operation in Example 19 is similar to Example 18.

In the above-mentioned examples, the switching control circuit 7 sets the dead time at D1 of FIG. 6. In addition, the delay circuit delays the switching signals input from the switching control circuit for the delay time D2 shown in FIG. 6, when the sensed current is smaller than the predetermined threshold value (19th, 129th and the like), that is, in the light-load period. Thereby, the ON-timing of a switching device to be turned ON is delayed with respect to the heavy-load period, and hence the dead time is extended from D1 to D2.

Alternatively, the switching control circuit may set the dead time at D1+D2. Thus, the delay circuit may delay the switching signals for the delay time D2, when the sensed current is larger than the predetermined threshold value, that is, in the heavy-load period. In that case, in contrast to the above-mentioned examples, the OFF-timing of a switching device to be turned OFF is delayed with respect to the light-load period, whereby the dead time is shortened from D1+D2 to D1. Thus, the dead time in the light-load period can be longer than in the heavy-load period. Accordingly, similarly to the above-mentioned examples, the ZVS is carried out even in the light-load period.

In the above-mentioned examples, the energy supplied to the parasitic capacitors charging and discharging in the switching sections is stored in the excitation inductance and the leakage inductance of the transformer 3. In case of a small leakage inductance, the energy may be insufficient for the parasitic capacitors to charge and discharge. In that case, an inductance device may be connected in series to the primary or the secondary winding of the transformer 3, thereby increasing the leakage inductance to a desired value.

In the above-mentioned examples, the first rectifier diode 4*b* and the second rectifier diode 4*c* both are ordinary diodes. Alternatively, the first rectifier diode 4*b* and the second rectifier diode 4*c* may be replaced with a synchronous rectifier circuit. Similarly to the first rectifier diode 4*b* and the second rectifier diode 4*c*, the synchronous rectifier circuit comprises two switching devices such as MOSFET's. These switching devices are controlled with the switching signals G1–G4. Power loss in the turning ON and OFF by the synchronous rectifier circuit is smaller than ordinary diodes. Accordingly, the power loss by the operation during the dead time is suppressed in comparison with the turning ON and OFF by the first rectifier diode 4*b* and the second rectifier diode 4*c*.

In the above-mentioned examples, a so-called center-tap type full-wave rectifier circuit is constructed with two secondary windings 3*b* and 3*c*, and two rectifier diodes 4*b* and 4*c* in the secondary of the transformer 3. However, the present invention is not restricted to this. A so-called bridge type full-wave rectifier circuit may be constructed with a secondary winding and four rectifier diodes.

As is obviously understood from the above-mentioned examples, in a switching power supply according to the present invention, the ZVS is carried out in the light-load period for the turning ON of the switching devices. Thereby, the switching loss in the light-load period is reduced, and, in particular, surge current and voltage do not occur. Therefore, in the switching power supply according to the present invention, efficiency is improved in a wider range of load especially in the light-load period in contrast to the prior art. At the same time, electromagnetic noise is much reduced. Further, by virtue of the noise reduction in the light-load period, the switching power supply according to the present invention permits driving at a higher frequency in the overall range- of load in contrast to the prior art, whereby the switching power supply according to the present invention can be down sized in contrast to the prior art. These effects of the present invention can be realized in switching power supplies of various types including the conventional isolation type DC-DC converters, such as full-bridge type, half-bridge type, push-pull type, and these types with an auxiliary winding.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering. all alterations and modifications as fall within the true spirit and scope of the invention.

What is claimed is:

1. A switching power supply comprising:
   A) a DC-DC converter comprising:
      a) a full bridge inverter including first and second series pairs of switching sections, each switching section having 1) a switching device turned ON and OFF by switching signals, and 2) a diode and a capacitor each connected to said switching device in parallel;
      b) a transformer comprising a primary winding and at least one secondary winding, said primary winding connected between the junction point of said first series pair of switching sections and the junction point of said second series pair of switching sections;
      c) a rectifying circuit for performing full-wave rectification on the output of said transformer; and
      d) a smoothing circuit for smoothing the output of said rectifying circuit;
   B) a switching control section for outputting said switching signals to said switching devices at a predetermined switching frequency;
   C) a load current sensing section for sensing the amount of load current output from said DC-DC converter; and
   D) a delay section for delaying said switching signals for a predetermined delay time depending on said amount of load current sensed by said load current sensing section.

2. The switching power supply of claim 1, wherein said delay section delays said switching signals for turning ON said switching devices when said amount of load current sensed by said load current sensing section reduces substantially below a predetermined threshold value.

3. The switching power supply of claim 1, wherein said predetermined delay time is substantially ¼ of the resonance period determined by the self-inductance of said primary winding of said transformer.

4. The switching power supply of claim 3, wherein said delay section delays said switching signals for turning ON said switching devices when said amount of load current sensed by said load current sensing section reduces substantially below a predetermined threshold value.

5. The switching power supply of claim 4, wherein said load current sensing section senses said amount of load current from a current flowing through at least one of said switching sections.

6. The switching power supply of claim 4, wherein said load current sensing section senses said amount of load current from a current flowing through said primary winding of said transformer.

7. The switching power supply of claim 4, wherein said load current sensing section senses said amount of load current from the input current of said DC-DC converter.

8. The switching power supply of claim 4, wherein said load current sensing section senses said amount of load current from the output current of said DC-DC converter.

9. A switching power supply comprising:
   A) a DC-DC converter comprising:
      a) a half bridge inverter including first and second series pairs of switching sections and a series of two voltage dividing capacitors, each switching section having 1) a switching device turned ON and OFF by switching signals, and 2) a diode and a capacitor each connected to said switching device in parallel, said second series pair of switching sections connected between the junction point of said first series pair of switching sections and the junction point of said series of voltage dividing capacitors;
      b) a transformer comprising a primary winding and at least one secondary winding, said primary winding connected between the junction point of said first series pair of switching sections and the junction point of said series of voltage dividing capacitors;
      c) a rectifying circuit for performing full-wave rectification on the output of said transformer, and
      d) a smoothing circuit for smoothing the output of said rectifying circuit;
   B) a switching control section for outputting said switching signals to said switching devices at a predetermined switching frequency;
   C) a load current sensing section for sensing the amount of load current output from said DC-DC converter; and
   D) a delay section for delaying said switching signals for a predetermined delay time depending on said amount of load current sensed by said load current sensing section.

10. The switching power supply of claim 9, wherein said delay section delays said switching signals for turning ON said switching devices when said amount of load current sensed by said load current sensing section reduces substantially below a predetermined threshold value.

11. The switching power supply of claim 9, wherein said predetermined delay time is substantially ¼ of the resonance period determined by the self-inductance of said primary winding of said transformer.

12. The switching power supply of claim 11, wherein said delay section delays said switching signals for turning ON said switching devices when said amount of load current sensed by said load current sensing section reduces substantially below a predetermined threshold value.

13. A switching power supply comprising:
   A) a DC-DC converter comprising:
      a) first and second series pairs of switching sections, each switching section having 1) a switching device turned ON and OFF by switching signals, and 2) a diode and a capacitor each connected to said switching device in parallel;

b) two voltage dividing capacitors interconnected in series;

c) a transformer comprising a primary winding, at least one secondary winding, and an auxiliary winding;

d) a rectifying circuit for performing full-wave rectification on the output of said transformer; and e) a smoothing circuit for smoothing the output of said rectifying circuit; wherein said first series pair of switching sections and said voltage dividing capacitors constitute a half bridge inverter, said primary winding of said transformer is connected between the junction point of said first series pair of switching sections and the junction point of said voltage dividing capacitors, and said second series pair of the switching sections are connected in parallel to said auxiliary winding of said transformer;

B) a switching control section for outputting said switching signals to said switching devices at a predetermined switching frequency;

C) a load current sensing section for sensing the amount of load current output from said DC-DC converter; and D) a delay section for delaying said switching signals for a predetermined delay time depending on said amount of load current sensed by said load current sensing section.

14. The switching power supply of claim 13, wherein said delay section delays said switching signals for turning ON said switching devices when said amount of load current sensed by said load current sensing section reduces substantially below a predetermined threshold value.

15. The switching power supply of claim 13, wherein said predetermined delay time is substantially ¼ of the resonance period determined by the self-inductance of said primary winding of said transformer.

16. The switching power supply of claim 15, wherein said delay section delays said switching signals for turning ON said switching devices when said amount of load current sensed by said load current sensing section reduces substantially below a predetermined threshold value.

17. A switching power supply comprising:

A) a DC-DC converter comprising:

a) a push-pull inverter including first, second, third, and fourth switching sections, each switching section having 1) a switching device turned ON and OFF by switching signals, and 2) a diode and a capacitor each connected to said switching device in parallel, wherein said third and fourth switching sections are interconnected in series, and the series of said third and fourth switching sections is connected between the same polarity terminals of said first and second switching sections;

b) a transformer comprising two primary windings interconnected in series, and at least one secondary winding, the series of said primary windings connected in parallel to said series of the third and fourth switching sections;

c) a rectifying circuit for performing full-wave rectification on the output of said transformer; and d) a smoothing circuit for smoothing the output of said rectifying circuit;

B) a switching control section for outputting said switching signals to said switching devices at a predetermined switching frequency;

C) a load current sensing section for sensing the amount of load current output from said DC-DC converter; and D) a delay section for delaying said switching signals for a predetermined delay time depending on said amount of load current sensed by said load current sensing section.

18. The switching power supply of claim 17, wherein said delay section delays said switching signals for turning ON said switching devices when said amount of load current sensed by said load current sensing section reduces substantially below a predetermined threshold value.

19. The switching power supply of claim 17, wherein said predetermined delay time is substantially ¼ of the resonance period determined by the self-inductances of said primary windings.

20. The switching power supply of claim 19, wherein said delay section delays said switching signals for turning ON said switching devices when said amount of load current sensed by said load current sensing section reduces substantially below a predetermined threshold value.

21. A switching power supply comprising:

A) a DC-DC converter comprising:

a) first, second, third, and fourth switching sections, each switching section having 1) a switching device turned ON and OFF by switching signals, and 2) a diode and a capacitor each connected to said switching device in parallel, said first and second switching sections constituting a push-pull inverter, said third and fourth switching sections being interconnected in series;

b) a transformer comprising two primary windings interconnected in series, at least one secondary winding, and an auxiliary winding, wherein the series of said primary windings is connected between the same polarity terminals of said first and second switching sections, and said auxiliary winding is connected in parallel to said series of the third and fourth switching sections;

c) a rectifying circuit for performing full-wave rectification on the output of said transformer; and d) a smoothing circuit for smoothing the output of said rectifying circuit;

B) a switching control section for outputting said switching signals to said switching devices at a predetermined switching frequency;

C) a load current sensing section for sensing the amount of load current output from said DC-DC converter; and D) a delay section for delaying said switching signals for a predetermined delay time depending on said amount of load current sensed by said load current sensing section.

22. The switching power supply of claim 21, wherein said delay section delays said switching signals for turning ON said switching devices when said amount of load current sensed by said load current sensing section reduces substantially below a predetermined threshold value.

23. The switching power supply of claim 21, wherein said predetermined delay time is substantially ¼ of the resonance period determined by the self-inductances of said two primary windings.

24. The switching power supply of claim 23, wherein said delay section delays said switching signals for turning ON said switching devices when said amount of load current sensed by said load current sensing section reduces substantially below a predetermined threshold value.

* * * * *